United States Patent
Wendt et al.

(10) Patent No.: US 12,552,366 B2
(45) Date of Patent: Feb. 17, 2026

(54) SYSTEMS, DEVICES, AND METHODS FOR DYNAMICALLY LEVERAGING MULTI-SOURCE SAFETY-RELATED DATA

(71) Applicant: Spoke Safety, Inc., Denver, CO (US)

(72) Inventors: Jarrett Wendt, Denver, CO (US); Robert Sigety, Milford, MI (US); Angelo Monteleone, Vel della Torre (IT); Lutz Kucher, Grahovo (SI); Matthew Austin Maczuzak, Pine, CO (US); David Bartlett, Walnut Creek, CA (US); David Brodie, Penzberg (DE); Domenico Actis Grosso, Torrazza Piemonte (IT); Andrea Tomatis, Sant'Albano Stura (IT); Jovan Zagajac, Ann Arbor, MI (US)

(73) Assignee: Spoke Safety, Inc.

( * ) Notice: Subject to any disclaimer, the term of this patent is extended or adjusted under 35 U.S.C. 154(b) by 130 days.

(21) Appl. No.: 18/299,411

(22) Filed: Apr. 12, 2023

(65) Prior Publication Data
US 2023/0278544 A1 Sep. 7, 2023

Related U.S. Application Data

(63) Continuation-in-part of application No. PCT/US2023/060172, filed on Jan. 5, 2023, and a
(Continued)

(51) Int. Cl.
*B60W 30/08* (2012.01)
*B62K 19/00* (2006.01)

(52) U.S. Cl.
CPC ....... *B60W 30/08* (2013.01); *B60W 2420/403* (2013.01); *B60W 2420/408* (2024.01);
(Continued)

(58) Field of Classification Search
CPC .................................................. B60W 30/08
See application file for complete search history.

(56) References Cited

U.S. PATENT DOCUMENTS

| | | | |
|---|---|---|---|
| 6,707,391 B1 * | 3/2004 | Monroe | G08G 1/096783 340/901 |
| 8,364,389 B2 | 1/2013 | Dorogusker et al. | |

(Continued)

FOREIGN PATENT DOCUMENTS

| | | |
|---|---|---|
| CN | 107454569 A | 12/2017 |
| DE | 102013012702 A1 | 2/2015 |

(Continued)

OTHER PUBLICATIONS

Kari Rodriguez, ISA/US, The International Search Report and the Written Opinion of the International Searching Authority, or the Declaration, Jun. 15, 2023, 14, U.S. Patent and Trademark Office, Alexandria, VA, US.

(Continued)

*Primary Examiner* — Tan Q Nguyen
(74) *Attorney, Agent, or Firm* — Laura Marmulstein

(57) ABSTRACT

The present disclosure relates to safety devices and systems for light mobility vehicles. In one example, a light mobility vehicle safety system includes one or more sensors and a processor coupled to a light mobility vehicle. The processor may be configured to determine that the light mobility vehicle is part of a group of two or more light mobility vehicles; determine a position of the light mobility vehicle relative to one or more other light mobility vehicles in the group; determine one or more relevant sensors of the one or more sensors based on the position of the light mobility vehicle and positioning of the one or more sensors on the light mobility vehicle; receive first relevant safety-related data from the one or more relevant sensors; and transmit the
(Continued)

first relevant safety-related data to one or more other light mobility vehicles in the group.

23 Claims, 36 Drawing Sheets

Related U.S. Application Data continuation-in-part of application No. PCT/US2022/024342, filed on Apr. 12, 2022.

(60) Provisional application No. 63/384,367, filed on Nov. 18, 2022, provisional application No. 63/296,620, filed on Jan. 5, 2022, provisional application No. 63/173,593, filed on Apr. 12, 2021.

(52) U.S. Cl.
CPC ............... *B60W 2554/4041* (2020.02); *B60W 2554/4049* (2020.02)

(56) References Cited

U.S. PATENT DOCUMENTS

| | | | | |
|---|---|---|---|---|
| 11,830,357 | B1* | 11/2023 | Murphy | ............... G08G 1/0145 |
| 2012/0065858 | A1* | 3/2012 | Nickolaou | ............. B60Q 9/008 |
| | | | | 701/1 |
| 2013/0144464 | A1 | 6/2013 | Dorogusker et al. | |
| 2013/0282277 | A1* | 10/2013 | Rubin | ...................... G08G 1/09 |
| | | | | 701/517 |
| 2015/0251599 | A1 | 9/2015 | Koravadi | |
| 2015/0262487 | A1* | 9/2015 | Cazanas | ............... B60W 30/09 |
| | | | | 701/301 |
| 2016/0185419 | A1 | 6/2016 | Bendel et al. | |
| 2017/0160392 | A1 | 6/2017 | Brisimitzakis et al. | |
| 2017/0292315 | A1* | 10/2017 | Koravadi | .............. B60W 30/08 |
| 2018/0365909 | A1* | 12/2018 | Cheng | ........................ H04Q 9/00 |
| 2019/0178672 | A1 | 6/2019 | Woolley | |
| 2019/0256162 | A1* | 8/2019 | Denholm | .................. H04N 5/77 |
| 2019/0333387 | A1 | 10/2019 | Lau et al. | |
| 2019/0392713 | A1 | 12/2019 | Crasso et al. | |
| 2020/0189616 | A1 | 6/2020 | Gupta et al. | |
| 2020/0326726 | A1* | 10/2020 | Vassilovski | ...... G08G 1/096741 |
| 2020/0336967 | A1 | 10/2020 | Rao | |
| 2021/0183249 | A1 | 6/2021 | Beauchamp | |
| 2021/0402883 | A1 | 12/2021 | Bender et al. | |
| 2023/0179969 | A1* | 6/2023 | Pateromichelakis | ....................... H04L 41/0894 |
| | | | | 370/329 |
| 2023/0377461 | A1* | 11/2023 | Ran | .................. G08G 1/096708 |

FOREIGN PATENT DOCUMENTS

| | | |
|---|---|---|
| EP | 2831864 A1 | 2/2015 |
| KR | 20150111468 A | 10/2015 |
| KR | 20180000672 A | 1/2018 |
| WO | 2013144638 A1 | 10/2013 |
| WO | 2019213763 A1 | 11/2019 |
| WO | 2021252174 A1 | 12/2021 |

OTHER PUBLICATIONS

"Cellular V2X Communication," Continental, accessed Jan. 22, 2021, <https://www.continental-automotive.com/cv2x>.

"!important Your Digital Safety Belt," !Important, accessed May 7, 2021, <https://important.com/>.

"A Rider's Safety Net," RidarSystems, accessed Apr. 19, 2023, <https://ridarsystems.com/>.

* cited by examiner

SYSTEMS, DEVICES, AND METHODS FOR DYNAMICALLY LEVERAGING MULTI-SOURCE SAFETY-RELATED DATA

CROSS REFERENCE TO RELATED APPLICATIONS

The present patent application is a continuation-in-part of PCT Patent Application No. PCT/US23/60172, entitled "Safety Systems, Devices, and Methods for Improved Road User Safety and Visibility," filed on Jan. 5, 2023, which claims the benefit of U.S. Provisional Patent Application No. 63/384,367, entitled "Safety Systems and Devices for a Light Mobility Vehicle," filed on Nov. 18, 2022, U.S. Provisional Patent Application No. 63/296,620, entitled "Data-Driven Autonomous Communication Optimization Safety Systems, Devices, and Methods," filed on Jan. 5, 2022, and PCT Patent Application No. PCT/US22/24342, entitled "Data-Driven Autonomous Communication Optimization Safety Systems, Devices, and Methods," filed on Apr. 12, 2022; and is a continuation-in-part of PCT Patent Application No. PCT/US22/24342, entitled "Data-Driven Autonomous Communication Optimization Safety Systems, Devices, and Methods," filed on Apr. 12, 2022, which claims the benefit of U.S. Provisional Patent Application No. 63/296,620, entitled "Data-Driven Autonomous Communication Optimization Safety Systems, Devices, and Methods," filed on Jan. 5, 2022; and U.S. Provisional Patent Application No. 63/173,593, entitled "Collision Prevention Systems, Devices, and Methods," filed on Apr. 12, 2021; the entireties of all of which are hereby incorporated by reference herein for all purposes.

TECHNICAL FIELD

The technology described herein relates generally to systems, devices, and methods for dynamically leveraging safety-related data from varying sources, specifically for improved road user safety and visibility.

BACKGROUND

Light mobility vehicles are becoming increasingly popular means of commuting, exercising, and touring. Light mobility vehicles are typically smaller, lighter weight vehicles, including micromobility vehicles, which includes, for example, electronic and non-electronic bicycles, pedal assisted bicycles, electric and non-electric scooters, electric and non-electric skateboards, electric and non-electric unicycles, electric and non-electric tricycles, electric and non-electric quadricycles, and the like. Light mobility vehicles also include light electric vehicles (EV), micro-EVs, motorcycles, e-motorcycles, two wheelers, three wheelers, four wheelers, ATVs, mopeds, and the like. Light mobility vehicles are often driven on the road, which increases the likelihood of collision with automotive vehicles, such as cars, vans, trucks, buses, and the like, and with other light mobility vehicles.

Road users may vary their safety risks on the road based on how they are traveling. For example, a child on a bus may get off the bus and cross the street to get home. While on the bus, the child may be safer and at less risk than when the child is a pedestrian crossing the road. As another example, a cyclist may ride alone or with a group. Riding alone may have less associated risks than riding as a group, which is a larger target for other vehicles on the road. Further, road users may take riskier paths (e.g., those with more road hazards or risks) without realizing there are safer routes.

The information included in this Background section of the specification, including any references cited herein and any description or discussion thereof, is included for technical reference purposes only and is not to be regarded subject matter by which the scope of the invention as defined in the claims is to be bound.

SUMMARY

The disclosed technology includes safety systems, devices, and method that dynamically leverage safety-related data from multiple sources. Embodiments of the present disclosure may include a light mobility vehicle safety system. The light mobility vehicle safety system may include one or more sensors coupled to a light mobility vehicle, and a processor coupled to the light mobility vehicle and in communication with the one or more sensors. The processor may be configured to determine that the light mobility vehicle is part of a group of two or more light mobility vehicles; determine a position of the light mobility vehicle relative to one or more other light mobility vehicles in the group; determine one or more relevant sensors of the one or more sensors based on the position of the light mobility vehicle and positioning of the one or more sensors on the light mobility vehicle; receive first relevant safety-related data from the one or more relevant sensors; and transmit the first relevant safety-related data to the one or more other light mobility vehicles in the group.

Additionally or separately, the processor may be configured to receive second relevant safety-related data from the one or more other light mobility vehicles; and determine one or more threats or risks surrounding the group based on the first and second relevant safety-related data.

Additionally or separately, the light mobility vehicle system may include one or more feedback components coupled to the light mobility vehicle and in communication with the processor. The processor may be further configured to determine a risk level or proximity of the one or more threats or risks; and transmit an alert to the one or more feedback components related to one or more high risk or close proximity threats or risks. Additionally or separately, determining a risk level of the one or more threats or risks may include assigning a risk value to the one or more threats or risks and determining the one or more threats or risks with higher risk values. Additionally or separately, transmitting an alert to the one or more feedback components related to one or more high risk or close proximity threats or risks may include increasing an intensity or frequency of signaling of the one or more feedback components with higher risk or closer threats or risks. Additionally or separately, transmitting an alert to the one or more feedback components may include transmitting signaling instructions to a light coupled to the light mobility vehicle when the high risk or close proximity threats or risks include an oncoming entity. Additionally or separately, transmitting an alert to the one or more feedback components may include transmitting an audio signal to a speaker, bell, or horn coupled to the light mobility vehicle when the high risk or close proximity threats or risks include an oncoming entity.

Additionally or separately, the one or more other light mobility vehicles may include a safety device with a display. Additionally or separately, the safety device of the one or more other light mobility vehicles may include one or more of a C-V2X module and cellular module.

Additionally or separately, determining the position of the light mobility vehicle relative to the one or more other light mobility vehicles may include determining that the light mobility vehicle is in front of the one or more other light mobility vehicles; and the one or more relevant sensors include a camera and a radar sensor positioned on a front portion of the light mobility vehicle; and the first relevant safety-related data includes object data received from the camera and the radar sensor. Additionally or separately, the processor may be configured to reconcile differences in the object data received from the camera and the radar sensor for more accurate object data. Additionally or separately, the processor may be configured to turn off or reduce power to one or more non-relevant sensors.

Additionally or separately, determining the position of the light mobility vehicle relative to the one or more other light mobility vehicles may include receiving geopositioning data or object data from the one or more sensors or user input related to the position; and determining based on the geopositioning data, object data, or user input the position of the light mobility vehicle.

Additionally or separately, the light mobility vehicle system may include one or more connectivity modules coupled to the light mobility vehicle and in communication with the processor; wherein the first relevant safety-related data is related to an object; and the processor is further configured to determine a type of communication signal available from the object based on communication signal data received from the one or more connectivity modules, wherein the type of communication signal comprises no signal, a C-V2X signal, or a cellular signal; classify the object based on the first relevant safety-related data and the type of communication signal; and determine a risk associated with the object based on the object classification.

Other examples or embodiments of the present disclosure may include a method of instructing light mobility vehicles in a group to stay together. The method may include associating, by a processing element, two or more light mobility vehicles into a group based on similar entity data received from two or more light mobility vehicle devices associated with the two or more light mobility vehicles or based on user input indicating the two or more light mobility vehicles are in the group; receiving, by the processing element, first entity data from one or more first light mobility vehicle devices associated with one or more first light mobility vehicles of the two or more light mobility vehicles; receiving, by the processing element, second entity data from one or more second light mobility vehicle devices associated with one or more second light mobility vehicles of the two or more light mobility vehicles; determining, by the processing element, that the one or more first light mobility vehicles are separated from the one or more second light mobility vehicles based on the first entity data deviating from the second entity data; and transmitting, by the processing element, an alert to the two or more light mobility vehicle devices indicating that the one or more first light mobility vehicles are separated.

Additionally or separately, the method may include transmitting, by the processing element, navigation guidance to the one or more first light mobility vehicle devices associated with the one or more first light mobility vehicles to route the one or more first light mobility vehicles to the one or more second light mobility vehicles. Additionally or separately, the similar entity data is one or more of a similar proximity, speed, or heading of the two or more light mobility vehicles. Additionally or separately, determining that the first entity data deviates from the second entity data may include determining that one or more of the proximity, speed, or heading of the one or more first light mobility vehicles deviates from one or more of the proximity, speed, or heading of the one or more second light mobility vehicles.

Further examples or embodiments of the present disclosure may include a safety device for a light mobility vehicle. The safety device may include one or more connectivity modules coupled to a circuit board; and a processing element coupled to the circuit board and in communication with the one or more connectivity modules. The processing element may be configured to determine the safety device is part of a group of two or more safety devices, wherein the two or more safety devices are associated with two or more light mobility vehicles; receive safety-related data from one or more other safety devices in the group; determine group characteristic data based on safety-related data received; and transmit, via the one or more connectivity modules, the group characteristic data to one or more compatible connectivity modules of one or more entities.

Additionally or separately, determining the safety device is part of a group of two or more safety devices may include determining the safety device and the one or more other safety devices in the group have one or more of a similar proximity, speed, and heading.

Additionally or separately, the group characteristic data may include data related to a size dimension of the group. Additionally or separately, the group characteristic data may include an average speed of the two or more light mobility vehicles. Additionally or separately, the one or more connectivity modules may include a C-V2X chip, and the one or more compatible connectivity modules of one or more entities may include a compatible C-V2X module of a car. Additionally or separately, the one or more connectivity modules may include a cellular modem, and the one or more compatible connectivity modules of one or more entities may include a compatible cellular modem of a car.

Additional examples or embodiments of the present disclosure may include a safety system. The safety system may include a first entity having little to no connectivity over a long-distance range, wherein the first entity may include a first connectivity module configured to communicate over a short-distance range; and a plurality of connected entities, wherein a first connected entity of the plurality of connected entities may include a first connected connectivity module configured to receive safety-related data from a second connected entity of the plurality of connected entities over a long-distance range; and a second connected connectivity module configured to transmit the safety-related data to the first connectivity module over the short-distance range.

Additionally or separately, the first connectivity module and the second connected connectivity module may be C-V2X modules and the safety-related data may be a basic safety message. Additionally or separately, the first connected entity may include a light mobility vehicle including a safety device. The safety device may include the first and second connected connectivity modules. The first connected connectivity module may include a cellular module and the second connected connectivity module may include a C-V2X module.

Further examples or embodiments of the present disclosure may include a method of sharing relevant safety-related data with an entity with limited to no connectivity. The method may include receiving, by a first connectivity module, safety-related data related to a safety risk or hazard outside a dead zone; and transmitting, by a second connectivity module, the safety-related data to a third connectivity module associated with an entity inside the dead zone.

Additionally or separately, the first connectivity module may be a cellular module and the second connectivity module and the third connectivity module may be C-V2X modules.

Additional examples or embodiments of the present disclosure may include a method of assessing a risk of an object. The method may include receiving, by a processing element, sensor data related to an object from one or more sensors in communication with the processing element; determining, by the processing element, a type of communication signal available from the object based on communication signal data received from one or more connectivity modules in communication with the processing element, wherein the type of communication signal may include no signal, a C-V2X signal, or a cellular signal; classifying, by the processing element, the object based on the sensor data and the type of communication signal; and determining, by the processing element, a risk associated with the object based on the object classification.

Additionally or separately, determining a risk associated with the object may include determining a high risk is associated with the object based on the object having no signal. Additionally or separately, the method may include transmitting, from the processing element via the one or more connectivity modules, the classified object data to an other entity, the other entity comprising an other entity connectivity module that is non-compatible with the object.

Additionally or separately, the one or more connectivity modules may include a C-V2X module and a cellular module and the other entity connectivity module may include a cellular modem. Determining, by the processing element, the type of communication signal available from the object based on communication signal data received from the one or more connectivity modules may include determining, by the processing element, the communication signal available is a C-V2X signal based on C-V2X signal data received from the C-V2X module; and transmitting, from the processing element via the one or more connectivity modules, the classified object data to the other entity may include transmitting, from the processing element via the cellular module, the classified object data classifying the object as a C-V2X enabled entity to the other entity cellular modem.

Additional examples or embodiments of the present disclosure may include a portable safety device. The portable safety device may include a housing enclosing a housing cavity; a printed circuit board positioned inside the housing cavity; a connectivity module coupled to the printed circuit board and configured to transmit a signal; a processor coupled to the circuit board and in communication with the connectivity module; and one or more sensors in communication with the processor. The processor may be configured to determine an entity associated with the portable safety device based on sensor data received from the one or more sensors; and turn the signal on or off depending on the associated entity.

Additionally or separately, determining an entity associated with the portable safety device based on sensor data received from the one or more sensors may include determining a pedestrian is associated with the portable safety device based on speed data received from a speed sensor; and turning the signal on or off depending on the associated entity may include turning the signal on when the associated entity is a pedestrian. Additionally or separately, the processor may be configured to instruct the connectivity module to transmit to one or more other entities having a compatible connectivity module entity data identifying the associated entity as a pedestrian.

Additionally or separately, determining an entity associated with the portable safety device based on sensor data received from the one or more sensors may include determining a car is associated with the portable safety device based on speed data received from a speed sensor; and turning the signal on or off depending on the associated entity may include turning the signal off when the associated entity is a car.

Additionally or separately, the connectivity module may include a C-V2X module.

Additional examples or embodiments of the present disclosure may include a method of adjusting settings of a portable safety device. The method may include determining, by the portable safety device processing element, that the portable safety device is associated with an automotive vehicle; turning off, by the portable safety device processing element, a communication signal of the portable safety device based on the determination that the portable safety device is associated with an automotive vehicle; determining, by the portable safety device processing element, that the portable safety device is traveling independently of the automotive vehicle; and turning on, by the portable safety device processing element, the communication signal based on the determination that the portable safety device is traveling independently of the automotive vehicle.

Additionally or separately, the method may include receiving, by a portable safety device processing element, a first speed of the portable safety device; and receiving, by the portable safety device processing element, a second speed of the portable safety device; wherein determining, by the portable safety device processing element, that the portable safety device is associated with an automotive vehicle is based on the first speed; and determining, by the portable safety device processing element, that the portable safety device is traveling independently of the automotive vehicle is based on the second speed.

Additionally or separately, the communication signal may be one or more of a C-V2X signal and a cellular signal.

Additionally or separately, the method may include receiving, by the portable safety device processing element, a speed of the portable safety device; associating, by the portable safety device processing element, the portable safety device with a vulnerable road user based on the speed; and transmitting, by the portable safety device processing element, entity data indicating the portable safety device is associated with the vulnerable road user.

Additionally or separately, determining that the portable safety device is associated with an automotive vehicle may include receiving, from one or more sensors associated with the portable safety device, first speed data and one or more of first heading data and first location data; receiving, from one or more other portable safety devices, second speed data and one or more of second heading data and second location data; and determining, by the portable safety device processing element, that the portable safety device is traveling with the one or more other portable safety devices based on similarity of the first and second speed data and similarity of one or more of the first and second heading data and the first and second location data. Determining, by the portable safety device processing element, that the portable safety device is traveling independently of the automotive vehicle may include determining, by the portable safety device processing element, that the portable safety device is separate from the one or more other portable safety devices based on deviation of the first and second speed data or deviation of one or more of the first and second heading data and the first and second location data.

Additionally or separately, determining, by the portable safety device processing element, that the portable safety device is associated with an automotive vehicle, may include receiving, from one or more sensors associated with the automotive vehicle, automotive vehicle sensor data indicating the automotive vehicle is turned on; and determining, by the portable safety device processing element, that the portable safety device is associated with the automotive vehicle based on the on status of the automotive vehicle. Determining, by the portable safety device processing element, that the portable safety device is traveling independently of the automotive vehicle may include receiving, from the one or more sensors associated with the automotive vehicle, automotive vehicle sensor data indicating the automotive vehicle is turned off; and determining, by the portable safety device processing element, that the portable safety device is traveling independently of the automotive vehicle based on the off status of the automotive vehicle.

Additional examples or embodiments of the present disclosure may include a method of selectively alerting a vulnerable road user of safety risks. The method may include receiving, from a plurality of data sources, safety-related data, wherein the plurality of data sources may include one or more sensors and a remote data source; generating, by a processing element, an environmental model of an environment around the vulnerable road user, wherein the environmental model classifies the safety-related data as permanent, temporary, and dynamic and maps the safety-related data to a map layer, wherein at least one of the permanent safety-related data is from the remote data source and at least one of the temporary or dynamic safety-related data is from the one or more sensors; executing, by the processing element, a plurality of algorithms in parallel based on the safety-related data to determine one or more safety risk or threats; determining, by the processing element, at least one high risk or one close proximity risk of the one or more safety risk or threats; and transmitting, by the processing element, an alert based on the at least one high risk or one close proximity risk.

Additionally or separately, the remote data source may be a third-party application or database comprising map data. Additionally or separately, the method may include determining, by the processing element, a safe route based on a current location of the vulnerable road user, destination data received from the vulnerable road user, and the environmental model, wherein the safe route minimizes safety risks or threats encountered.

Additionally or separately, the method may include tracking, by the processing element, the vulnerable road user's behavior relative to the at least one high risk or one close proximity risk; and calculating a safety score based at least in part on the vulnerable road user's behavior relative to the at least one high risk or one close proximity risk, wherein the safety score accounts for safe and unsafe actions relative to the environmental model, wherein safe actions increase the safety score and unsafe actions decrease the safety score.

Additionally or separately, the method may include determining, by the processing element, whether the vulnerable road user followed the safe route; and calculating, by the processing element, a safety risk score based at least in part on whether the vulnerable road user followed the safe route. Additionally or separately, calculating, by the processing element, the safety risk score may be based on one or more safe and unsafe behaviors of the vulnerable road user while following the safe route, wherein safe behaviors increase the safety risk score and unsafe behaviors lower the safety risk score.

Additional examples or embodiments of the present disclosure may include a safety system. The safety system may include two or more light mobility vehicles and a server. The two or more light mobility vehicles may include two or more feedback components coupled to the two or more light mobility vehicles; and two or more cellular modems coupled to the two or more light mobility vehicles. The server may be configured to receive safety-related data, the safety-related data related to a safety risk or threat in proximity to the two or more light mobility vehicles; and transmit instructions, via the two or more cellular modems, to the two or more feedback components to turn on simultaneously and transmit similar feedback signals in parallel.

Additionally or separately, the safety-related data may be received from another entity comprising a cellular modem. Additionally or separately, the safety-related data may be entity data related to an other entity and may be received from a cellular modem of the two or more cellular modems that is associated with a light mobility vehicle of the two or more light mobility vehicles, wherein the light mobility vehicle may include a first C-V2X modem and the other entity may include a second C-V2X modem.

Additionally or separately, the two or more feedback components may be lights coupled to the two or more light mobility vehicles, wherein transmitting the instructions to the two or more feedback components to turn on simultaneously and transmit similar feedback signals in parallel instructs the lights to turn on simultaneously and flash at a similar intensity and frequency in parallel.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments and implementations and illustrated in the accompanying drawings.

DETAILED DESCRIPTION

Figure 1:
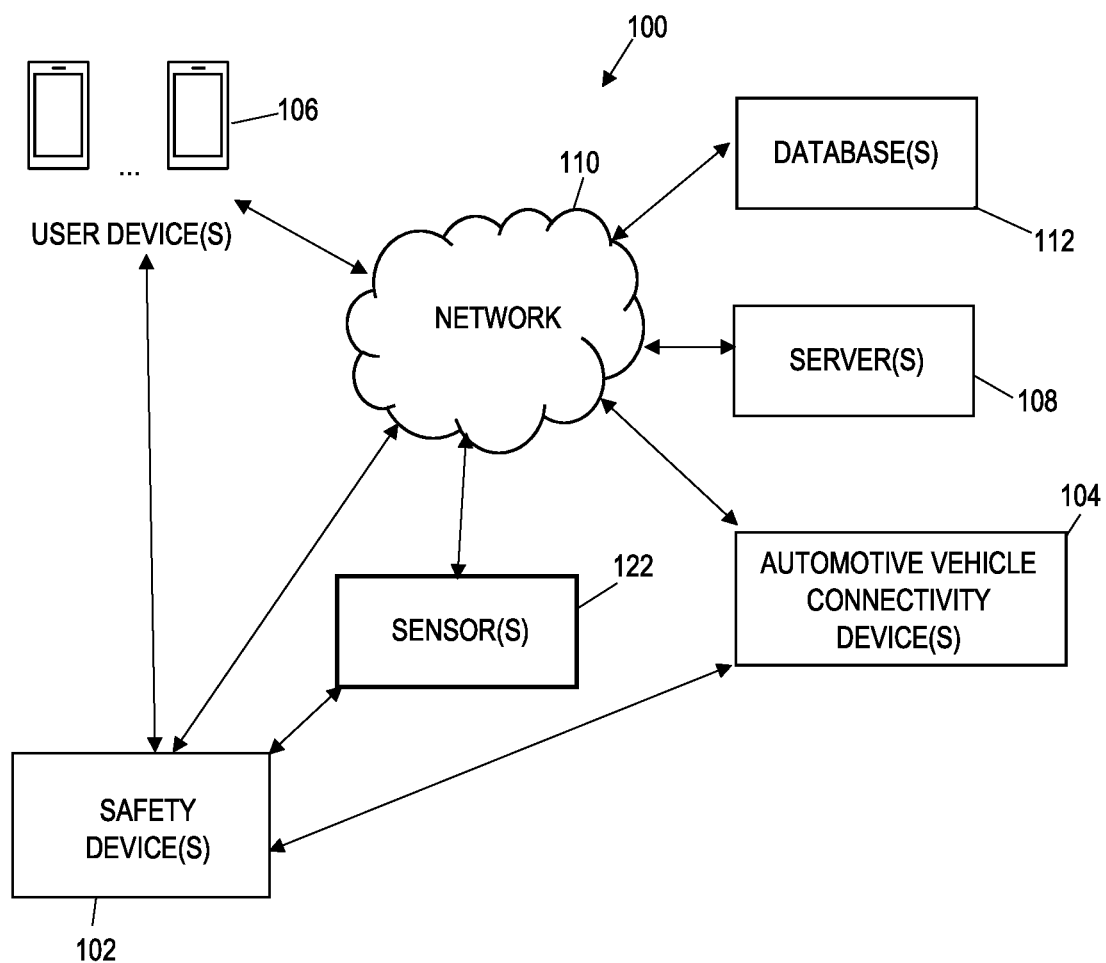
FIG. 1 is a block diagram illustrating an example of a disclosed safety system.

The disclosed technology includes systems, devices, and methods for dynamically leveraging multi-source safety-related data, specifically for improved road user safety, visibility, and communication. In several embodiments, disclosed safety systems and devices dynamically adjust safety-related data inputs or ingestion and/or transmission of safety-related data based on the situation. In several embodiments, disclosed safety systems and devices adjust safety-related data ingestion when a light mobility vehicle is traveling in a group. For example, in a group, disclosed safety systems and devices may leverage safety-related data received from sensors having a field of view around the group and may ignore those that view the other group members. In several embodiments, disclosed safety systems and devices adjust safety-related data ingestion and transmission when a safety device is in an automotive vehicle versus carried by a vulnerable road user. For example, a disclosed portable safety device may turn off a communication signal when the device is inside a car and reactivate the communication signal when the device is outside of the car and carried by a vulnerable road user, such as a pedestrian. As yet another example, disclosed safety systems and devices may focus on certain safety-related data inputs that are indicative of high risks and ignore other safety-related data inputs that pose little to no risk.

In several embodiments, disclosed safety devices are coupled to or otherwise integrated with light mobility vehicles. In several embodiments, a plurality of safety devices and their associated light mobility vehicles are associated into a group or grouping. The plurality of safety devices in the group may exchange and leverage safety-related data collected and/or processed by one or more of the plurality of safety devices. Safety-related data may include data that relates to safety risks and/or real-time circumstances, conditions, and/or situations, including those that may pose a threat to the group or to one or more riders or users in the group. Embodiments of the present disclosure may include one or more of the safety devices, dedicated user devices, and sensor devices, and/or one or more of their components, disclosed in PCT Patent Application No. PCT/US23/60172, entitled "Safety Systems, Devices, and Methods for Improved Road User Safety and Visibility," filed on Jan. 5, 2023, and PCT Patent Application No. PCT/US22/24/342, entitled "Data-Driven Autonomous Communication Optimization Safety Systems, Devices, and Methods," filed on Apr. 12, 2022 (together, the "PCT Applications"), the entire contents of both of which are hereby expressly incorporated by reference.

Disclosed systems, devices, and methods improve the safety, visibility, communication, and user experience for groups of road users, for example, users of light mobility vehicles. As used herein, automotive vehicles refer to vehicles other than light mobility vehicles, including, for example, cars, vans, trucks, buses, and the like.

In several embodiments, a plurality of safety devices are associated into a group or grouping. The plurality of safety devices may be associated based on user input or based on similar entity data (e.g., location, speed/velocity, proximity, heading, movement changes, etc.). One or more of the plurality of safety devices in the group may receive safety-related data and transmit the safety-related data to one or more other safety devices in the group. A safety device may selectively receive and transmit safety-related data based on its position relative to the other safety device(s) in the group. For example, a safety device positioned in the front of the group may receive or determine data related to conditions and risks in front of the group (e.g., a vehicle about to turn right or a pothole in the road) and transmit such data to the other safety devices in the group so that the users are aware of upcoming conditions or risks.

As a non-limiting example, a group of cyclists may ride together in a group. Two or more of the cyclists may have safety devices integrated or coupled to their bicycles. A safety device or system may determine that the cyclists are riding in a group based on user input (e.g., the cyclists acknowledging they are riding in a group by selecting a group function in a safety application) or received entity data (e.g., location, proximity, speed, heading, etc.). The safety device or system may determine a leader of the group based on user input (e.g., a user selecting a leader function on a safety application) or received entity data (e.g., relative location in the group). The leader's safety device may receive input related to conditions in front of the group. For example, the leader's front camera may be activated to receive image data in front of the group. The image data may be processed by the leader's camera or safety device to determine hazards or threats (e.g., potholes or bumps in the road). The determined hazard or threat may be transmitted to other safety devices and/or user devices associated with other riders in the group. In this manner, other riders in the group may be alerted of oncoming threats, hazards, or risks before they become visible or apparent to the other riders.

In several embodiments, disclosed safety systems and methods expand the safety-related data available and user connectivity by leveraging disclosed IoT safety devices. Disclosed safety devices may be portable or coupled to light mobility vehicles to extend connectivity and safety to a more expansive number of users. In several embodiments, safety systems, devices, and methods include a safety device coupled to a light mobility vehicle that enables connectivity between the light mobility vehicle and other vehicles and pedestrians. The safety device may receive, determine, analyze, store, and/or transmit safety-related data.

Safety-related data may include, object data (e.g., data related to the identity and relative position or movement of one or more objects, such as, for example, entities, animals, traffic lights, traffic signs, etc., including Basic Safety Messages, such as SAE J2735, location, proximity, speed/velocity, acceleration, deceleration, heading, distance, path/route/trajectory, movement changes, etc.), SAE deployment profiles (e.g., related to blind spot detection, right turn assist, left turn assist, do not pass, etc.), personal safety messages (PSM), time, power (e.g., battery life of safety device and/or light mobility vehicle), sensor data, collisions and collision risk, road/surface conditions (e.g., elevation changes, turns, surface type, surface state, etc.), road/surface hazards or obstacles (e.g., potholes, traffic cones, bumps, etc.), traffic or congestion, weather (including weather probabilities and expected times of weather events), environment (e.g., altitude, air quality, heat index, humidity, temperature, visibility, etc.), traffic intersections, traffic lights, traffic signs (e.g., speed limit signs, stop signs, warning signs, etc.), map data, laws or ordinances, criminal activity (including locations and time of day), user data (e.g., biometrics, health, age, weight, height, gender, energy exertion, fitness and/or wellness goals, etc.), vehicle data (e.g., type, size, age, condition, etc.), safety threats, safety risks, and the like. Object data may include entity data, e.g., data related to an entity's location or position, motion, orientation, and the like, including, for example, data related to geographic coordinates, speed, heading, direction, proximity to others, acceleration, deceleration, and the like. Entity data may also include data related to entity type or identity (e.g., micro-mobility vehicle, other light mobility vehicle, car, truck, bus, pedestrian, etc.). As used herein, an "entity" may refer to a light mobility vehicle, an automotive vehicle, a user device, or a pedestrian. Safety risks or threats may refer to objects, conditions, circumstances, or the like that pose a risk or threat of harm, damage, or discomfort to a road user or to the road user's vehicle. For example, a pothole may not pose a risk of causing bodily harm to a road user, but it may pose a risk of causing the road user discomfort or damaging the road user's vehicle (e.g., resulting in a flat tire) and thus may be considered a safety risk or threat.

The safety-related data may be used and/or stored by safety systems, devices, or methods described herein. As used herein, safety may encompass physical safety (e.g., collision avoidance), mental/emotional well-being (e.g., crime avoidance), health (e.g., maintaining safe heart rate/blood pressure levels, limiting exposure to toxins, etc.), vehicle safety (e.g., safe maintenance/condition for risk prevention), and the like.

Systems Overview

Turning now to the figures, systems of the present disclosure will be discussed in more detail. FIG. 1 is a block diagram illustrating an example of a safety system 100. The system 100 may include one or more safety devices 102, which are described in greater detail below. As discussed below, the one or more safety devices 102 may include one or more connectivity devices. The one or more safety devices 102 may be coupled to or otherwise integrated with a light mobility vehicle and/or an automotive vehicle, as described in more detail below. It is also contemplated that the one or more safety devices 102 may be portable (e.g., carried by a pedestrian or placed in a glove compartment of a car).

The one or more safety devices 102 may be in communication with each other and/or with one or more automotive vehicle connectivity devices or modules 104. The one or more automotive vehicle connectivity devices or modules 104 may include connectivity devices compatible with the one or more connectivity devices of the one or more safety devices 102, such as, for example a V2X chipset or modem (e.g., a C-V2X chip), a Wi-Fi modem, a Bluetooth modem (BLE), a cellular modem (e.g., 3G, 4G, 5G, LTE, or the like), ANT+ chipsets, and the like. The one or more safety devices 102 may be in communication with each other and/or with the one or more automotive vehicle connectivity devices 104 directly (e.g., between two C-V2X chips) or indirectly, e.g., via one or more servers or remote processing elements 108, via a network 110 (e.g., between two LTE modems).

In some embodiments, the safety device(s) 102 are in communication with one or more user devices 106, which in turn are in communication with one or more servers or remote processing elements 108, via a network 110. The one or more user devices 106 may include various types of computing devices, e.g., smart phones, smart displays, tablet computers, desktop computers, laptop computers, set top boxes, gaming devices, wearable devices, ear buds/pods, or the like. The one or more user devices 106 provide output to and receive input from a user (e.g., via a human-machine interface or HMI). The one or more user devices 106 may receive one or more alerts, notifications, or feedback from one or more of the one or more servers 108, the one or more sensors 122, the one or more safety devices 102, and the one or more automotive vehicle connectivity devices 104 indicative of safety-related information (e.g., safety-related data described herein, such as relative positions/locations of other entities and/or collision-related or traffic-related data). The type and number of user devices 106 may vary as desired.

The one or more user devices 106 may include a dedicated user device that is associated with a safety device described herein or functions in a similar manner as a safety device described herein. The dedicated user device may include safety application software configured to execute one or more of the methods described herein and described in the PCT Applications. In some embodiments, by incorporating a dedicated user device (e.g., instead of a traditional user device such as a smart phone), the safety system 100 can provide more direct and efficient safety output to a user. For example, the dedicated user device may exclude other applications that can interfere with the transmission of safety messages to ensure that safety messages are timely and effectively transmitted to a user. A dedicated user device may provide a higher level of safety and reliability than a smartphone or tablet that integrates other applications and non-safety related data. However, in some embodiments, the safety application software may be installed on a smart phone or other user device 106.

In some embodiments, the safety device(s) 102 and automotive vehicle connectivity device(s) 104 are in communication with one or more servers 108, via network 110, which in turn may be in communication with one or more user devices 106. The one or more servers 108 may be in communication with one or more databases 112, via network 110. Each of the various components of the safety system 100 may be in communication directly or indirectly with one another, such as through the network 110. In this manner, each of the components can transmit and receive data from other components in the system 100. In many instances, the one or more servers 108 may act as a go between for some of the components in the system 100.

The one or more servers 108 may include remote processing element(s) configured to process safety-related data. The one or more servers 108 may collect, transmit, and/or store safety-related data to and from one or more safety devices 102, sensors 122, automotive vehicle connectivity device(s) 104, user device(s) 106, and database(s) 112. In some embodiments, the one or more servers 108 transmit, via the network 110, the safety-related data to one or more safety devices 102 and/or to one or more automotive vehicle connectivity devices 104.

The one or more databases 112 are configured to store information related to the systems and methods described herein. The one or more databases 112 may include one or more internal databases storing data collected or determined by the system, such as, for example, safety-related data, safety threat or action data, trend data, historical data, and the like. As discussed, safety-related data may include, for example, object/entity data, vehicle data, safety device data, user data, environmental data, sensor data, collision-related data, traffic data, road/surface condition data, and the like, as discussed in more detail below.

The one or more databases 112 may include third-party databases, such as for example, those linked to third-party applications that collect safety-related data (e.g., entity data and/or environmental/map data), such as fitness wearables (e.g., Fitbit, Halo, Apple, etc.), training applications (e.g., Under Armor, Strava, TrainingPeaks, etc.), navigational or map applications (e.g., Apple Maps, Waze, etc.), cycling applications (e.g., Ride GPS, Bike2Peak, etc.), and the like, and/or third-party databases storing safety-related data, such as data related to the environment (e.g., air quality index, heat index, topography, altitude, humidity, temperature, visibility, etc.), weather, traffic, accidents, traffic intersections or signs, laws or ordinances, and the like. For example, road/surface data, collision data, road construction data, or the like may be received from a Department of Transportation database. As another example, traffic data and intersection data may be received from an Iteris database. As yet another example, map and location data, including elevation data, may be received from a Mapbox database or API.

In some embodiments, the system 100 may include one or more sensors 122. The sensor data collected by the one or more sensors 122 may be included in the safety-related data described herein. For example, the one or more sensors 122 may collect data related to position, motion, speed, heading, trajectory, pressure, contact, environment, weather, object detection, and the like. For example, the one or more sensors 122 may include one or more accelerometers, position sensors (e.g., GPS, GNSS, or the like), motion detectors, jolt sensors, haptic sensors, gyroscopes, heading sensors, orientation sensors (e.g., a magnetometer), altimeters, cameras, time-of-flight sensors (e.g., time-of-flight cameras), infrared sensors, microphones, radars, light sensors, light detection and radars (LIDAR), speed sensors, hall effect sensors, pressure sensors (e.g., piezoresistive sensor, barometers, etc.), power or energy sensors, thermal or temperature sensors, humidity sensors (e.g., hygrometer), biometric sensors (e.g., heart rate sensors, etc.), SONAR/ultrasound sensors, odor or air quality sensors (e.g., an electronic nose), advance driver assistance system (ADAS) sensors, echolocation sensors, and the like. ADAS sensors may include sensors that provide data related to surround view, park assist, blind spot detection, rear collision warning, cross traffic alert, traffic sign recognition, lane departure warning, emergency braking, collision avoidance, pedestrian detection, adaptive cruise control, and the like. It is contemplated that the one or more sensors may be separate or included in the same sensor device. For example, the one or more sensors may be part of an inertial measurement unit (IMU), which may be configured to measure angular rate, force, magnetic field, and/or orientation. For example, an IMU includes an accelerometer and gyroscope and may also include a magnetometer. It is contemplated that the system 100 may have multiple of the same sensors 122. For example, the system 100 may include multiple cameras for sensing objects (and their proximity, location, motion, acceleration, and/or deceleration, etc.) from multiple angles. For example, a light mobility vehicle may have one or more of a front-facing camera, a rear-facing camera, and one or more side-facing (left or right) cameras, and/or a user may have a helmet camera or other body camera. It is contemplated that the one or more sensors 122 may include third-party sensors used by third-party systems that are in communication with the system 100 (e.g., Iteris infrastructure sensors, traffic/intersection cameras, car cameras, etc.). The one or more sensors 122 may be part of a sensor device that is separate from the safety device(s) 102.

The network 110 may be substantially any type or combination of types of communication systems or modes for transmitting data either through wired or wireless mechanism (e.g., Wi-Fi, Ethernet, Bluetooth, ANT+, cellular data, radio frequencies, or the like). In some embodiments, certain components of the safety system 100 may communicate via a first communication system or mode (e.g., cellular) and others may communicate via a second communication system or mode (e.g., Wi-Fi or Bluetooth). Additionally, certain components may have multiple transmission mechanisms and may be configured to communicate data in two or more manners. The configuration of the network 110 and communication mechanisms for each of the components may be varied as desired and based on the needs of a particular location.

Safety Devices

As described in more detail in the PCT Applications, a disclosed safety device may include a safety device housing and one or more connectivity devices or modules positioned inside the safety device housing. The one or more connectivity devices or modules enable the safety device to exchange safety-related data, including entity data (e.g., location, speed, heading, acceleration, etc.), with one or more connectivity devices of one or more other entities (e.g., an automotive vehicle connectivity device or other safety device), thereby increasing contextual awareness between the entities.

Figure 2:
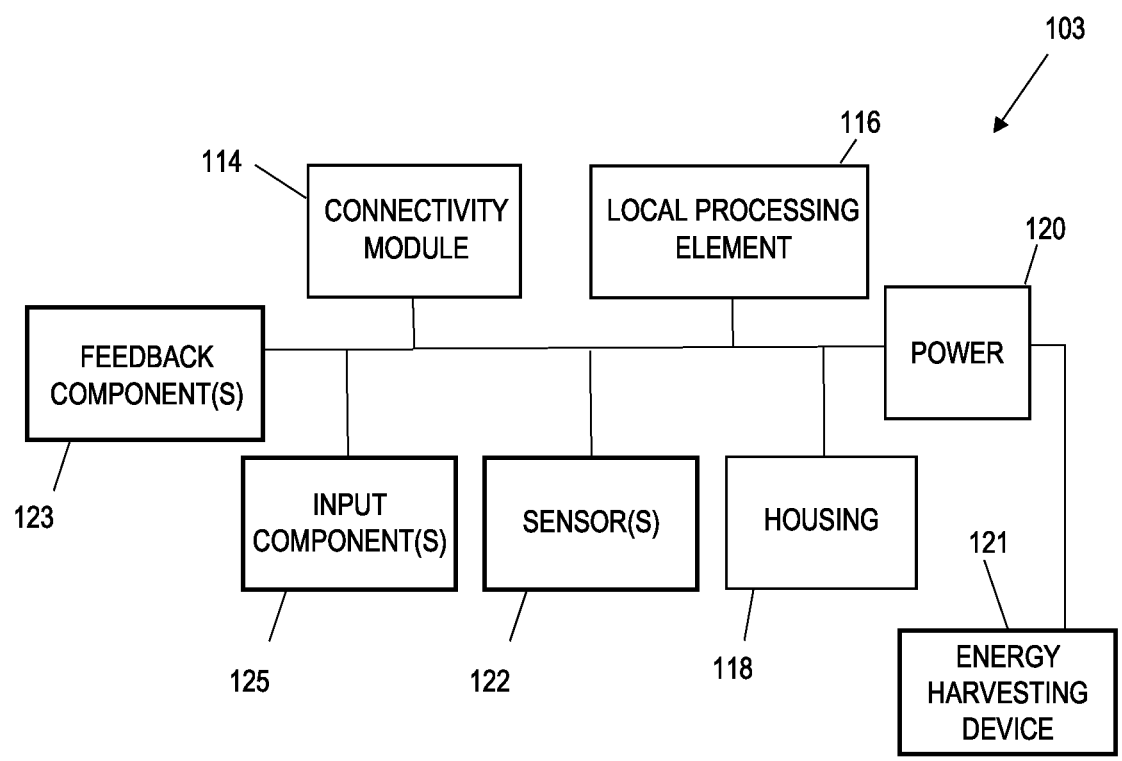
FIG. 2 is a simplified block diagram of an exemplary safety device that can be used with the safety system of FIG. 1.

FIG. 2 is a simplified block diagram of an exemplary safety device 103 that can be used with the system of FIG. 1. As shown, the safety device 103 may include a housing 118, a connectivity module 114, a local processing element 116, and a power source 120. In several embodiments, the connectivity module 114 transmits and receives safety-related data to and from other entities (e.g., other safety device(s) 102 and/or automotive vehicle connectivity device (s) 104).

Figure 3:
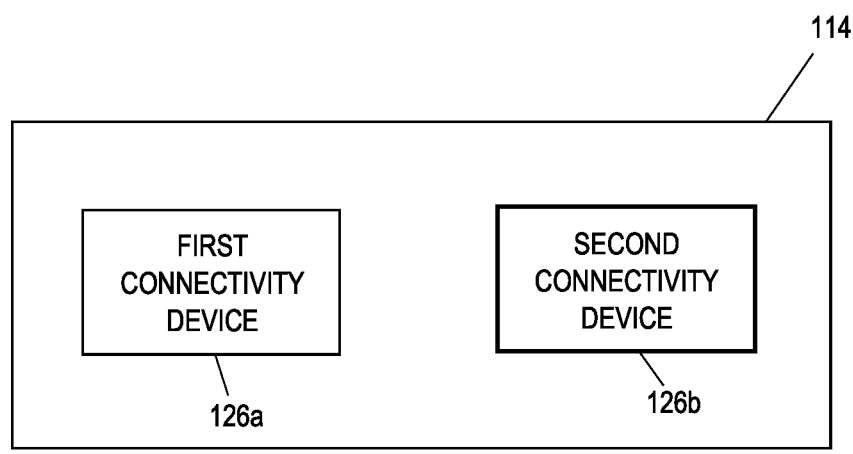
FIG. 3 is a simplified block diagram of an exemplary connectivity module of the safety device of FIG. 2.

FIG. 3 is a simplified block diagram of an exemplary connectivity module 114. As shown, the connectivity module 114 may include one or more connectivity devices or modules 126a,b, such as a first connectivity device or module 126a and a second connectivity device or module 126b. The one or more connectivity devices or modules 126a,b may include one or more of a V2X chipset or modem (e.g., a C-V2X chip), a Wi-Fi modem, a Bluetooth modem (BLE), a cellular modem (e.g., 3G, 4G, 5G, LTE, or the like), an ANT+ chipset, and the like. In some embodiments the one or more connectivity devices or modules 126a, b may include a UU interface (e.g., implementing communication between entities via a cloud or server) and/or a PC5 interface (e.g., implementing direct communication between entities with reduced latency).

Returning to FIG. 2, the connectivity module 114 may be coupled to a local processing element 116 and positioned inside the safety device housing 118. The safety device housing 118 may be compact or minimized to minimize weight and bulkiness of the safety device 103 on a light mobility vehicle. In some embodiments, the safety device housing 118 is omitted, for example, when the safety device is positioned inside a battery housing or other light mobility component housing, as discussed in more detail in the PCT Applications. In some embodiments, the local processing element 116 is omitted and processing of safety-related data is executed by an external processor (e.g., server 108). In some embodiments, the safety device 103 may include more than one processing element. In these embodiments, the processing elements may or may not be in communication with one another.

The local processing element 116 may receive safety-related data (e.g., from the connectivity module 114) and determine whether the safety-related data is relevant or poses a threat. For example, a threat may be detected if the local processing element 116 determines trajectories of two entities will cross causing a collision. For example, if the trajectory of the road user of the safety device is straight and an entity is projected to turn right, the processing element may detect a threat and transmit an alert. As an example, the entity's right turn data may be received from a car sensor detecting a car blinker right turn signal.

In the depicted embodiment, the safety device 103 includes a power source 120. The power source 120 may be a battery. For example, the battery may be a lithium ion battery. The battery may have a 7 to 14 hour run time. The battery may include a battery save mode to conserve power. The power 120 may be turned on by a power on button on an outer surface of the housing 118 of the safety device 103. In some embodiments, the power source 120 may be omitted and the safety device 103 may be powered by an external power source. For example, the safety device 103 may be powered by an electronic battery of an electric light mobility vehicle, as discussed in more detail in the PCT Applications.

In some embodiments, the safety device 103 may include an energy harvesting or scavenging device 121. Energy harvesting also known as power harvesting or energy scavenging is a process by which energy is captured and stored. Energy harvesting makes it possible to drive an electrical system without the necessity of a stored power source, such as a battery, or to replenish the power source to drive the electrical system. Energy harvesting systems conventionally use thermal electricity or mechanical vibrations which are converted to electric energy. The energy harvesting device 121 may be coupled to the power source 120. The energy harvesting device 121 may create electrical power output to replenish electrical power stored by the power source 120. The energy harvesting device 121 may capture energy from light, vibration, thermal (e.g., from exhaust), mechanical (e.g., from rotation of light mobility vehicle tires or pedals), piezoelectric, electromagnetic, triboelectric, or biological sources and convert the energy into electricity to power the safety device 103 and its components or to provide additional power to the power source 120. The energy harvesting device 121 may include, for example, one or more photovoltaic or solar cells, piezoelectric devices, electromagnetic devices, triboelectric devices, and the like.

The energy harvesting device 121 may include components that are part of a charging circuit that includes the power source 120. In response to a motive force applied to at least one of the components, the components may interact with one another to generate electrical power. The electrical power may be transferred via the charging circuit to replenish the electrical power stored within the power source 120. As one example, the energy harvesting device 121 may include a coil containing a floating mass that vibrates to generate energy. For example, an electrical coil may include one or more linearly moving or rotating magnets positioned within an inner passage of the coil. In operation, as the safety device 103 moves or shakes (e.g., via movement of the light mobility vehicle it is coupled to), the one or more magnets may move through the coil inner passage or rotate/spin via a rotational axle (e.g., due to airflow through the coil), creating a current along the windings of the electrical coil, which can be converted into stored electrical power. An electrically conductive material may be provided between the electrical coil and the power source 120, creating a charging circuit to replenish electrical energy within the power source 120. It is contemplated that a plurality of magnets may move or rotate within the inner passage of the coil. The magnets may be arranged with like polarities oriented in a like direction causing the magnets to move in opposite directions. Similarly, the magnets may be arranged with like polarities oriented in opposite directions causing the magnets to move in parallel to each other.

In some embodiments, the energy harvesting device 121 may generate electrical power by harvesting mechanical energy. For example, the energy harvesting device 121 may include components that generate electrical energy from rotational motion. For example, a component may be biased against a wheel of the light mobility vehicle and may rotate based on rotation of the wheel. The component may rotate other components of the energy harvesting device 121 to generate electrical energy. For example, one of the components may be coupled to electrical contacts connected to a cable that is connected to the safety device 103 or its components and transfer the electrical energy, via the electrical contacts, through the cable to the safety device 103 or its components.

The energy harvesting device 121 may extend the life of the power source 120. This may be particularly beneficial where the safety device 103 is integrated into the frame of a light mobility vehicle or otherwise coupled to the light mobility vehicle in a manner that presents challenges to charging or replacing the safety device 103. It is contemplated that the energy harvesting device 121 may be coupled to the safety device 103 housing 118 (e.g., a solar cell on an external surface of the housing 118) or may be positioned inside the housing 118. In some embodiments, the energy harvesting device 121 is omitted from the safety device 103. The energy harvesting device 121 may be a separate device coupled to the safety device 103. For example, the energy harvesting device 121 may be positioned on a separate component of a light mobility vehicle apart from the safety device 103 (e.g., on a tire, a pedal, an exhaust pipe, handlebars, a frame component, a seat post, etc.). It is contemplated that the energy harvesting device 121 may provide power directly to components of the safety device 103 (e.g., in addition to the power source 120 or if the power source 120 is omitted). For example, the energy harvesting device 121 may provide power to the one or more sensors 122.

As shown, the one or more sensors 122 may be integrated with the safety device 103. As a non-limiting example, the safety device may include a C-V2X chip in communication with one or more GPS sensors. It is contemplated that the one or more sensors 122 may be separate from the safety device 103 and in communication with the connectivity module 114 and/or processor. For example, the safety device 103 may pair with one or more sensors 122, e.g., with one or more cameras, via a communication protocol (e.g., BLE). It is contemplated that the one or more sensors 122 may be combined into a single sensor device. As an example, a single sensor device may include an accelerometer, magnetometer, gyroscope, altimeter, and/or temperature sensor. As another example, a sensor device may include a camera and radar. In this example, the camera and radar my collect similar safety-related data (e.g., object data), which may be aggregated and analyzed to determine accurate safety-related data. The one or more sensors 122 may enable the safety device 103 to detect position, velocity/speed, trajectory, heading/orientation, objects, and the like.

In some embodiments, the safety device 103 includes one or more feedback components 123 (also referred to as an output device herein) for providing feedback to a user, e.g., alerts of safety risks and/or safe actions, including, for example, collision probability or proximity, distance, path, etc. of other entities. The one or more feedback components 123 may provide feedback to the user of the safety device 103 or to other entities. The one or more feedback components 123 may include components configured to provide visual, haptic, and/or audible feedback. For example, the one or more feedback components 123 may include one or more of a display/GUI, light/LED, haptic device, sound device/speaker, indicator (e.g., battery charge indicator), reflector, and the like. As an example, a speaker may be acoustically tuned and provide directional audio. A sound device may include a bell or horn. The one or more feedback components 123 may vary based on the direction of a threat. For example, a light may flash on or a sound may be emitted from a left side of the safety device 103 to indicate a threat from the left and a light may flash on or a sound may be emitted from a right side of the safety device 103 to indicate a threat from the right.

The one or more feedback components 123 or output devices may operate in a feedback loop, where the feedback output by these components may be adjusted or otherwise modified. For example, an alert may be transmitted by the one or more feedback components 123 indicating a threat. The one or more feedback components 123 may receive user input (e.g., via a user pressing a button or providing a voice command) indicating the threat is incorrect or no longer present. The one or more feedback components 123 may turn the alert off or otherwise remove the alert based on the user input. The safety device 103 may learn from the incorrect threat detection to modify its threat detection algorithm and/or transmit data related to the threat no longer being present to the server to inform other users/entities of the same. Additionally or alternatively, the one or more feedback components 123 may receive safety-related data from the one or more sensors 122 or the connectivity module 114 and may override user input and keep the alert on or re-transmit the alert.

As another example, the one or more feedback components 123 may receive safety-related data from the one or more sensors 122 or the connectivity module 114 and determine that the threat is mitigated or gone and remove the alert based on the safety-related data. For example, the one or more feedback components 123 may receive a braking signal from a brake sensor indicating that the rider is braking and determine that the threat is mitigated or gone. As another example, the one or more feedback components 123 may receive sensor data (e.g., image data from a camera) and determine that the threat is gone and remove the alert. As yet another example, the connectivity module 114 may no longer receive entity data (e.g., because the entity is out of range of the C-V2X modem) and may transmit this information to the one or more feedback components 123, which determine that the threat is gone and remove the alert. While the above examples are discussed with respect to the feedback components 123, it is contemplated that the local processing element 116 may perform the logic (e.g., receiving user input or safety-related data and determining a threat is mitigated or gone) and transmit a signal to the feedback components 123 to turn off or remove the alert.

In some embodiments, the safety device 103 includes one or more input components 125 that enable a user to provide input to or to control the safety device 103. For example, the one or more input components 125 may include one or more of a display/GUI, a microphone, buttons (e.g., power on button), switches, remote controls, charging ports (e.g., USB charging ports), and the like. For example, the display may be a capacitive or resistive touch screen, or may include both capacitive and resistive elements. As an example, a resistive touch screen may allow the display to be used with a glove. As another example, a microphone may be acoustically tuned and include noise cancelling functionality.

It is contemplated that the one or more input components 125 or feedback components 123 may be separate from the safety device 103 and in communication with the safety device 103 (e.g., the local processing element 116) (e.g., a light in communication with the safety device 103, a display on a user device, third-party devices such as ear buds or smartwatches, haptic feedback elements integrated into a light mobility vehicle component such as handlebars, seat, helmet, etc.). For example, the safety device 103 may pair with one or more feedback components, e.g., an external display, via a communication protocol (e.g., BLE). In some embodiments, the one or more input components 125 and/or one or more feedback components 123 are coupled to a dedicated user device (or other user device such as a smartphone) and/or sensor device described herein.

In several embodiments, one or more safety device components are coupled to one or more printed circuit boards (PCBs). For example, one or more of the one or more connectivity modules, the one or more processors, and the one or more sensors may be coupled to one or more PCBs. The one or more printed circuit boards may include one or more antennas for transmitting signals from and to the one or more connectivity modules and/or from and to the one or more sensors. It is contemplated that the one or more antennas may be separate from the one or more PCBs and in communication with the one or more connectivity modules and/or the one or more sensors (e.g., via wired or wireless connections). The one or more antennas may include commercial off-the-shelf (COTS) antennas, Laser Direct Structuring (LDS) antennas, GNSS antennas (e.g., GPS antennas), LTE antennas, BLE antennas, C-V2X antennas, Wi-Fi antennas, and the like. An antenna described herein may be a specialized antenna. A specialized antenna is any antenna used with the safety device that is modified for this specific application. For example, the antenna may be modified in some way, including modifications to its shape, size, location, sturdiness, durability, and the like. For example, an antenna may be reduced in size to fit the form factor of the safety device. The one or more printed circuit boards may further include the safety device processor coupled to the one or more connectivity modules. It is contemplated that the components of the safety device may be positioned on one printed circuit board or on a plurality of printed circuit boards that are wired or wirelessly connected. It is contemplated that the components of the safety device may be wirelessly connected by various means, including for example LORA, UWB, ZigBee, Matter, and Bluetooth.

The safety device components may be coupled to one another by various connectors or buses. For example, safety device components may be coupled to one another by a Controller Area Network (CAN) bus. Safety device components may be coupled by wires, cables, wirelessly, etc. As discussed below, safety device components may be coupled by a power cable associated with an electric light mobility vehicle battery.

In some embodiments, the local processing element 116 may selectively turn on and off different features of the safety device 103 to conserve power output by the power source 120 or by an external power source (if applicable). For example, if the local processing element 116 determines that or receives data indicating that the safety device 103 is part of a group, the local processing element 116 may determine certain features of the safety device 103 are redundant or non-relevant based on the safety device's 103 location or position within the group and/or data available from other safety device(s) in the group. The local processing element 116 may turn off such features to save power. For example, the local processing element 116 may turn off an associated camera if the field of view of the camera is directed towards other members of the group or if similar or the same image data is available from a camera associated with another safety device in the group. For example, if the local processing element 116 determines the safety device 103 is at the center of the group, the local processing element 116 may turn associated camera(s) off; however, if the local processing element 116 determines the safety device 103 is at the front of the group, the local processing element 116 may keep an associated front camera on (and may turn off an associated back camera). In some embodiments, the local processing element 116 may transmit messages to other safety devices (or user devices, as applicable) in a group to power their features on or off based on the availability of data to the local processing element 116. For example, if the local processing element 116 determines the safety device 103 is at the front of the group and is capable of capturing image data in front of the group, the local processing element 116 may transmit a message to other safety devices in the group to turn off any associated front cameras. It is contemplated that the local processing elements of the other group devices may make this determination as to which devices, or components thereof, to turn on and off based on their own determined positions within the group.

Figure 4:
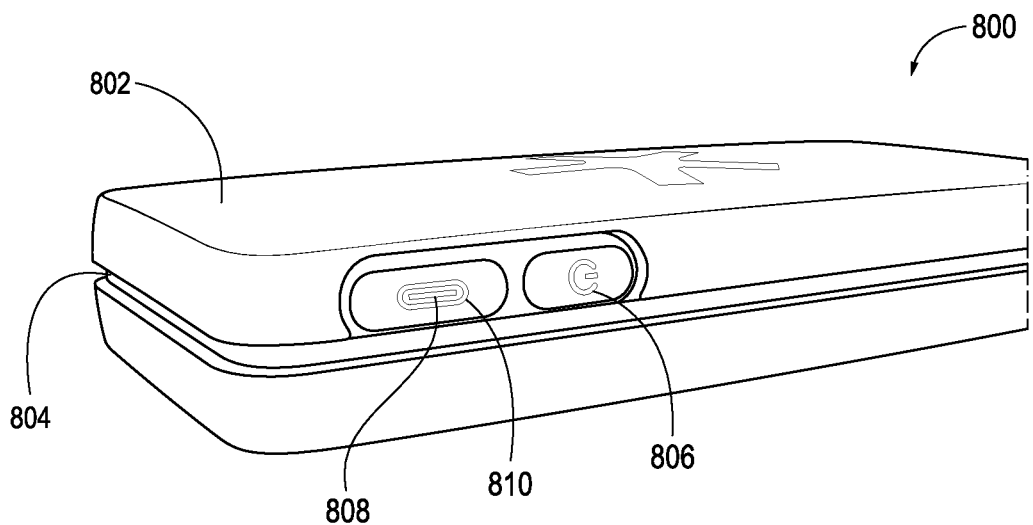
FIG. 4 is an image of an exemplary safety device that can be used with the system of FIG. 1.

FIG. 4 shows an image of an exemplary safety device 800. As shown, the safety device 800 includes a housing 802, a light 804, an ON/OFF button 806, and a power input 808. The housing 802 has a rectangular-shaped form factor. The light 804 is recessed in the housing 802. As shown, the light 804 is recessed around the sides of the housing 802. For example, the light 804 may be an LED strip. The light 804 may be selectively turned on and off and varied in intensity or frequency of flashing to transmit an alert and message to a user (e.g., indicative of a threat). The light 804 may also function as an anti-theft mechanism. For example, the light 804 may be turned on or flash with a certain intensity and frequency when the light mobility vehicle is moved. It is contemplated that the light 804 positioning may be varied and that the light 804 may be omitted. As shown, the ON/OFF button 806 is positioned on a side of the housing 802 allowing the safety device 800 to be turned on or off, e.g., to conserve power or disconnect the safety device 800 (and user) from other entities. The power input 808 may be positioned on a side of the housing 802. The power input 808 may be configured to power a battery positioned inside the housing 802. The power input 808 may be a USB port. For example, the safety device 800 may be coupled to an external battery via the power input 808. It is contemplated that the USB port may also be used to extract data from the safety device 800 (e.g., for servicing or collecting stored data locally). As shown, the power input 808 has a cover 810 to protect the power input 808 from debris and damage. The safety device 800 may be waterproof. For example, the cover 810 may include a waterproof seal to prevent water from entering the power input 808. The safety device 800 may be a single component, preventing water from leaking through cracks or edges of the safety device 800. In these embodiments, the cover 810 and/or ON/OFF button 806 may be separate components and may include waterproof seals to prevent water from entering the safety device 800.

Figure 5:
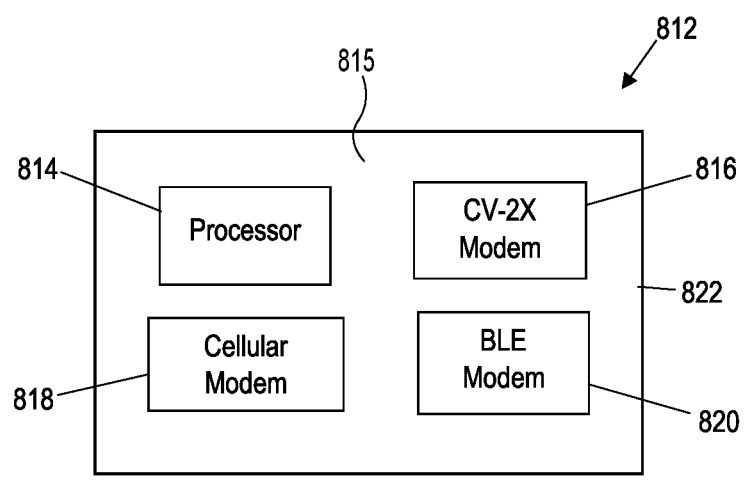
FIG. 5 is a simplified diagram of exemplary safety device hardware architecture of a safety device that can be used with the system of FIG. 1.

FIG. 5 is a simplified diagram of exemplary safety device hardware architecture 812 of a safety device described herein, e.g., of safety device 103 or safety device 800. As shown, the safety device hardware architecture 812 includes a printed circuit board 815, a processor 814, a C-V2X modem 816, a cellular modem 818, and a Bluetooth Low Energy (BLE) modem 820. The processor 814 and modems 816, 818, 820 are positioned within a housing 822. The processor 814 and modems 816, 818, 820 may be conventional devices and may be selected based on the form factor and desired power capabilities of the safety device. An exemplary processor 814 is a Qualcomm® SA2150P application processor. As discussed in more detail below, the processor 814 may execute local or edge processing for the safety device, enabling the safety device to aggregate, store, analyze, and learn from safety-related data received (e.g., received by one or more of the modems 816, 818, 820). An exemplary C-V2X modem 816 may be Quectel C-V2X AG15 or Qualcomm® C-V2X 9150. The C-V2X modem 816 may communicate with other C-V2X modems within a short distance (e.g., to transmit and receive position data approximately 10 times per second). An exemplary cellular modem 818 may be an LTE or 4G modem. As an example, the cellular modem 818 may be Quectel EG95 or BG95. The cellular modem 818 may enable the safety device to transmit and receive information from the one or more servers 108, which may be used by the processor 814. An exemplary BLE modem 820 is a Nordic® nRF52. The BLE modem 820 may enable the safety device to communicate with other local devices (e.g., a local sensor device or user device as described with respect to FIGS. 22 and 23) or other nearby devices (e.g., one or more safety devices or user devices in a group, as described in more detail below).

While certain embodiments of the safety device are depicted in the figures, various other embodiments of the safety device are contemplated. The safety device may include one or more connectivity devices, processors, sensors, feedback components, input components, and power sources. In some embodiments, the safety device includes a C-V2X module and LTE module. The safety device may include an external antenna. In these embodiments, the safety device may further include one or more of Wi-Fi, BLE, ANT+, and CAN bus. The safety device may include one or more speakers, USB ports, indicators (e.g., battery charge indicator), sensors, and lights (e.g., LEDs). The safety device may include a power source (e.g., battery). The safety device may include a power on button to turn on the power source. In some embodiments, the power source is omitted. The safety device may further include a microphone.

In some embodiments, the LTE module may be omitted from the safety device. For example, the safety device may include a C-V2X module. In these embodiments, the safety device may further include BLE and/or Wi-Fi. The safety device may include one or more speakers, USB ports, indicators (e.g., battery charge indicator), sensors, and lights (e.g., LEDs). The safety device may include a power source (e.g., battery). The safety device may include a power on button to turn on the power source. In some embodiments, the power source is omitted. The safety device may further include a microphone.

In some embodiments, the safety device may include a camera and/or light. For example, the safety device may include a C-V2X module, an LTE module, a camera, and a rear light. The camera (or other sensor therein) may have object detection functionality or such functionality may be omitted. In these embodiments, the safety device may further include one or more of Wi-Fi, BLE, and ANT+. The safety device may include one or more speakers, micro-phones, USB ports, indicators (e.g., battery charge indicator), sensors, and lights (e.g., LEDs). The safety device may include a power source (e.g., battery). The safety device may include a power on button to turn on the power source. In some embodiments, the power source is omitted. The safety device may be positioned under a seat of the light mobility vehicle (e.g., on the seat post) such that the camera is rear-facing. The safety device may be positioned on a front side of the light mobility vehicle (e.g., handlebars) such that the camera is forward-facing. In some embodiments, the safety device may also include radar to provide greater accuracy to object detection performed by the camera.

In some embodiments, the camera may be omitted from the safety device. In some embodiments, the safety device may include a C-V2X module, an LTE module, and a light. In some embodiments, the safety device may include an LTE module and a light. In some embodiments, the safety device may include a C-V2X module and a light. In some embodiments, the safety device may include one or both of an LTE module and C-V2X module and radar.

In several embodiments, the safety device receives safety-related data directly from one or more entities in a short-distance range (e.g., within several hundred meters, e.g., 300 meters). For example, the safety device may communicate with the one or more entities via C-V2X communication protocol. As an example, the safety device and the one or more entities may share basic safety messages (BSM) via the C-V2X communication protocol (e.g., via a PC5 interface). Additionally or separately, the safety device may receive safety-related data indirectly or via a network/cloud/server (e.g., via a UU interface). For example, the safety device may exchange safety-related data with one or more entities via a cellular network (e.g., LTE). The safety device may switch from a cellular network (e.g., LTE) (or from a UU interface) to C-V2X protocol (or to a PC5 interface) when entities are within a short-distance range (e.g., within 300 meters) to reduce latency in data exchange (as latency can occur when data is exchanged via the cellular network).

Figure 6:
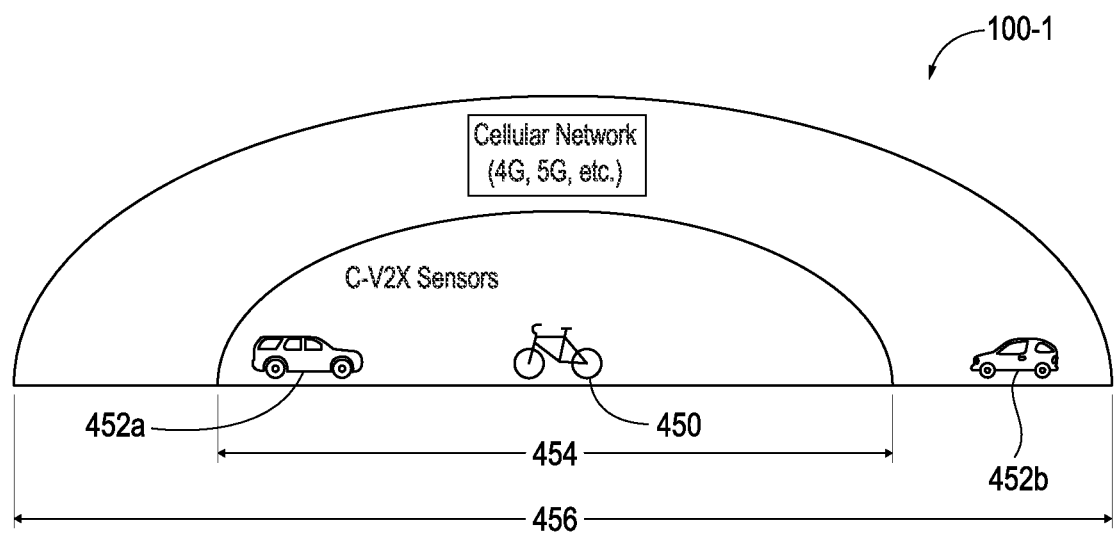
FIG. 6 is an illustration of short-distance range and long-distance range capabilities of the system of FIG. 1.

FIG. 6 shows an illustration of an exemplary safety system 100-1 that employs such system architecture. As shown, the system 100-1 includes different communication protocols that operate within different distances relative to a smart bicycle 450 (i.e., a bicycle with a safety device described herein). As shown, data is transmitted and received via C-V2X sensors within a short-distance range 454, and data is transmitted and received via a cellular network (e.g., 4G or 5G) within a long-distance range 456. In the depicted example, a smart bicycle 450 includes a C-V2X chip and a GPS sensor. The GPS sensor calculates the position of the smart bicycle 450 and sends this entity data to the C-V2X chip, which operates within a short-distance range 454 to transmit the entity data collected from the GPS sensor to another vehicle within the short-distance range (e.g., to a compatible vehicle connectivity device of the first vehicle 452a) and to receive entity data from another vehicle (e.g., from a compatible vehicle connectivity device) within the short-distance range 454, such as the first vehicle 452a. When a vehicle is outside the short-distance range 454 and within a long-distance range 456, such as the second vehicle 452b, entity data is no longer received and transmitted via the C-V2X chip, rather, entity data (e.g., as determined by a GPS sensor associated with the second vehicle 452b) is received by the smart bicycle 450 via a cellular network (e.g., 4G, 5G, LTE, etc. network). When the second vehicle 452b comes within the short-distance range 454 relative to the smart bicycle 450, the smart bicycle 450 can detect the relative location of the second vehicle 452b based on the information received via the C-V2X chip. By using the C-V2X chip to detect vehicles within the short-distance range 454, latency in data exchange between the vehicles is reduced such that real-time collisions can be avoided as the vehicles move closer to one another.

Figure 7A:
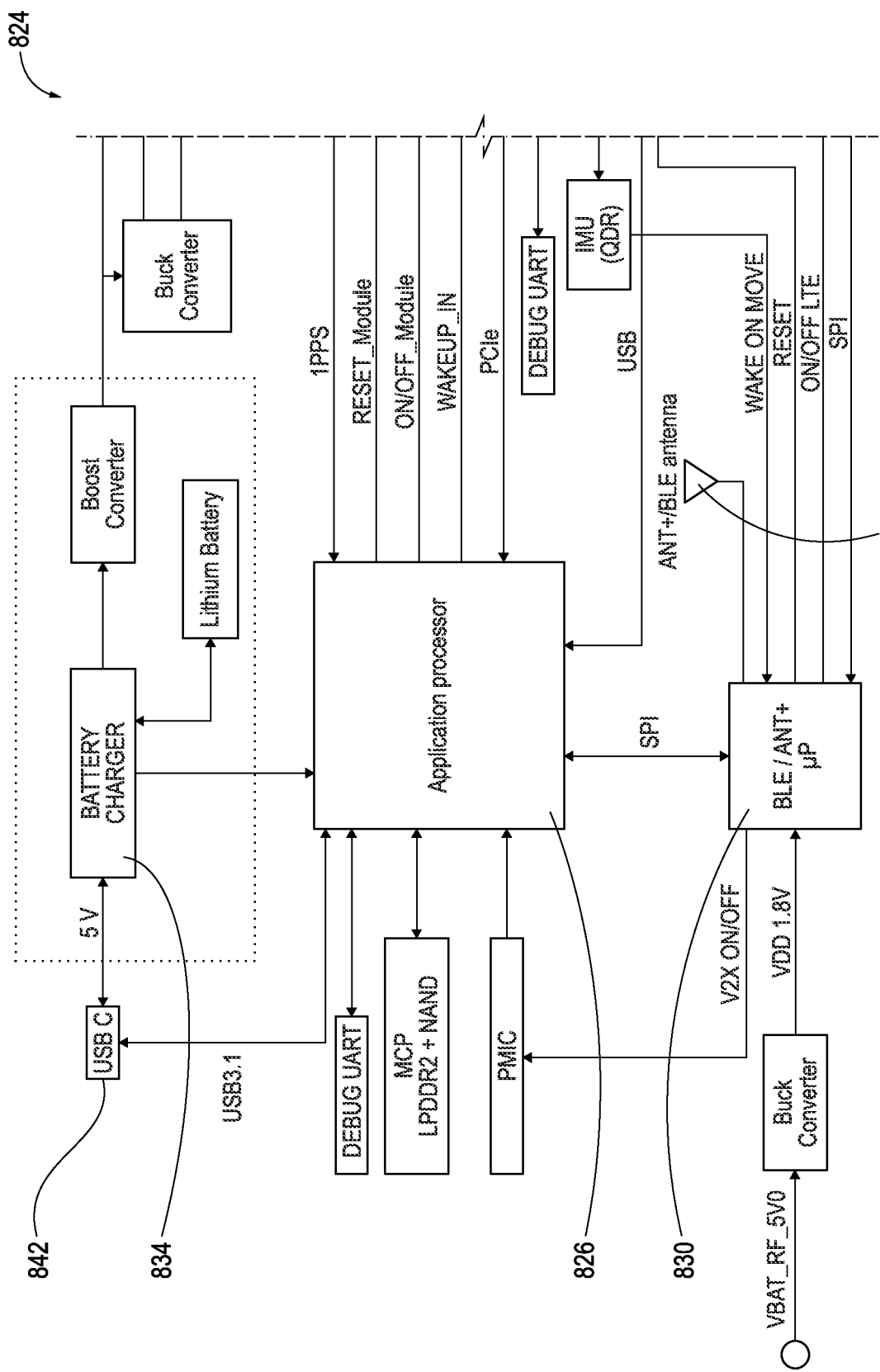
FIGS. 7A-B show a diagram of exemplary safety device hardware architecture of a safety device that can be used with the system of FIG. 1.
Figure 7B:
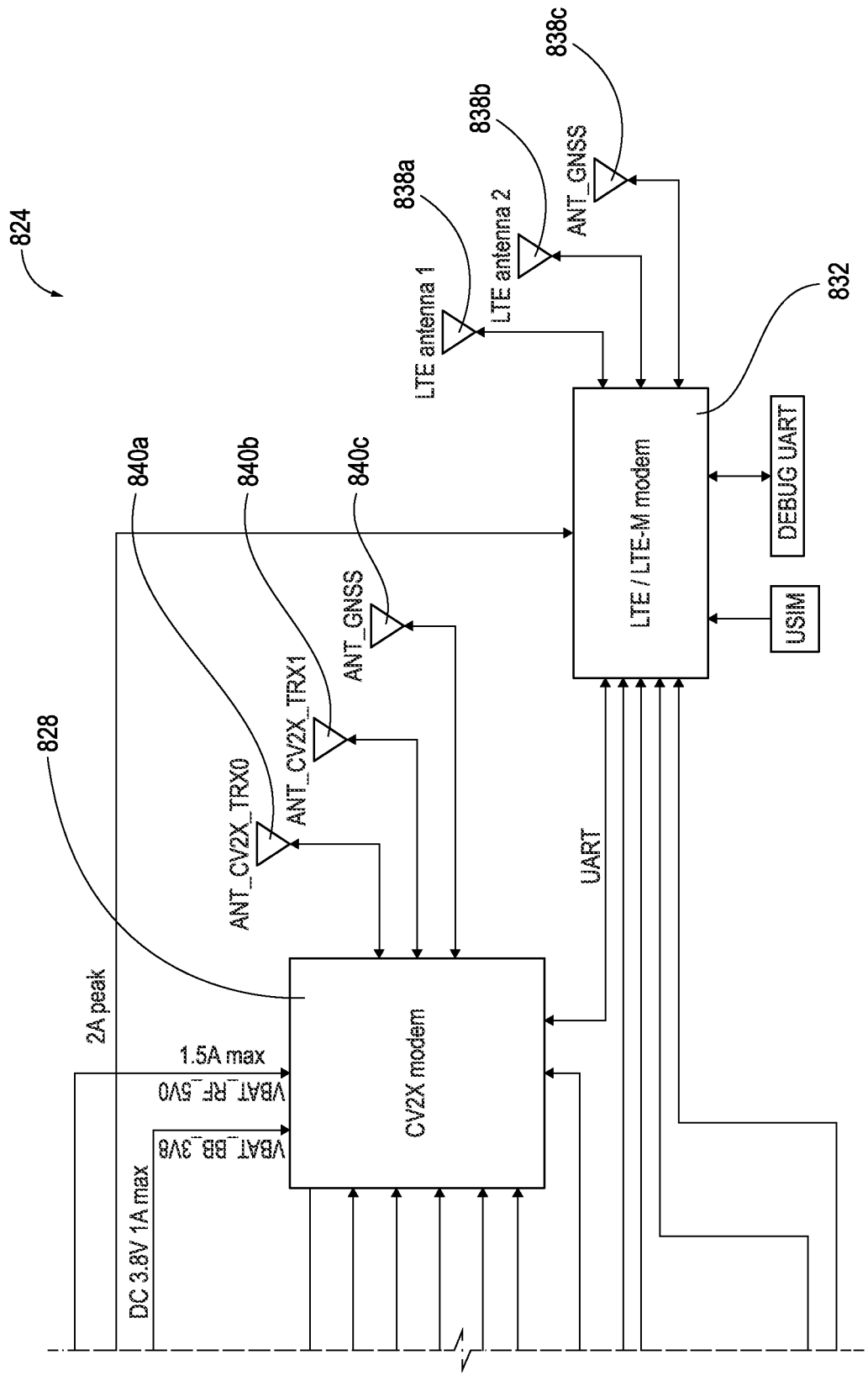

FIGS. 7A-B show a diagram of exemplary safety device hardware architecture 824. FIG. 7B is the right side continuation of the hardware architecture 824 diagram shown in FIG. 7A. As shown, the safety device hardware architecture 824 includes an application processor 826, a C-V2X modem 828, a BLE/ANT+ microprocessor 830, and a cellular modem 832 (e.g., LTE/LTE-M), and a battery 834. The C-V2X modem 828, BLE/ANT+ microprocessor 830, and cellular modem 832 are coupled to one or more antennas. The antennas may be located in an area of the safety device that is selected to reduce interference and conform to the form factor of the safety device. As shown, the BLE/ANT+ microprocessor 830 is coupled to a BLE/ANT+ antenna 836, the cellular modem 832 is coupled to three cellular (LTE) antennas 838a,b,c, and the C-V2X modem 828 is coupled to three C-V2X antennas 840a,b,c. One or more antennas may be positioned within the housing 852. In the depicted embodiment, the architecture 824 includes a USB port 842 for charging the battery 834. It is contemplated that the safety device hardware architecture 824 may include one or more sensors 122 (e.g., a GPS, camera, light, microphone, IMU, etc.). It is contemplated that the one or more components discussed with respect to FIGS. 7A-B may be positioned on or coupled to a printed circuit board (PCB). For example, the PCB may include one or more of the connectivity modules (e.g., cellular modem 832 or C-V2X modem 828), one or more sensors 122, one or more processors (e.g., application processor 826 and microprocessor 830), and one or more antennas.

Dedicated User Devices

As discussed with respect to the system 100 of FIG. 1, the one or more user devices 106 may include a dedicated user device. A dedicated user device may include one or more processing elements, one or more connectivity modules, one or more input components, one or more output components, one or more sensors, and one or more feedback components. The one or more connectivity modules may include one or more of a Wi-Fi modem, a Bluetooth modem (BLE), a cellular modem (e.g., 3G, 4G, 5G, LTE, or the like), an ANT+ chipset, and the like. The one or more input components, one or more output components, and/or one or more feedback components may include one or more of a display, a microphone, a speaker, a light, a haptic response, and the like. The display may include local resistive buttons. In some embodiments, the dedicated user device includes a sensor, such as a camera, accelerometer, light sensor, thermometer, etc. The dedicated user device may receive safety-related data, e.g., from a safety device (e.g., associated with the same user or with a user in a group), and display safety-related data on a display graphical user interface. The dedicated user device may be positioned on a front side of the light mobility vehicle, such as on the handlebars, for a user to easily view, hear, or feel feedback output by the dedicated user device (depending on the type of feedback component).

Figure 8:
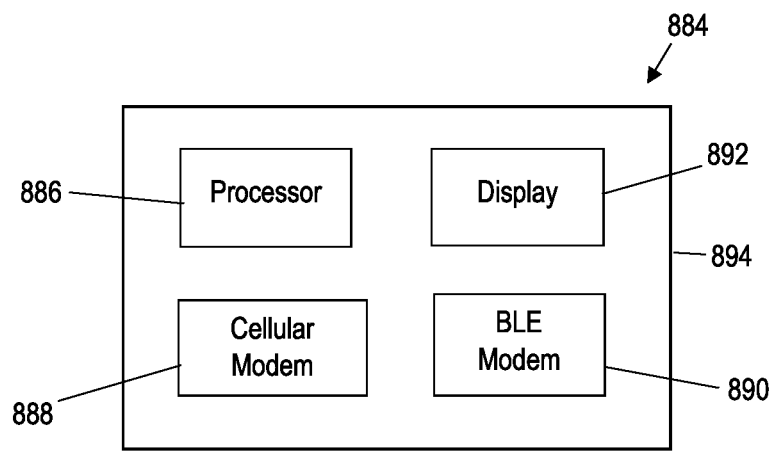
FIG. 8 is a simplified diagram of exemplary dedicated user device hardware architecture of a user device that can be used with the system of FIG. 1.

FIG. 8 is a simplified diagram of exemplary dedicated user device hardware architecture 884 of a dedicated user device described herein. As shown, the user device hardware architecture 884 includes a processor 886, a cellular modem 888, a Bluetooth Low Energy (BLE) modem 890, and a display 892. The processor 886 and modems 888, 890 are positioned within a housing 894 that includes the display 892. The processor 886 and modems 888, 890 may be conventional devices and may be selected based on the form factor and desired power capabilities of the user device. An exemplary processor 886 is a Qualcomm® QCS6125 application processor.

The processor 886 may execute local or edge processing for the user device, enabling the user device to aggregate, store, analyze, and learn from safety-related data received (e.g., received by one or more of the modems 888, 890). It is contemplated that the processor 886 may execute the same or similar functions as safety devices described herein (e.g., execute the methods described herein). For example, the processor 886 may determine (based on sensor data and other data received) entities within proximity, collision probabilities, threats (e.g., actual and anticipated), road/surface hazards, user actions (e.g., to avoid safety risks), group formation/separation/characteristics, entity data, and the like, and transmit notifications and alerts related to the same.

The cellular modem 888 may be an LTE or 5G modem. An exemplary cellular modem 888 is Quectel RG500Q. The cellular modem 888 may enable the user device to transmit and receive information from the one or more servers 108, which may be displayed via the display 892. The cellular modem 888 may enable the user device to communicate with other devices having cellular modems over the network (e.g., vehicles that are not equipped with C-V2X modems). An exemplary BLE modem 890 is a Nordic® nRF52. The BLE modem 890 may enable the user device to communicate with other local devices (e.g., a local sensor device or safety device as described with respect to FIGS. 22 and 23). For example, the BLE modem 890 may enable the user device to communicate with a local or associated safety device, which in turn may communicate with vehicles equipped with C-V2X modems. As such, the user device may be configured to communicate with other vehicle devices that are equipped with different type modems (e.g., a cellular modem or C-V2X modem). In embodiments where a disclosed safety device excludes a cellular modem (e.g., has C-V2X capabilities), the user device and safety device may work together to provide visibility to a user of both entities having cellular connectivity (e.g., via the user device) and entities having C-V2X connectivity (e.g., via the safety device). The display 892 may provide an HMI to relay information to a user (e.g., based on logic executed by the one or more connected devices).

Figure 9A:
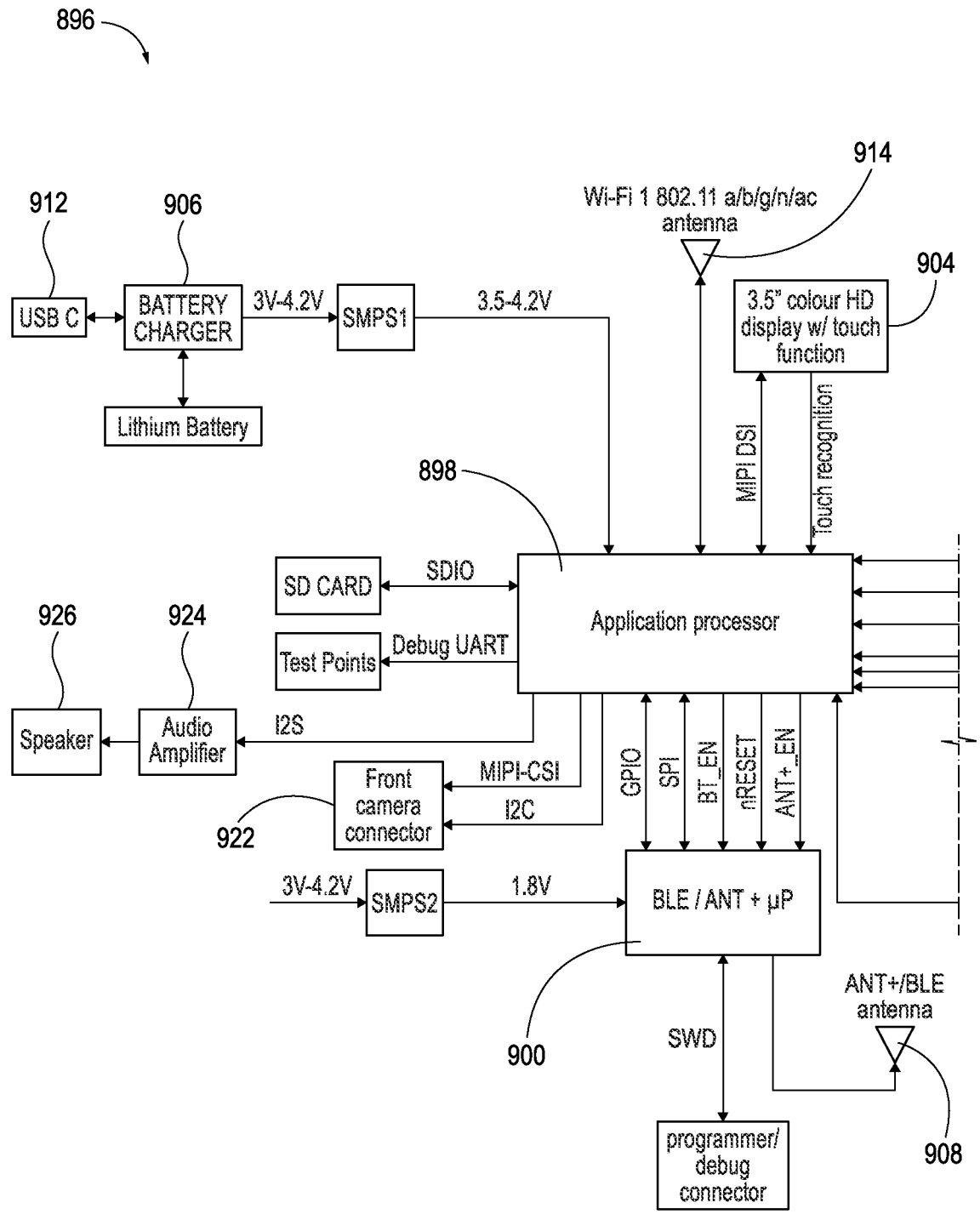
FIGS. 9A-B show a diagram of exemplary dedicated user device hardware architecture of a user device that can be used with the system of FIG. 1.
Figure 9B:
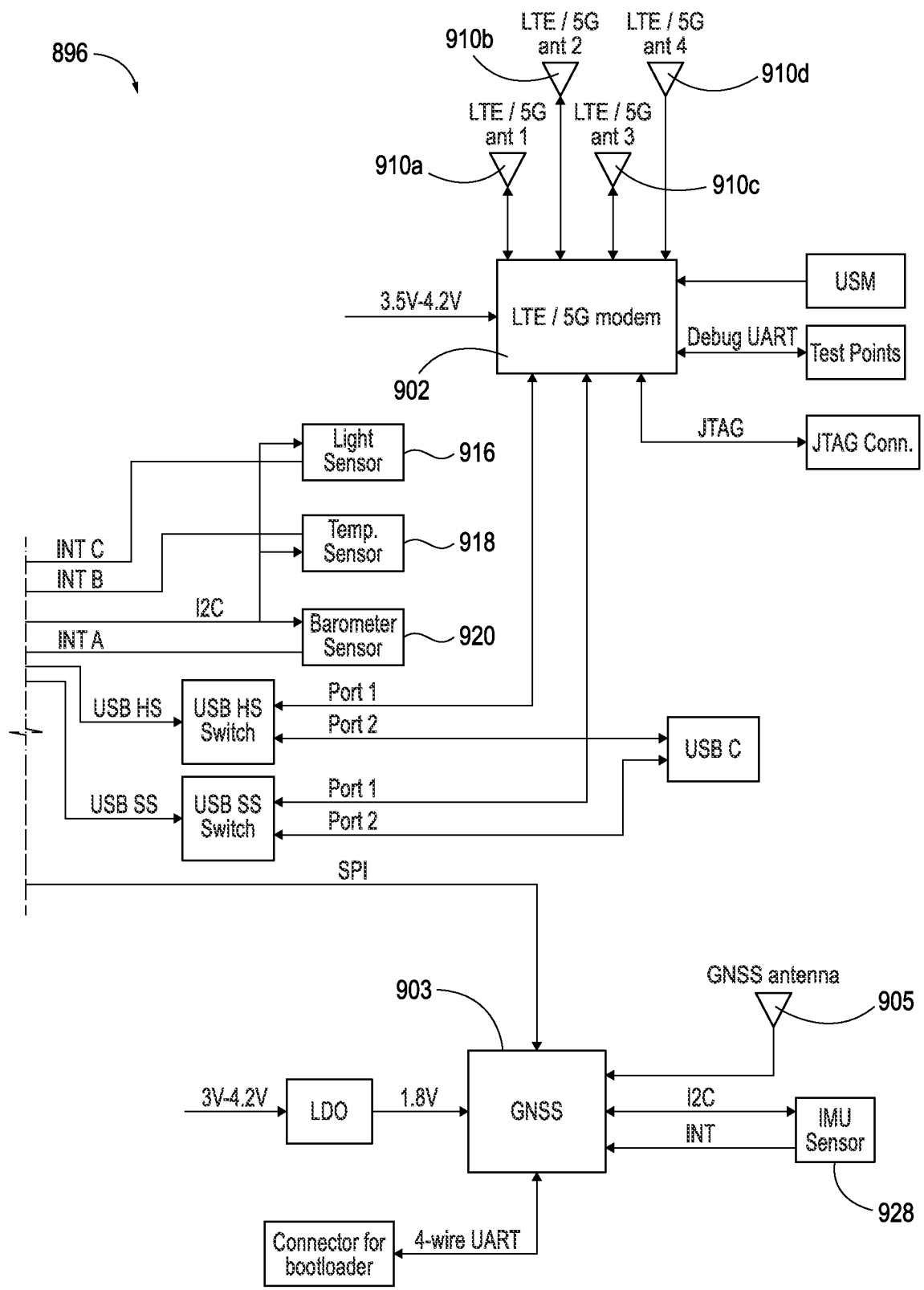

FIGS. 9A-B show a diagram of exemplary dedicated user device hardware architecture 896. FIG. 9B is the right side continuation of the hardware architecture 896 diagram shown in FIG. 9A. As shown, the user device hardware architecture 896 includes an application processor 898, a BLE/ANT+ microprocessor 900, a cellular modem 902 (e.g., LTE/5G), a GNSS receiver 903 (or GPS receiver), a display 904, and a battery 906. As shown, the display 904 may be a 3.5" color HD touch display. The application processor 898, BLE/ANT+ microprocessor 900, cellular modem 902, and GNSS receiver 903 are coupled to one or more antennas. As shown, the application processor 898 is coupled to a Wi-Fi antenna 914, the BLE/ANT+ microprocessor 900 is coupled to a BLE/ANT+ antenna 908, the cellular modem 902 is coupled to four cellular (LTE/5G) antennas 910a,b,c,d, and the GNSS receiver 903 is coupled to a GNSS antenna 905. In the depicted embodiment, the architecture 896 includes a USB port 912 for charging the battery 906.

The application processor 898 is coupled to one or more sensors. As shown, the application processor 898 is coupled to a light sensor 916, a temperature sensor 918, and a barometer sensor 920. The application processor 898 may be coupled to a front camera of the user device or a front camera connector 922, as shown, that is configured to couple with a camera. The application processor 898 is further coupled to an audio amplifier 924, which is coupled to a speaker 926. The speaker 926 may provide audio feedback from the user device. In some embodiments, a microphone may be included to provide audio input of environmental sounds that may be analyzed and interpreted by the application processor 898 (e.g., to determine type of sound such as children playing, gun shots, braking, etc., and whether the sound is a threat).

The GNSS receiver 903 is coupled to an inertial measurement unit (IMU) sensor 928, which may be configured to measure angular rate, force, magnetic field, and/or orientation. It is contemplated that a GPS receiver or other positioning or navigational device may be included to determine positioning, navigation, timing, and location. The 5G/LTE connectivity may enable online navigation. The data received from the light sensor 916, temperature sensor 918, barometer sensor 920, camera (if included), GNSS receiver 903, and IMU sensor 928 may be safety-related data that is received and analyzed by the application processor 898.

A user device and/or a safety device may include a safety application (e.g., as described in the PCT Applications) that executes the methods described herein and in the PCT applications. In some embodiments, two connected devices (e.g., user device, safety device, etc.) executing a safety application may exchange safety-related data (e.g., entity data). The safety application may facilitate the exchange of safety-related data between entities. For example, the safety application may transmit messages between entities that are otherwise unavailable to the entities. As one example, a connected device may provide confirmation of receipt of entity data to the other connected device providing the entity data. For example, a safety device may receive a C-V2X message from another safety device and transmit a message to the other safety device indicating the message was received and/or indicating that action was or will be taken in response to the message. As another example, one entity may transmit an action message to another entity via the respective safety applications. For example, a safety device coupled to a bicycle may determine that the bicycle is about to exit the bike lane onto the street and transmit a message to a safety application associated with a connected device in a car instructing the car driver not to pass.

Sensor Devices

A sensor device may include one or more sensors. In some embodiments, a sensor device may further include one or more connectivity modules. As an example, a sensor device may include a camera and LTE. The sensor device may include one or more feedback components. For example, the sensor device may include a light. In some embodiments, a sensor device may include one or more processors. The sensor device may transmit sensor data to a safety device and/or dedicated user device (e.g., associated with the same user or with a user in a group). As an example, the sensor device may include a camera that transmits image data (e.g., streaming video) to a dedicated user device.

Figure 10:
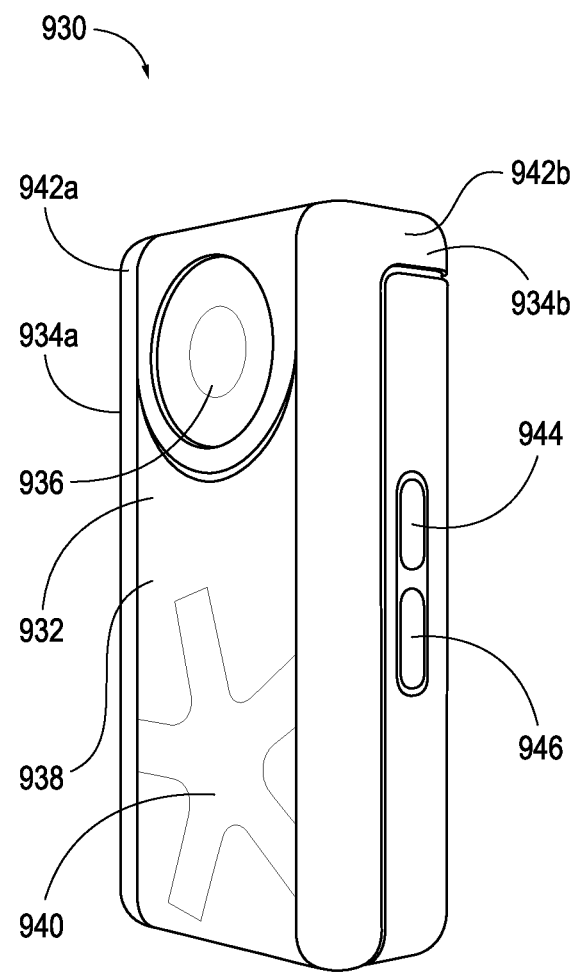
FIG. 10 is an image of an exemplary sensor device that can be used with the system of FIG. 1.

FIGS. 10-13 show exemplary sensor devices and sensor device hardware architecture. FIG. 10 is an image of an exemplary sensor device 930. The sensor device 930 includes a rear surface 932, side surfaces 934*a,b*, and a front surface (surface opposing the rear surface 932). The rear surface 932 may include a camera 936, a reflector 938, and a rear light 940. The side surfaces 934*a,b* may include side lights (e.g., side light 942*b*) and side cameras and/or reflectors (not shown). As shown, the side surface 934*b* also includes an ON/OFF button 944 for powering the sensor device 930 on or off and a power port 946 (e.g., USB port) having a port cover 948. The front surface (not shown) may include a mount interface, e.g., to mount the sensor device 930 to a light mobility vehicle. For example, the mounting interface may be a recess, slot, clip, or the like. The sensor device 930 depicted has a rectangular form factor, but other shapes are contemplated based on the desired positioning of the sensor device 930 on a light mobility vehicle. It is contemplated that one or more of the camera 936, reflector 938, and light 940 may be omitted from or duplicated on the sensor device 930.

Figure 11A:
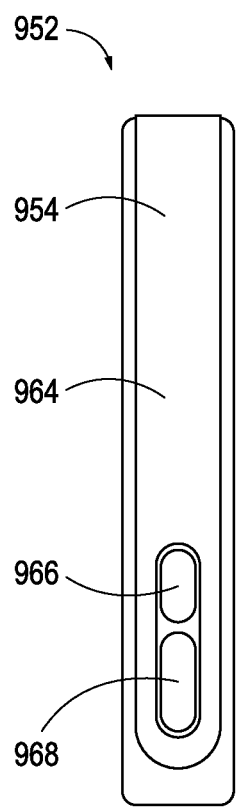
FIGS. 11A-B are images of an exemplary sensor device that omits a camera and can be used with the system of FIG. 1.
Figure 11B:
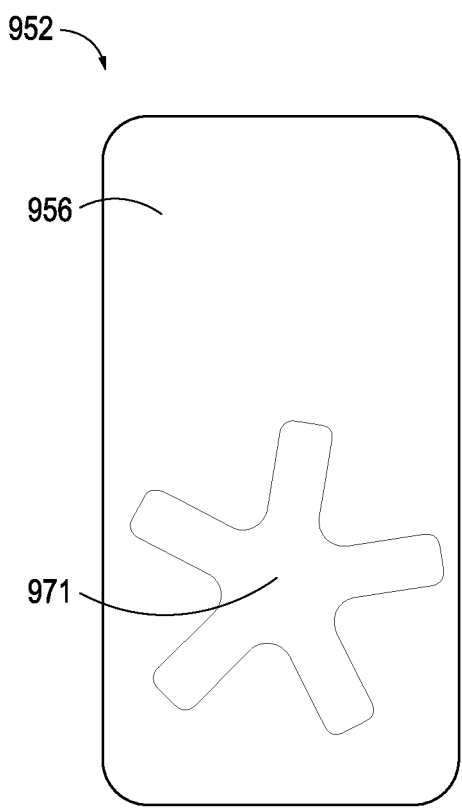

FIGS. 11A-B show images of another exemplary sensor device 952 that omits a camera. FIG. 11A is a rear elevation view of the sensor device 952 and FIG. 11B is a side (right or left) elevation view of the sensor device 952. As shown, the sensor device 952 has a rear surface 954, a side surface 956 (the other side surface not shown is a mirror image), a front surface opposite the rear surface 954, a bottom surface, and a top surface. The rear surface 954 may include a reflective surface 964, an ON/OFF button 966, and a power port 968 (e.g., USB port). It is contemplated that the reflective surface 964 may include a light (e.g., LED lights). The side surface 956 may include a reflector 971 and/or light. The other side surface (not shown) may also include a reflector and/or light. The front surface (e.g., surface opposing the rear surface 954) may include a mount interface, e.g., to mount the sensor device 952 to a light mobility vehicle. For example, the mount interface may be a slot or recess on the front surface.

Figure 12:
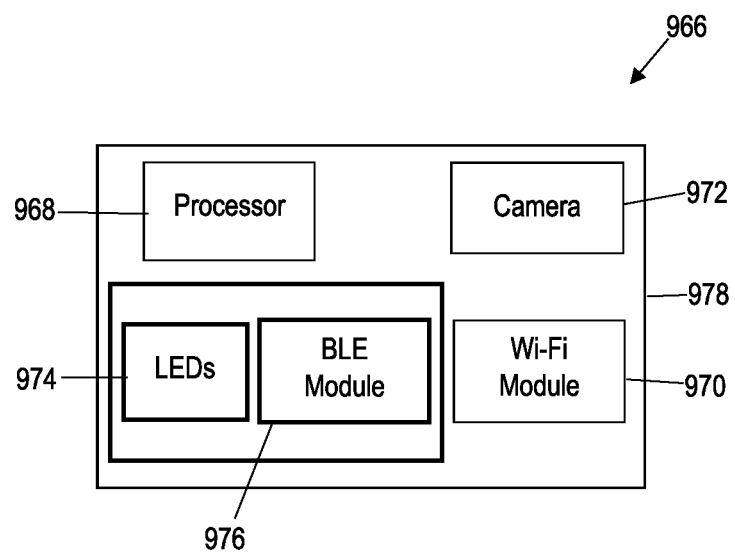
FIG. 12 is a simplified diagram of exemplary sensor device hardware architecture of a sensor device that can be used with the system of FIG. 1.

FIG. 12 is a simplified diagram of exemplary sensor device hardware architecture 966 of a sensor device described herein, e.g., of sensor device 930 or sensor device 952. As shown, the sensor device hardware architecture 966 includes a processor 968, a Wi-Fi module 970, and a camera 972. The sensor device hardware architecture 966 may include LEDs 974 and a BLE module 976 (and include or omit the camera 972). As shown, the processor 968 and Wi-Fi module 970 are positioned within a housing 978 that includes the camera 972. The processor 968 and modules 970, 976 may be conventional devices and may be selected based on the form factor and desired power capabilities of the sensor device. The processor 968 may execute local or edge processing for the sensor device, enabling the sensor device to aggregate, store, analyze, and learn from safety-related data received (e.g., sensor data received by the camera 972). For example, the processor 968 may be configured to execute an image processing algorithm to analyze and categorize object data (e.g., to determine hazards or threats). An exemplary processor 968 may be a DNN application processor, which includes object detection and classification capabilities.

Figure 13:
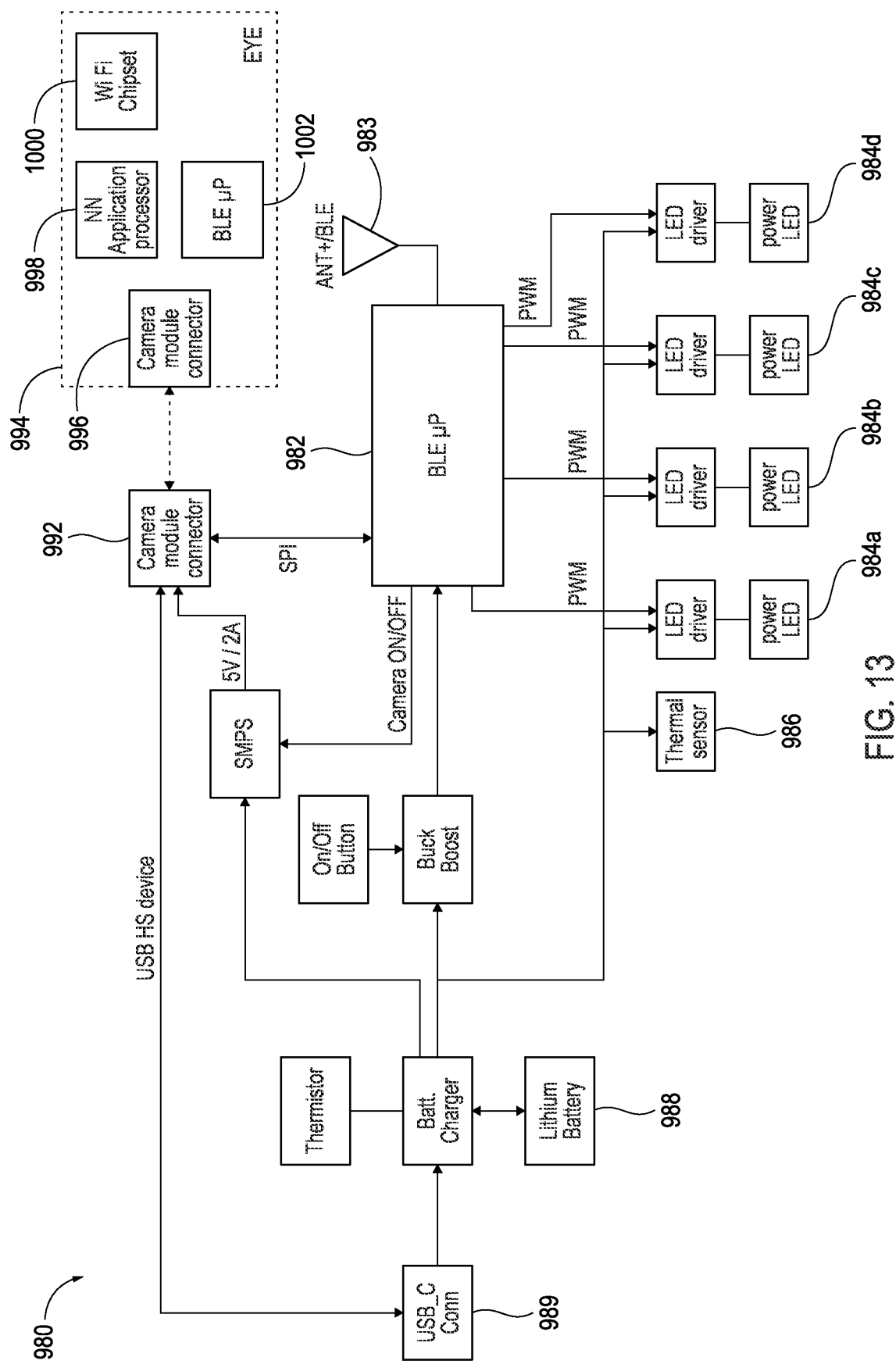
FIG. 13 is a diagram of exemplary sensor device hardware architecture of a sensor device that can be used with the system of FIG. 1.

FIG. 13 is a diagram of exemplary sensor device hardware architecture 980. As shown, the sensor device hardware architecture 980 includes a BLE microprocessor 982, a plurality of LEDs 984*a,b,c,d*, a thermal sensor 986, and a battery 988. The BLE microprocessor 982 may be coupled to an ANT+/BLE antenna 983. In the depicted embodiment, the sensor device hardware architecture 980 includes a USB port 989 for charging the battery 988. The sensor device hardware architecture 980 may include a camera module connector 992. The camera module connector 992 may couple with a camera module 994 via a second camera module connector 996. The camera module 994 may include an application processor 998, a Wi-Fi chipset 1000, and a camera BLE microprocessor 1002.

Figure 14:
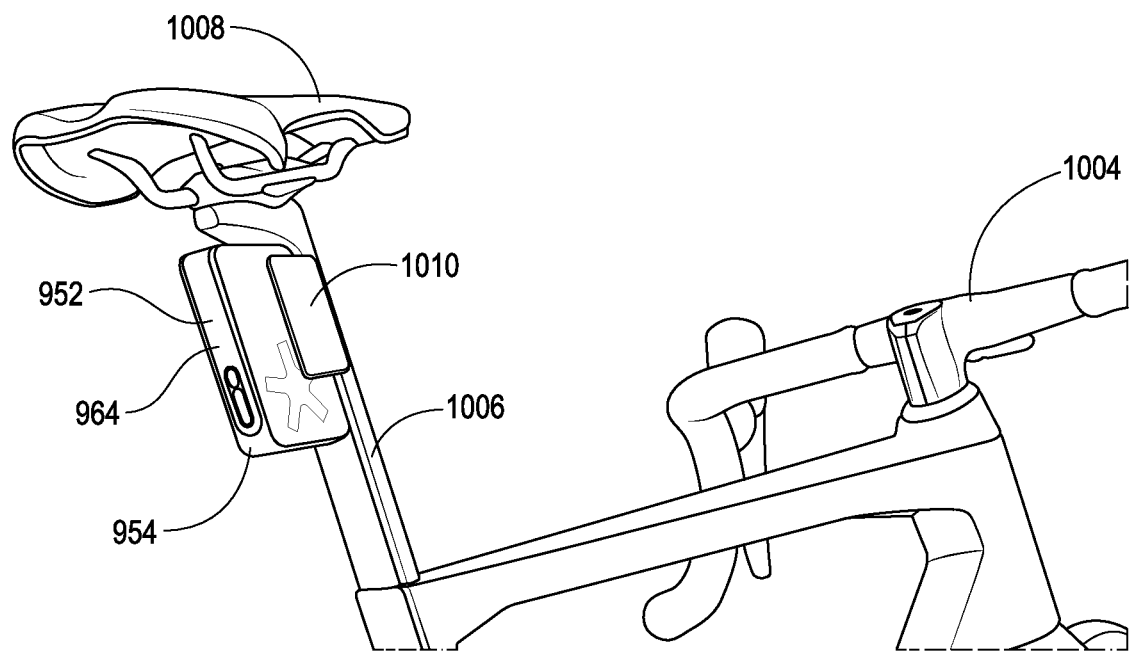
FIG. 14 is an image of an exemplary positioning of the sensor device of FIGS. 11A-B on a bicycle.

In several embodiments, the sensor device is positioned on a rear side of a light mobility vehicle (e.g., such that a camera and/or radar is rear-facing), for example, on the rear of a bicycle seat post. FIG. 14 shows an image of an exemplary positioning of the sensor device 952 on a bicycle 1004. As shown, the sensor device 952 is positioned on a seat post 1006 of the bicycle 1004 underneath the seat 1008. The mount interface of the sensor device 952 is coupled to a mount 1010 on the seat post 1006 such that the rear surface 954 and reflective surface 964 are rear-facing away from the bicycle 1004 to alert oncoming entities of the cyclist. In embodiments where the rear surface 954 includes a light, the light may be varied (e.g., by intensity or frequency of flashing) to alert an oncoming entity. For example, the light may flash more frequently or brighter as an entity or threat gets closer to the bicycle 1004 or otherwise becomes higher risk. As another example, the light may flash on the left side to indicate the bicycle 1004 is turning left or flash on the right to indicate a right turn (e.g., based on user input or a pre-determined route). The lights may also flash as an anti-theft mechanism. It is contemplated that the sensor device 930 may be mounted on the bicycle 1004 in a similar manner with the camera 936 rear-facing away from the bicycle 1004. In these embodiments, the camera 936 may capture image data behind the bicycle 1004 and transmit feedback (e.g., streaming video) or an alert to a user device. While the sensor device is shown on the rear side of a light mobility vehicle, the sensor device may be placed in other locations on the light mobility vehicle, such as the front side or left or right sides. It is contemplated that multiple sensor devices may be positioned on different sides of a light mobility vehicle for improved field of view around the light mobility vehicle.

Safety Device Integration with Light Mobility Vehicle

Figure 15:
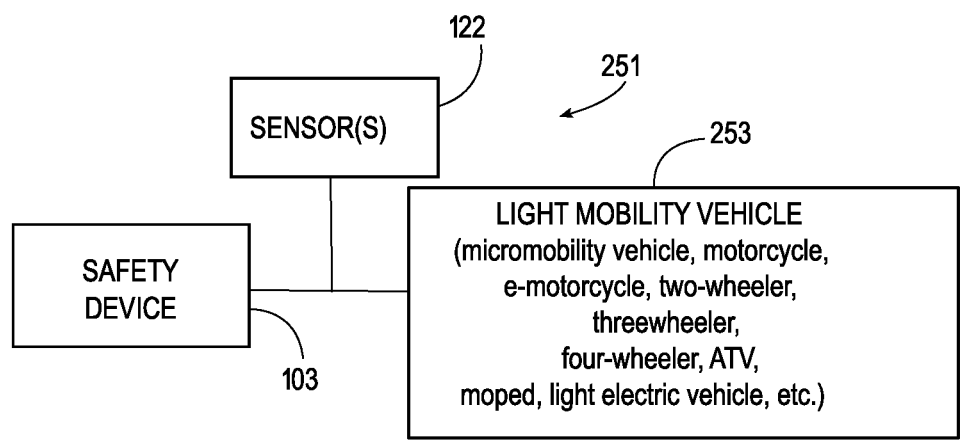
FIG. 15 is a simplified block diagram of a safety light mobility vehicle.

In several embodiments, a disclosed safety device is coupled to a light mobility vehicle. For example, FIG. 15 is a simplified block diagram of a safety light mobility vehicle 251 having a safety device 103 coupled to a light mobility vehicle 253. As shown, the one or more sensors 122 may be coupled to or in communication with the light mobility vehicle 253 and in communication with the safety device 103 coupled to the light mobility vehicle 253. The one or more sensors 122 may be coupled to one or more parts or systems of the light mobility vehicle 253, such as, for example, a wheel, frame, handlebar/hand grip, seat, camera, light, drive system, gear shift system, brake system, or the like. As discussed above, it is contemplated that the one or more sensors 122 may be part of the safety device 103 or part of a disclosed sensor device in communication with the safety device 103.

As discussed in more detail in the PCT Applications, a safety device, or components thereof, may be coupled to one or more light mobility vehicle components or parts, including, e.g., the handlebars, head unit (e.g., of a motorcycle), bicycle or other light mobility vehicle computer, display, frame (e.g., down tube, top tube, seat tube, etc.), battery or other power source (e.g., electric bicycle battery, electric vehicle battery, etc.) (e.g., to a BMS circuit or external surface of the battery housing), controller or remote (e.g., motor controller, switch controller/remote, controller circuit board, etc.), throttle, gear shift, derailleur, display, motor, transmission, and the like. The safety device and components thereof may be coupled to one or more light mobility vehicle components or parts physically, by electronic means (e.g., digital or wired connection), wirelessly, or the like. As an example, the safety device may wirelessly communicate with a light mobility device computer or display (e.g., an e-bike computer or display).

Other light mobility vehicle electronics may be coupled to the PCB of the safety device (or the one or more connectivity modules and/or one or more sensors otherwise incorporated into existing electronics of the light mobility vehicle). The safety device may be configured to couple to a light mobility vehicle battery as a power source for the safety device or the safety device may include a separate power source. It is contemplated that the safety device may include one or more specialized antennas to mitigate interference from such existing electronics or one or more antennas may be positioned external to the light mobility vehicle component or part and in communication with the safety device.

The safety device or its components (e.g., the one or more sensors) may be coupled to the light mobility vehicle in a manner that reduces signal interference. For example, the safety device (or its components) may be coupled to the light mobility vehicle in a manner that minimizes road interference (e.g., at a position further from the road), user interference (e.g., at a position further from the user or where the user is unlikely to obstruct the safety device from above for extended time periods), view interference (e.g., at a position where other components and/or the user do not obstruct the safety device's view up to the sky, which is important for satellite or cellular communications, or view to either side, front, and back when communicating with another vehicle), and/or other interference (e.g., at a position where the motor, vehicle battery, other vehicle sensors, etc. do not obstruct the functionality and/or communication of the safety device).

The one or more safety device sensors and/or one or more antennas may be coupled to a component of the light mobility vehicle that is different from where the safety device (specifically, the other components of the safety device) is positioned. For example, the one or more safety device sensors and/or one or more antennas may be coupled to the handlebars, frame, wheel, motor, gears, controller (e.g., switch controller, motor controller, etc.), display, light, camera, and the like. In some embodiments, the one or more safety device sensors and/or one or more antennas may be coupled to a display or a dedicated user device that is coupled to the handlebars (e.g., to the stem of the handlebars). As an example, an LDS antenna, which is in communication with the safety device, may be integrated into an external surface of the light mobility vehicle component or part.

In one embodiment, one or more GNSS sensors (e.g., GPS sensors) are coupled to the handlebars and/or to a display or dedicated user device coupled to the handlebars and/or to a switch remote/controller coupled to the handlebars and in communication with the safety device. Positioning the one or more GNSS sensors on or near the handlebars may be beneficial for reducing interference (e.g., from the ground, another component of the light mobility vehicle, and the user), as the sensor(s) are further away from the ground and are mostly unobstructed from above. Other positionings of the one or more GNSS sensors are contemplated, depending on the shape and structure of the light mobility vehicle, to achieve this same function (e.g., on a frame/housing component above a wheel of a bicycle or scooter). It is contemplated that one or more GNSS sensors may be positioned on or near the handlebars and one or more other GNSS sensors positioned elsewhere on the light mobility vehicle. While a single GNSS sensor is contemplated, including multiple GNSS sensors may increase precision of positioning capabilities of the safety device, including for example "true headings" functionality.

In several embodiments, the safety device may utilize existing connectors (e.g., wires, cables, existing wireless communication devices, etc.) of a light mobility vehicle to transmit data and signals. For example, the safety device may use a power cable or power supply line (e.g., +36V/GND) connected to the battery to receive power and transmit data/signals when the safety device or its components are coupled to the battery. Additionally or alternatively, the safety device may transmit data and signals wirelessly. The data/signals transmitted may include, for example, GPS NMEA data, GPS NMEA sentences, Xyz indication, LTE data, and the like.

Figure 16A:
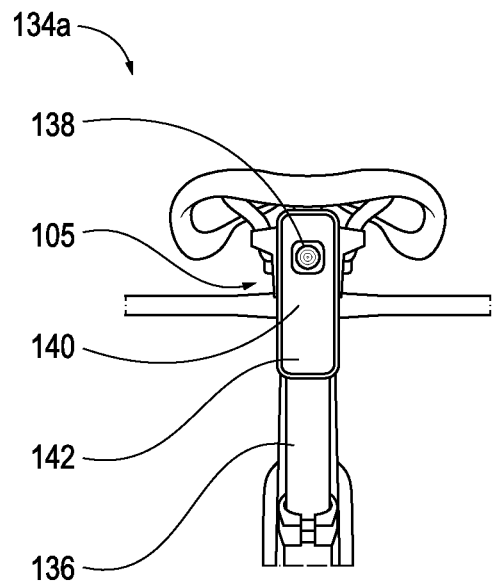
FIGS. 16A-F are images of exemplary safety device positioning relative to safety bicycles and their components.

FIGS. 16A-F show exemplary safety device positioning relative to micromobility vehicles and their components. Specifically, the micromobility vehicles depicted in FIGS. 16A-F are safety bicycles 134a-f that incorporate a safety device 105, 107, 108, 111, 1180, 103-1 to 103-13. FIG. 16A shows a safety bicycle 134a having a safety device 105 coupled to the rear of the safety bicycle 134a, specifically to an outer surface of the seat post 136. In the depicted example, the safety device 105 includes a waterproof housing 142 with a camera 138 coupled to an outer surface 140 for detecting motion and objects behind the safety bicycle 134a.

Figure 16B:
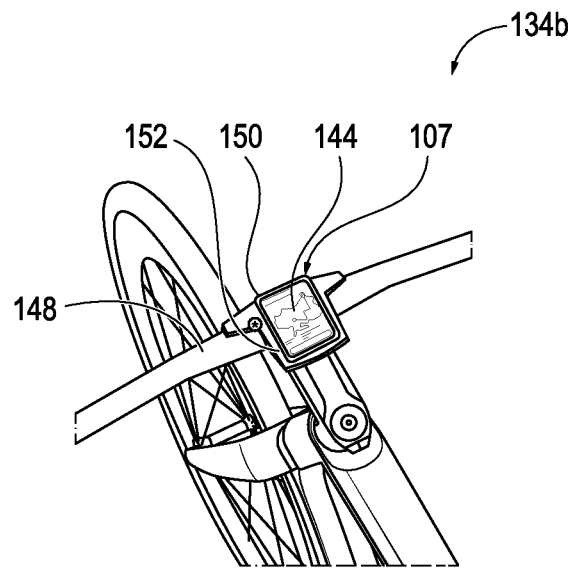

In the example depicted in FIG. 16B, the safety bicycle 134b includes a safety device 107 coupled to a top surface of handlebars 148. In this example, the safety device 107 includes a display 144 (e.g., a feedback component 123) on the outer surface 150 of its housing 152; however, it is contemplated that a smart display may be a separate component (e.g., a user device 106 positioned on the handlebars) in communication with a safety device that is positioned elsewhere on the micromobility vehicle. It is contemplated that the safety device 107 may be a fixed feature or removable from the safety bicycle 134b.

Figure 16C:
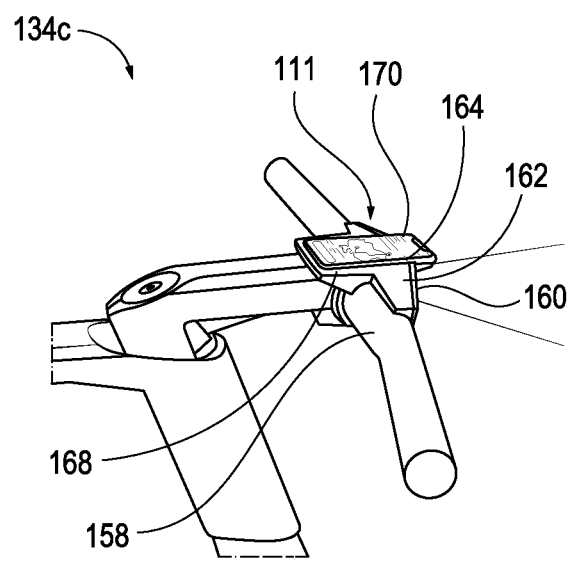

In the example depicted in FIG. 16C, the safety bicycle 134c includes a safety device 111 coupled to a top surface of handlebars 158. In this example, the safety device 111 includes a light 160 (e.g., a feedback component 123) on a front surface of the housing 162. It is contemplated that the light may include a light sensor as discussed above. In the depicted example, the housing 160 includes a recession 164 on a top surface 168 configured to receive a smartphone 170 (e.g., a type of user device 106).

Figure 16D:
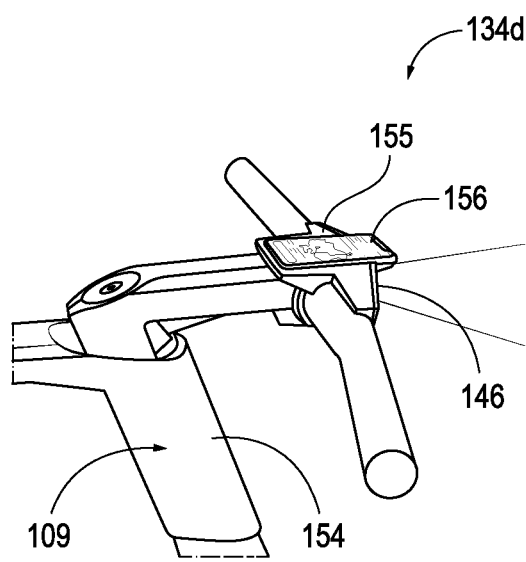

In the example shown in FIG. 16D, the safety bicycle 134d includes a safety device 109 that is contained within a head tube 154. In this example, the safety device 109 is in communication with a light 146 that is a separate component from the safety device 109. The light may include a light sensor as discussed above that is in communication with the safety device 109 processing element. In the example shown, the safety bicycle 134d includes a holder 155 for a smartphone 156 that is in communication with the safety device 109. While FIGS. 16C and 16D show a smartphone 170, 156, respectively, it is contemplated that the smartphones 170, 156 may be replaced by dedicated user devices described herein.

Figure 16E:
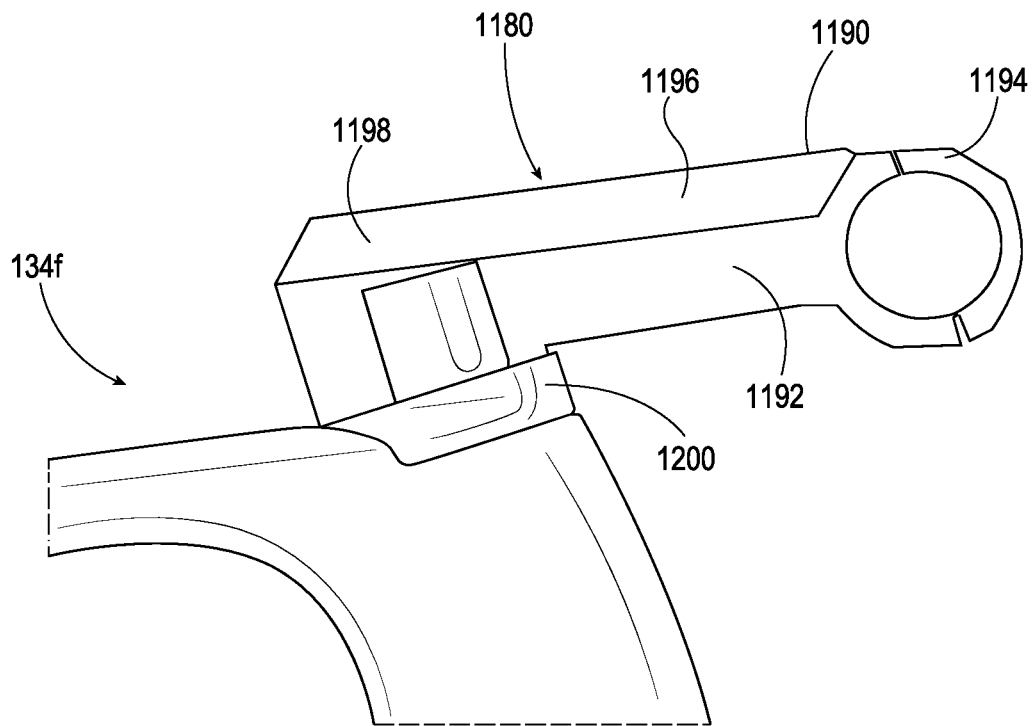

In the example shown in FIG. 16E, the safety bicycle 134f includes a safety device 1180 coupled to or integrated with a stem 1190 of a bicycle or ebike. As shown, the stem 1190 includes a stem housing 1192 and a handlebar clamp 1194. The handlebar clamp 1194 is configured to receive handlebars. The stem housing 1192 may form a stem cavity. A safety device described herein may be positioned inside the stem cavity. For example, a circuit board having one or more disclosed connectivity devices and one or more processors may be positioned inside the stem cavity. The circuit board may further include one or more sensors described herein. As shown, the stem housing 1192 includes a display 1196 on a top surface 1198 of the stem housing 1192. The display 1196 may be in communication with the one or more processors and may receive input based on data received by the one or more connectivity devices and/or one or more sensors. It is contemplated that the display 1196 may be omitted. For example, the safety device may be in communication with one or more feedback components or an external display or user device. In the depicted embodiment, the stem 1190 is coupled to a bicycle head tube 1200. It is contemplated that the stem 1190 including a disclosed safety device may be provided as a separate component of the bicycle or ebike. While the safety device 134f depicted in FIG. 16E is integrated with the stem 1190, it is contemplated that a safety device may be positioned on a top surface of a bicycle stem.

Figure 16F:
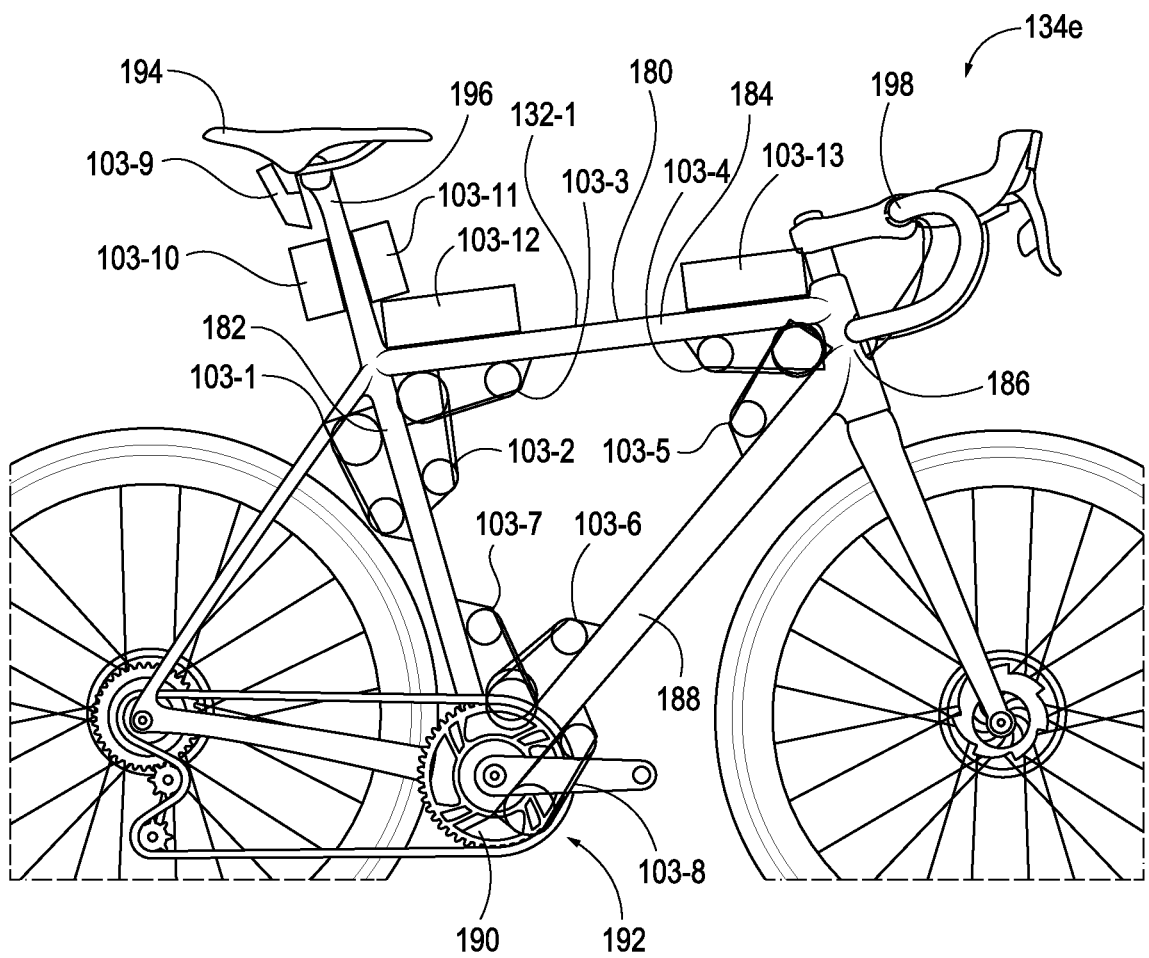

FIG. 16F shows exemplary locations for a safety device 103 on a micromobility vehicle 132-1, in this example, a safety bicycle 134e. As shown, a safety device 103-1 to 103-7 may be positioned on a frame 180 of the safety bicycle 134e, such as, for example, safety device 103-1 positioned on a rear surface of the seat tube 182, safety device 103-2 positioned on a front surface of the seat tube 182 and partially on a lower surface of the top tube 184, safety device 103-3 positioned on a lower surface of the top tube 184 and partially on a front surface of the seat tube 182, safety device 103-4 positioned on a lower surface of the top tube 184 and partially on the head tube 186, safety device 103-5 positioned on the down tube 188 proximate the head tube 186, safety device 103-6 positioned on the down tube 188 proximate the chain ring 190, safety device 103-7 positioned on a front surface of the seat tube 182 proximate the chain ring 190, safety device 103-9 positioned under the seat 194, safety device 103-10 positioned on a rear surface of the seat post 196, safety device 103-11 positioned on a front surface of the seat post 196, safety device 103-12 positioned on a top surface of the top tube 184 near the seat post 196, or safety device 103-13 positioned on a top surface of the top tube 184 near the handlebars 198. As another example, a safety device 103-8 may be coupled to a gear system 192 of the safety bicycle 134e. The positions shown in FIG. 16F are meant as illustrative examples and other positioning of a safety device 103 relative to a micromobility vehicle 132 is contemplated.

Light Mobility Vehicle Safety Systems

In several embodiments, a safety system for a light mobility vehicle is disclosed that includes one or more light mobility vehicle devices. Light mobility vehicle devices may include a disclosed safety device, user device, sensor device, and the like. The light mobility vehicle safety system may include the one or more sensors and/or one or more antennas as integrated components of the safety device or as separate components from the safety device and in communication with the safety device by wired or wireless means. The light mobility vehicle safety system may utilize existing light mobility vehicle components to power the light mobility vehicle safety system devices, or components thereof, and transmit data and signals between the light mobility vehicle safety system devices, or components thereof, or one or more of the light mobility vehicle safety system devices may include their own power sources. The light mobility vehicle safety system may inject a modulated carrier signal into the light mobility vehicle wiring system to operate power-line communications between light mobility safety system devices or components.

The light mobility vehicle safety system devices or components may be positioned in various locations on a light mobility vehicle, as described in more detail in the PCT Applications and discussed above with respect to each light mobility vehicle device. As a non-limiting example, the light mobility vehicle safety system devices or components may be positioned in one or more of the following locations: the handlebars, head unit (e.g., of a motorcycle), bicycle or other light mobility vehicle computer, display, frame (e.g., down tube, top tube, seat tube, rear tube, front tube, left or right fork, etc.), storage compartment or shelf (e.g., bike rack), battery (e.g., electric bicycle battery, electric vehicle battery, etc.), motor, transmission, controller or remote (e.g., motor controller, switch controller/remote, etc.), throttle, gear shift, derailleur, and the like. The light mobility vehicle safety system devices or components may be coupled to one or more light mobility vehicle components or parts physically, by electronic means (e.g., digital or wired connection), wirelessly, or the like. As an example, the safety device may wirelessly communicate with a light mobility device computer or display (e.g., an e-bike computer or display). The one or more sensors may be coupled to the light mobility vehicle in positions with field of view in various directions. In some embodiments, one or more of the one or more sensors have overlapping fields of view. In some embodiments, the one or more sensors do not have overlapping fields of view. In several embodiments, the one or more sensors have fields of view that achieve a 360 degree view, or approximately a 360 degree view (e.g., 260 degrees or 300 degrees or more) around the light mobility vehicle.

Figure 17:
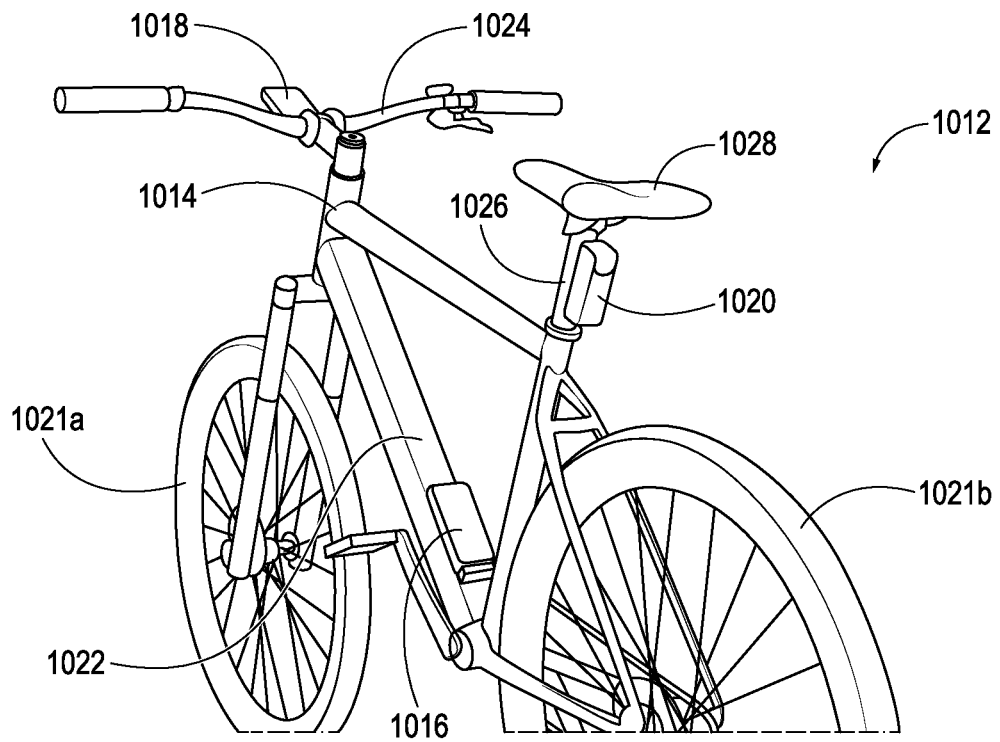
FIG. 17 is an image of an exemplary light mobility vehicle safety system, specifically integrated with a bicycle.

FIG. 17 shows an image of an exemplary light mobility vehicle safety system, specifically, a micromobility vehicle (MV) safety system 1012 integrated with a bicycle 1014. The MV safety system 1012 may be part of safety system 100 described herein. As shown, the MV safety system 1012 includes a safety device 1016, a user device 1018, and a sensor device 1020. The safety device 1016, user device 1018, and sensor device 1020 may be any of the various devices described herein, for example, safety device 800, a dedicated user device described herein, and sensor device 930 or 952. In the depicted embodiment, the safety device 1016 is positioned near the base of the bicycle 1014 between the wheels 1021a,b, the user device 1018 is positioned on a front end of the bicycle 1014, and the sensor device 1020 is positioned on a rear end of the bicycle 1014. Specifically, the safety device 1016 is positioned on the down tube 1022, the user device 1018 is positioned on the handlebars 1024, and the sensor device 1020 is positioned on the seat post 1026 below the seat 1028. It is contemplated that one or more of the safety device 1016, user device 1018, and sensor device 1020 may be omitted from the MV safety system 1012. In some embodiments, e.g., where the safety device 1016 is omitted, the user device 1018 may be configured to execute the same logic as safety devices described herein. For example, the user device 1018 may transmit and receive safety-related data (e.g., BSM such as position, speed, heading, etc.) to and from other system 100 devices (e.g., one or more user devices 106 or automotive vehicle connectivity devices 104) via network 110. The user device 1018 may execute one or more of the methods described herein to determine whether the safety-related data (e.g., BSM) received is indicative of a safety risk or threat.

As discussed above, the safety device 1016, user device 1018, and sensor device 1020 may include one or more sensors. For example, the user device 1018 may include a camera and/or radar that is front-facing on the bicycle 1014 and the sensor device 1020 may include a camera and/or radar that is rear-facing on the bicycle 1014, providing improved visibility to the micromobility vehicle (e.g., for object detection and risk/threat assessment around the micromobility vehicle). One or more of the safety device 1016, user device 1018, and sensor device 1020 may include one or more side-facing sensors (e.g., cameras) that are facing the right or left sides of the micromobility vehicle. The side-facing sensors (e.g., cameras) may enable a user of the micromobility vehicle to receive safety-related data indicative of threats from a side of the micromobility vehicle (e.g., to see if an entity is approaching or turning from a side). While the above example is described with respect to a micromobility vehicle, it is contemplated that the same features of the MV safety system 1012 may be included on another light mobility vehicle, such as, for example, a motorcycle, moped, ATV, etc.

Figure 18:
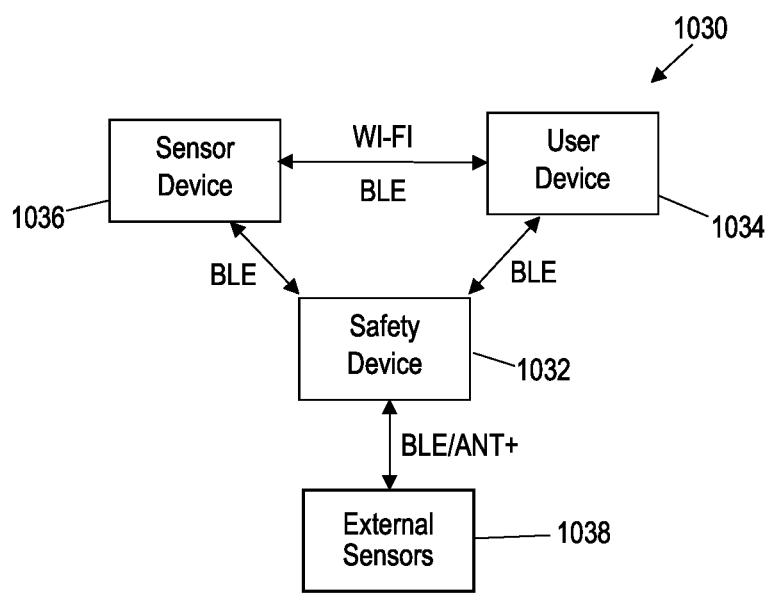
FIG. 18 is a simplified block diagram of a light mobility vehicle safety system that can be integrated with a light mobility vehicle.

FIG. 18 is a simplified block diagram of a light mobility vehicle safety system 1030 that can be integrated with a light mobility vehicle. As shown, the light mobility vehicle safety system 1030 includes various light mobility vehicle devices, including a safety device 1032, a user device 1034, and a sensor device 1036. The safety device 1032, user device 1034, and sensor device 1036 may be any of the various devices described herein, for example, safety device 800, a dedicated user device described herein, and sensor device 930 or 952. As shown, the safety device 1032 may be in communication with one or more external sensors 1038 (e.g., a camera, accelerometer, LIDAR, radar, thermometer, light, etc.). As shown, the safety device 1032 communicates with the user device 1034 and with the sensor device 1036 via BLE and/or Wi-Fi. In embodiments where external sensors 1038 are included, the safety device 1032 may communicate with the external sensors 1038 via BLE/ANT+. The sensor device 1036 may communicate with the user device 1034 via Wi-Fi and/or BLE. The light mobility vehicle safety system 1030 is intended for illustrative purposes and other communication protocols are contemplated between the various devices.

In several embodiments, the user device 1034 receives feedback from the safety device 1032 and/or sensor device 1036 related to safety risks or threats. For example, the sensor device 1036 may transmit streaming video data to the user device 1034. For example, sensor device 930 may be mounted on a bicycle such that the camera 936 is rear-facing and captures video of the environment behind the bicyclist. As discussed above, the sensor device 930 may process the image data and determine whether an object is a threat. If the sensor device 930 determines the object is a threat, the sensor device 930 may transmit an alert to the user device 1034. One or more of the user device 1034, the safety device 1032, and the sensor device 930 may transmit threat data (e.g., the type of threat and location) to the cloud for storage. The cloud or remote processing element may map the threat (e.g., type and location) to a map interface and transmit the mapped threat to other user devices 106 in the system 100 (shown in FIG. 1).

In some embodiments, safety device components may be integrated with one or more other components of a light mobility vehicle safety system. For example, safety device components may be integrated with a user device, display, light mobility computer (e.g., bicycle computer), or sensor device. As an example, a light mobility computer may include one or more connectivity modules. For example, a bicycle computer, display, or dedicated user device may include one or more of Wi-Fi, BLE, and ANT+. Additionally or separately, the bicycle computer, display, or dedicated user device may include LTE. In some embodiments, the bicycle computer, display, or dedicated user device includes C-V2X. The bicycle computer, display, or dedicated user device may include one or more feedback components and/or one or more input components. For example, the bicycle computer or dedicated user device may include a display and/or microphone. For example, the display may be a 3.2" TFT with local resistive buttons. In some embodiments, the bicycle computer, display, or dedicated user device includes a sensor, such as a camera or GNNS sensor. The bicycle computer, display, or dedicated user device may couple to bicycle handlebars. As an example, the bicycle computer, display, or dedicated user device may be coupled to or integrated with the stem of a bicycle.

In some embodiments, a safety device described herein may be portable and may be carried by a user, e.g., in a purse or backpack. For example, a disclosed safety device may be placed in a child's backpack to increase the child's awareness of others and others' awareness of the child. As another example, a safety device may be placed in a vehicle (e.g., car or bus) that has no embedded connectivity devices (e.g., is not C-V2X or modem equipped). In this example, the safety device may be in communication with the vehicle's sensors (e.g., via wireless communication). In this example, the non-embedded or portable safety device enables the vehicle to connect with other system IoT devices. Further, the driver could take the safety device out of the vehicle and carry it to remain connected to the system, enabling others to remain aware of the driver even when the driver is not in the car. The user could also take the safety device from his/her vehicle and use it in another vehicle, e.g., a different light mobility vehicle or other vehicle. Current systems do not allow for such expansive connectivity.

In some embodiments, the portable safety device may be paired with a light mobility vehicle, including, for example, a third-party light mobility vehicle. Third-party light mobility vehicles may include, for example, shared electric scooters and bikes (e.g., Lime, Lyft, etc.). The portable safety device may be paired with a light mobility vehicle via a Bluetooth connection or other communication protocol. In some embodiments, the portable safety device may be paired with a light mobility vehicle by scanning a bar code on the light mobility vehicle. In some embodiments, the portable safety device may be coupled to the light mobility vehicle by a wire or cable. The portable safety device may communicate with one or more processors and/or one or more sensors of the light mobility vehicle. The portable safety device may exchange entity data and/or alerts with the light mobility vehicle. For example, the portable safety device may transmit an alert to the light mobility vehicle when a threat is determined (e.g., it may flash a light mobility vehicle light or transmit a visual alert to a display on the light mobility vehicle). In some embodiments, the portable safety device may instruct the light mobility vehicle to slow down or stop.

In some embodiments, the portable safety device may receive entity data or sensor data from the light mobility vehicle (e.g., from the sensors). The portable safety device may aggregate the entity data received with entity data received directly (e.g., via C-V2X) to determine more accurate entity data. The portable safety device may determine a trajectory of the light mobility vehicle based on sensor data received to improve risk assessment. For example, the portable safety device may receive a right turn signal from the light mobility vehicle and entity data directly (e.g., via C-V2X) that indicates a trajectory of another entity and determine a high likelihood of collision.

In several embodiments, a disclosed safety device may share data with other connectivity devices, user devices, and/or sensors associated with or coupled to a light mobility vehicle to improve connectivity with other entities or road users and/or to improve the ability of the light mobility vehicle to detect its surroundings, and specifically to detect threats. As an example, a user device may include a safety application (e.g., as described in the PCT Applications) that executes the methods described herein and in the PCT applications. In this manner, the user device may function in a similar manner as a disclosed safety device. The user device may communicate with other entities by a cellular modem (and through a server) and may receive entity data from those entities (e.g., related to their position, speed, direction, trajectory, etc.). The safety device may receive, via its one or more connectivity modules, entity data from other entities. The safety device may receive the entity data received by the user device and may compare, via its local processing element, the entity data received by the user device to the entity data received directly by the safety device. Alternatively, the entity data received by the user device and the entity data received by the safety device may be transmitted to the server and processed remotely. The entity data may be compared to reconcile differences in the data and to generate more accurate data.

It is contemplated that one or more sensors coupled to the light mobility vehicle may receive sensor data and transmit the sensor data to the safety device for local processing or to the server for remote processing. This sensor data may be compared to the entity data received by the safety device, and in some embodiments, to the entity data received by the user device, to improve the accuracy of the data.

In the example of a motorcycle or a car, the safety device may exchange data with one or more ADAS sensors to improve visibility around the motorcycle or car. The safety device may be coupled to the one or more ADAS sensors by a CAN bus or other wired or wireless connection. The safety device may receive data from the one or more ADAS sensors related to turn signaling, braking, acceleration/deceleration, wheel angle, and the like. Such data may be analyzed by the safety device processor to determine a trajectory of the motorcycle or car. For example, the safety device processor may determine the motorcycle or car is turning right based on signal data received from a right turn blinker. The safety device may receive entity data from other entities (e.g., via its one or more connectivity devices) and compare the entity data received to the sensor data received from the one or more ADAS sensors to determine a threat (e.g., whether a trajectory of the car or motorcycle intersects with a trajectory of the other entity that is likely to result in a collision).

The sensor device may transmit an alert based on the threat, as discussed in more detail above and in the PCT Applications. In this manner, the safety device may improve the capabilities of an ADAS system of a motorcycle, car, bus, garbage truck, or other vehicle by providing additional threat detection and alerts related thereto. For example, a typical ADAS system may have surround view, park assist, blind spot detection, rear collision warning, cross traffic alert, traffic sign recognition, lane departure warning, emergency braking, adaptive cruise control, and the like. The safety device may add additional alerts, including, for example, do not pass, left/right turn assist (e.g., do not turn), and additional surround view, park assist, rear collision warning, and blind spot detection capabilities. The safety device processor may compare data received from the one or more ADAS sensors to entity data received by the one or more connectivity modules of the safety device to reconcile differences in the data and provide more accurate safety-related data (e.g., data related to the car or motorcycle's surroundings). In this manner, the safety device may improve the accuracy of a car or motorcycle ADAS system. The safety device may expand connectivity of certain cars lacking one or more connectivity modules. For example, the safety device may provide C-V2X connectivity to a non-connected or cellular connected car. As another example, the safety device may provide LTE connectivity to a non-connected or C-V2X connected car.

Figure 19:
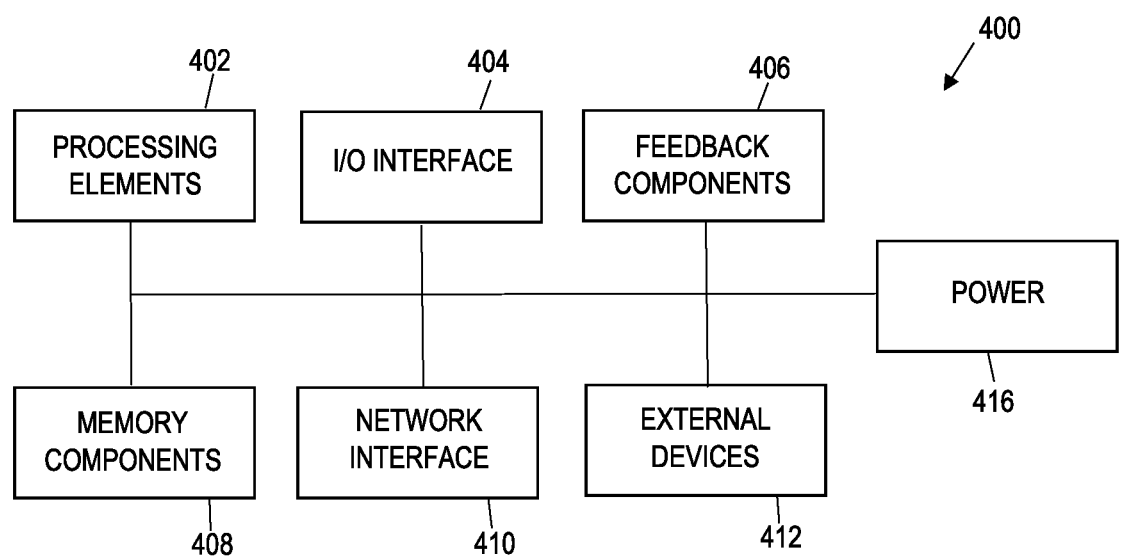
FIG. 19 is a simplified block diagram of a computing device that can be used by one or more components of the system of FIG. 1.

A simplified block structure for computing devices 400 that may be used with the system 100 or integrated into one or more of the system 100 components is shown in FIG. 19. For example, the safety device(s) 102, automotive vehicle connectivity device(s) 104, user device(s) 106, sensor device(s), and/or server(s) 108 (shown in FIG. 1) may include one or more of the components shown in FIG. 19 and such components may be used to execute one or more of the operations disclosed in methods 2000, 2050, 2100, 2150, 2200, 2220, 2280, 2300, 2320, 2350, 2400, and 2450. With reference to FIG. 19, the computing device 400 may include one or more processing elements 402, an input/output interface 404, feedback components 406, one or more memory components 408, a network interface 410, one or more external devices 412, and a power source 416. Each of the various components may be in communication with one another through one or more busses, wireless means, or the like.

The local processing element 402 is any type of electronic device capable of processing, receiving, and/or transmitting instructions. For example, the local processing element 402 may be a central processing unit, microprocessor, processor, or microcontroller. Additionally, it should be noted that select components of the computing device 400 may be controlled by a first processor and other components may be controlled by a second processor, where the first and second processors may or may not be in communication with each other and may or may not be the same type of processor.

The one or more memory components 408 are used by the computing device 400 to store instructions for the local processing element 402, as well as store data, such as the entity data, third-party database entity data, light mobility vehicle data, user data, environmental data, collision-related data, and other safety-related data, trend data, historical data, and the like. The one or more memory components 408 may be, for example, magneto-optical storage, read-only memory, random access memory, erasable programmable memory, flash memory, or a combination of one or more types of memory components.

The one or more feedback components 406 provide visual, haptic, and/or auditory feedback to a user. For example, the one or more feedback components may include a display that provides visual feedback to a user and, optionally, can act as an input element to enable a user to control, manipulate, and calibrate various components of the computing device 400. The display may be a liquid crystal display, plasma display, organic light-emitting diode display, and/or cathode ray tube display. In embodiments where the display is used as an input, the display may include one or more touch or input sensors, such as capacitive touch sensors, resistive grid, or the like. As another example, the one or more feedback components 406 may include a light (e.g., LED), an alarm or alert sound, a vibration, and the like.

The I/O interface 404 allows a user to enter data into the computing device 400, as well as provides an input/output (I/O) for the computing device 400 to communicate with other devices (e.g., the safety device 102, one or more servers 108, other computers, etc.). The I/O interface 404 can include one or more input buttons or switches, remote controls, touch pads or screens, microphones, and so on. As an example, the I/O interface 404 may be one or both of a capacitive or resistive touchscreen.

The network interface 410 provides communication to and from the computing device 400 to other devices. For example, the network interface 410 allows the one or more servers 108 to communicate with the one or more user devices 106 through the network 110. The network interface 410 includes one or more communication protocols, such as, but not limited to Wi-Fi, Ethernet, Bluetooth, Zigbee, and so on. The network interface 410 may also include one or more hardwired components, such as a Universal Serial Bus (USB) cable, or the like. The configuration of the network interface 410 depends on the types of communication desired and may be modified to communicate via Wi-Fi, Bluetooth, and so on.

The external devices 412 are one or more devices that can be used to provide various inputs to the computing device 400, e.g., mouse, microphone, keyboard, trackpad, or the like. The external devices 412 may be local or remote and may vary as desired.

The power source 416 is used to provide power to the computing device 400, e.g., battery (e.g., graphene/zinc hybrid), solar panel, lithium, kinetic (e.g., energy harvested from a bicycle) or the like. In some embodiments, the power source 416 is rechargeable; for example, contact and contactless recharge capabilities are contemplated. In some embodiments, the power source 416 is a constant power management feed. In other embodiments, the power source 416 is intermittent (e.g., controlled by a power switch or activated by an external signal). The power source 416 may include an auxiliary power source.

Group Application

In several embodiments, safety systems, devices, and methods described herein and in the PCT Applications leverage multi-user data for improved road user safety, visibility, communication, and experience of road users traveling in a group. A group of road users includes a group of light mobility users (also referred to herein as a group of riders). For example, bicyclists or motorcyclists may travel together in a group. A group of riders may travel at the same speed or similar speeds (e.g., 0.1-3 mph speed differences) and the riders may be in the same location and in proximity to one another. Riders in a group may have different positions within the group. Depending on the size of the group (i.e., the number of riders in the group), the group may include one or more leaders or front riders (in front of the group), one or more side riders (to the left or right sides of the group), one or more rear or back riders (at the back or tail end of the group), and one or more center or middle riders (riders in the middle of the group in between the other riders).

One or more light mobility vehicles in a group may include a light mobility vehicle safety system having one or more light mobility vehicle devices, as described herein. The one or more light mobility vehicle devices may include one or more of a safety device, user device, and sensor device, described herein and in the PCT applications, coupled to or otherwise associated with the one or more light mobility vehicles. The two or more light mobility vehicle devices in the group may exchange and leverage safety-related data. The two or more light mobility vehicle devices may exchange data via a short-range communication protocol (e.g., BLE, Wi-Fi, etc.) or other protocol (e.g., cellular). By using short-range communication protocol, latency in data transmission between group members may be reduced. The safety system may utilize one or more group light mobility vehicle devices in a manner that optimizes connectivity with other road users or entities, reduces redundancy in data exchanged with other entities, leverages relevant information related to threats, risks, hazards, or obstacles surrounding the group, and reduces power consumption, computing power, data storage, and data transmission of the group of light mobility vehicles and their components.

In several embodiments, a light mobility vehicle device in a group, such as a safety device, may leverage relevant data inputs (e.g., sensors) based on a position of the light mobility vehicle device, or its associated light mobility vehicle, in the group. For example, the light mobility vehicle device may determine a position of its associated light mobility vehicle based on geopositioning or echo positioning or other sensor data received (e.g., camera view of other riders in back but not in front may indicate the light mobility vehicle is a leader). The light mobility vehicle device may determine relevant data input based on its position. For example, relevant sensors may include those with a field of view around the group, while non-relevant sensors may include those with a field of view of other members of the group. As an example, for a light mobility vehicle in front of the group, relevant sensors may be front and side sensors (that view surroundings around the group) and non-relevant sensors may be rear sensors (that view the group), while for a light mobility vehicle in the back of the group, relevant sensors may be rear and side sensors and non-relevant sensors may be front sensors.

A light mobility vehicle device may receive safety-related data from the relevant sensors associated with the light mobility vehicle and from one or more other light mobility vehicle devices in the group (e.g., that selectively collected relevant safety-related data within its/their respective field(s) of view) and determine safety risks or threats surrounding the group. In this manner, a light mobility vehicle safety device may leverage relevant safety-related data from different light mobility vehicle devices, or components thereof, within the group. In some embodiments, the light mobility vehicle device may turn off or reduce power to non-relevant sensors to reduce power consumption.

In some embodiments, the safety system may identify a safety device in the group as the central or main safety device. The central or main safety device may be selected based on its connectivity or signal strength, its position within the group, or based on user input. For example, the safety system may select a safety device that is receiving a strong signal or has good connectivity as the central safety device. As another example, the safety system may select a group leader's safety device as the central safety device. As yet another example, the safety system may receive user input to identify a central safety device based on a user selecting a leader function on a safety application. In some embodiments, a central safety device may be determined by a safety device processor, which may transmit a message to one or more other light mobility vehicle devices in the group indicating it is the central safety device (e.g., based on its signal strength, position within the group, or user input). The central or main safety device may include a central processor that processes safety-related data received from one or more other light mobility vehicle devices in the group.

The central safety device or processor may receive safety-related data from other light mobility vehicle device(s) in the group and process the safety-related data to determine threats, risks, hazards, obstacles, and the like, and, in some embodiments, group characteristics, e.g., group dimensions, average speed, and the like, as discussed in more detail below. The central safety device or processor may transmit received safety-related data and/or determined threats, risks, hazards, obstacles, and the like to the other light mobility vehicle devices in the group. The central safety device or processor may transmit and receive safety-related data to and from other entities or road users (e.g., automotive vehicles). In some embodiments, the central safety device or processor may transmit group characteristic data to other entities.

A disclosed safety system may leverage light mobility vehicle devices, or components thereof, in the group that provide relevant safety-related data and turn off light mobility vehicle devices, or components thereof, in the group that do not provide relevant safety-related data or that provide redundant safety-related data. As an example, the safety system may determine that safety devices associated with a leader, a right side rider, a left side rider and a rear rider provide relevant safety-related data. For example, the leader safety device and rear rider safety device may provide safety-related data indicative of risks or conditions in front of and behind the group, respectively, and the right and left side rider safety devices may provide safety-related data indicative of risks or conditions to the right and left sides of the group, respectively. The safety system may leverage this safety-related data to provide riders in the group with an understanding of the risks and conditions surrounding the group. The relevant safety-related data may be processed by a designated central safety device or by a server connected to the group safety devices over a network, as described with respect to FIG. 1. For example, the relevant safety-related data may be processed to assess threats surrounding the group. The relevant safety-related data or determined threats may be transmitted to other riders in the group as messages or alerts.

The safety system may determine the other riders in the group do not provide relevant safety-related data or provide redundant safety related data. For example, if the group includes three riders on the left side of the group, the three left side riders may provide the same safety-related data indicative of conditions and risks on the left side of the group. One of the three left side riders may be selected, while the other two left side riders may be determined to provide redundant data. The system may turn off or reduce power to one or more of the light mobility vehicle devices, or components thereof (e.g., the cameras), of the other two left side riders with redundant data. As another example, if there is a rider in the middle of the group, the associated one or more light mobility devices may merely detect the other riders in the group that are surrounding the rider and may not receive any relevant surrounding safety-related data. In this example, the system may determine the associated one or more light mobility vehicle devices are not receiving relevant safety-related data and turn off or reduce power to one or more of the one or more light mobility vehicle devices, or components thereof (e.g., the cameras). By selectively turning off one or more light mobility vehicle devices, or components thereof, in the group, the system may reduce and optimize power consumption, computing power, data storage, and/or data transmission of such devices or components within the group.

In some embodiments, the system, upon determining riders are moving in a group, may place a geofence around the group of riders. The system may set a radius around the group that is sized to optimize detection of objects and other entities that come into proximity of the group. When an entity enters the geofenced area, the system may transmit an alert to one or more light mobility vehicle devices in the group.

Figure 20:
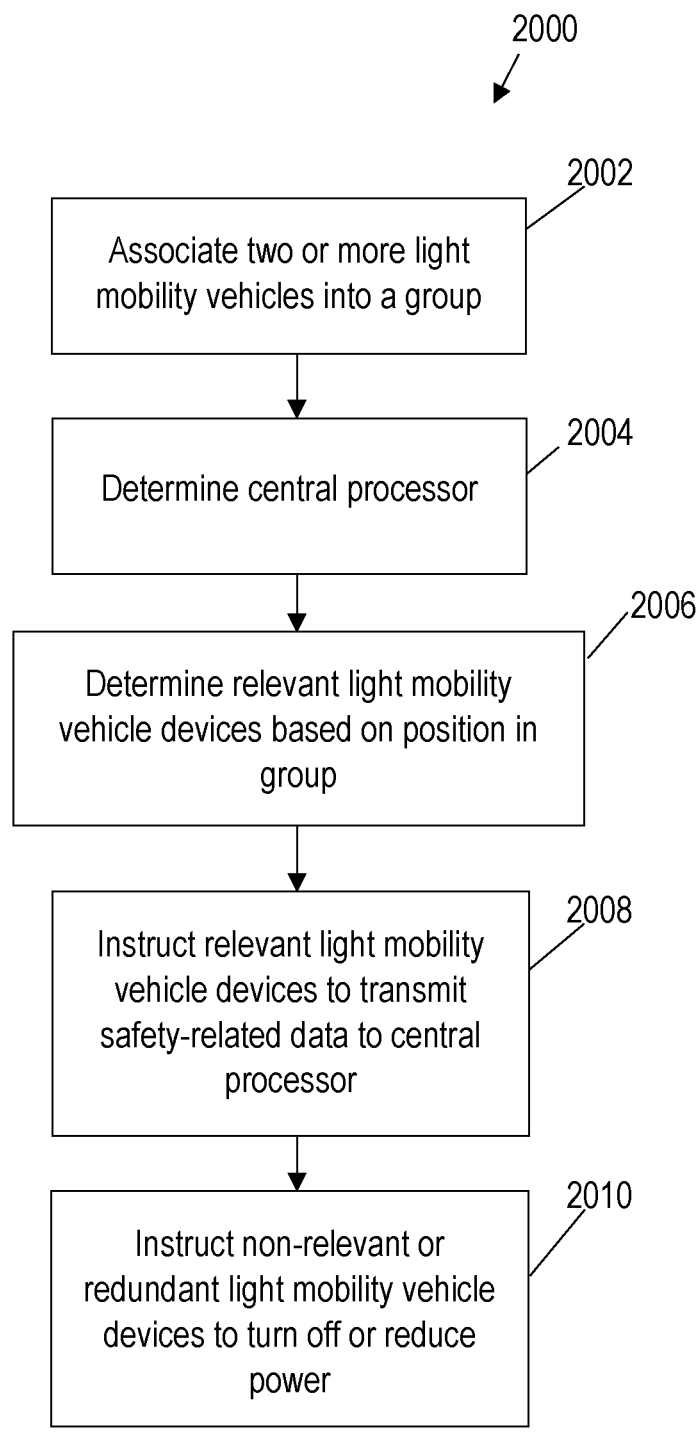
FIG. 20 is a flow chart illustrating a method of leveraging safety-related data from light mobility vehicle devices associated with a group of light mobility vehicles.

FIG. 20 is a flow chart illustrating a method of leveraging safety devices or light mobility vehicle safety system, devices, and components thereof (e.g., as described with respect to FIG. 17) associated with a group of light mobility vehicles and the safety-related data they collect. The method 2000 begins with operation 2002 and two or more light mobility vehicles are associated into a group. The light mobility vehicles may be associated into a group based on entity data received from their associated light mobility vehicle devices, or components thereof. For example, the light mobility vehicles may be associated based on the light mobility vehicles having a similar location, proximity, speed, heading, movement patterns, and the like. In some embodiments, the light mobility vehicles are associated into a group based on user input. For example, the system may receive user input from a safety device or user device indicating the associated light mobility vehicle is part of a group (e.g., by the user selecting a group function on a safety application on the associated user device or safety device). In some embodiments where the system automatically detects the light mobility vehicles are in a group, the system may also transmit an alert or notification to one or more user devices or safety devices associated with the light mobility vehicles requesting confirmation of whether one or more of the light mobility vehicles are in fact part of the group. In this manner, the system may determine the light mobility vehicles are in a group both automatically (e.g., based on similar entity data) and based on user input.

Figure 21:
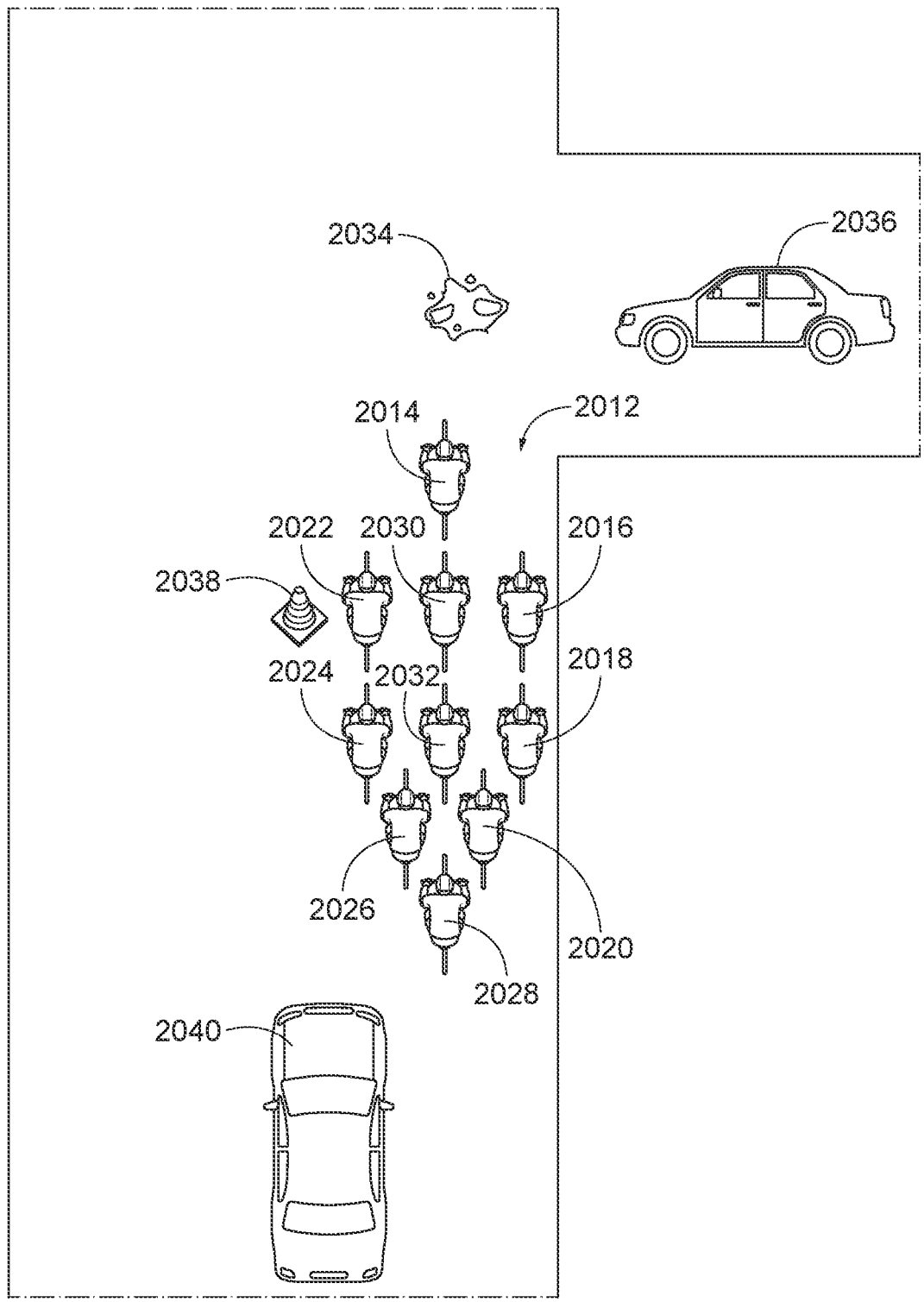
FIG. 21 is an image of light mobility vehicles traveling as a group on a road having various obstacles and risks, illustrating an exemplary group application of disclosed safety devices, methods, and systems.

FIG. 21 is an image of road users or light mobility vehicles traveling as a group on a road having various obstacles and risks. In the depicted embodiment, the group of light mobility vehicles 2012 includes ten light mobility vehicles, including a leader light mobility vehicle 2014, a first, second, and third right side light mobility vehicle 2016, 2018, 2020, respectively, a first, second, and third left side light mobility vehicle 2022, 2024, 2026, respectively, a rear light mobility vehicle 2028, and a first and second middle light mobility vehicle 2030, 2032, respectively. As shown, the members of the group 2012 are traveling in the same location, in proximity to one another, and at around the same speed. The light mobility vehicles may each have one or more devices or components of a light mobility vehicle safety system (e.g., one or more of a safety device, user device, and sensor device, or components thereof), e.g., as described with respect to FIG. 17.

Returning to FIG. 20, after operation 2002, the method 2000 may proceed to operation 2004 and a central processor is determined. The central processor may be a processor of one of the safety devices or user devices associated with a light mobility vehicle in the group. The central processor may process safety-related data received by or determined by other light mobility vehicle device(s) in the group and may execute edge processing to provide relevant safety-related data, including threat and risk data, to the other light mobility vehicle device(s) in the group. By executing edge processing, the system may reduce lag and latency in data transmission, providing more timely data to group members related to road hazards, threats, and risks. The other light mobility vehicle device(s) in the group may receive relevant safety-related data from the central processor instantaneously and simultaneously, increasing awareness of the group.

The central processor may be determined based on its connectivity or signal strength, its position within the group, or based on user input. For example, the safety system may determine a safety device that is receiving a strong signal or has good connectivity (e.g., a strong BLE signal) includes the central processor. For example, a safety device that has unobstructed sensors (e.g., a safety device at the edge of the group) may receive a better signal than a safety device with less access to its sensors (e.g., a safety device in the middle of the group). As another example, the safety system may determine a processor in a particular position of the group (e.g., at the front of the group) is the central processor. In the example depicted in FIG. 21, the leader light mobility vehicle 2014 may have a processor that is selected by the system as the central processor. The safety system may determine the positioning of light mobility vehicles in the group (and their associated processors) based on beacon triangulation, echolocation, or geolocation (e.g., based on accurate geolocation data determined by processing group geolocation data, as discussed with respect to method 2100 of FIG. 23). As yet another example, the safety system may receive user input identifying a central processor (e.g., based on a user selecting a leader function on a safety application).

In embodiments where the central processor is selected based on the safety device's relative signal strength or position in the group, the central processor selection may be dynamic and the central processor may change as the signal strength or positions of the safety devices in the group change. For example, with reference to FIG. 21, the safety device processor associated with the leader light mobility vehicle 2014 may be selected as the central processor; however, if the right side light mobility vehicle 2016 passes the leader light mobility vehicle 2014 and takes the lead position, the safety device processor associated with the right side light mobility vehicle 2016 may become the central processor.

After operation 2004, the method 2000 may proceed to operation 2006 and relevant light mobility vehicle device(s) may be determined based on their positioning in the group. As described with respect to FIG. 17, light mobility vehicle devices may include safety devices, sensor devices, and user devices, or components thereof (e.g., sensor(s), processor(s), modem(s), or module(s), etc.). Relevant light mobility vehicle devices may include those that are unobstructed, have a direct view to the environment surrounding the group, or those that are more likely to encounter objects or obstacles prior to others in the group. Non-relevant light mobility vehicle devices may include those that are obstructed, do not have a direct view of the surrounding environment (e.g., have a view of other riders in the group), or those that are likely to collect redundant safety-related data.

For example, as shown in FIG. 21, the leader light mobility vehicle 2014, one or more of the first, second, and third right side light mobility vehicles 2016, 2018, 2020, one or more of the first, second, and third left side light mobility vehicles 2022, 2024, 2026, respectively, and the rear light mobility vehicle 2028 may have relevant light mobility vehicle devices, as they have direct, unobstructed views of the environment surrounding the group. In the example of the leader light mobility vehicle 2014, the light mobility vehicle devices that have a direct view to the front and sides of the leader light mobility vehicle 2014 may be relevant, while the light mobility vehicle device having a view to the rear of the leader light mobility vehicle 2014 may not be relevant (e.g., since they have a view of the group, not the surrounding environment). As an example, the leader light mobility vehicle 2014 may have a front camera and one or more GNSS sensors on the front or sides of the leader light mobility vehicle 2014 that may be determined to be relevant devices. In contrast, the rear light mobility vehicle 2028 may have a rear camera that may be determined to be a relevant device, while its front camera may not be relevant (e.g., since it views the group).

In a similar manner, the right side sensors of the first, second, and third right side light mobility vehicles 2016, 2018, 2020 may be relevant (e.g., to view conditions to the right of the group), while their left side sensors may not be relevant (e.g., as they view the group). Further, the left side sensors of the first, second, and third left side light mobility vehicles 2022, 2024, 2026 may be relevant (e.g., to view conditions to the left of the group), while their right side sensors may not be relevant (e.g., as they view the group). In some embodiments, one of the right side light mobility vehicles 2016, 2018, 2020 and one of the left side light mobility vehicles 2022, 2024, 2026 may be determined to be relevant. For example, the first right side light mobility vehicle 2016 and the first left side light mobility vehicle 2022 may be considered to include relevant light mobility vehicle devices as they are the first light mobility vehicles that will encounter an object, obstacle, or risk. The data collected by the light mobility vehicle devices associated with the other left and ride side light mobility vehicles 2018, 2020, 2024, 2026 may be redundant and the other left and ride side light mobility vehicles 2018, 2020, 2024, 2026 may not be considered to include relevant light mobility vehicle devices. In the depicted example, the middle light mobility vehicles 2030, 2032 may be determined to include non-relevant light mobility vehicle devices, as they are surrounded by other riders in the group with minimal to no view of the surrounding environment and are likely to have obstructed sensors.

The relevant light mobility vehicle devices may provide a 360 degree view or landscape of the risks, hazards, or threats surrounding the group. In other words, the relevant light mobility vehicle devices may provide visibility around the group.

Returning to FIG. 20, after operation 2006, the method 2000 may proceed to operation 2008 and the relevant light mobility vehicle device(s) may be instructed to transmit safety-related data to the central processor. For example, the system may instruct a relevant safety device to collect and transmit safety-related data related to conditions behind the rider (e.g., the rear rider 2028). The safety device may collect image data from a rear camera (e.g., associated with a sensor device, such as sensor device 1020 of FIG. 17) and transmit the image data to the central processor. In some embodiments, the safety device or sensor device may first process the image data to determine objects and/or hazards and transmit the threat or risk data to the central processor.

After operation 2008, the method 2000 may proceed to operation 2010 and non-relevant or redundant light mobility vehicle device(s) may be turned off or placed in low power mode. As discussed with respect to FIG. 21, the second and third right side light mobility vehicles 2018, 2020, the second and third left side light mobility vehicles 2024, 2026, and the middle light mobility vehicles 2030, 2032 may be considered to include non-relevant and/or redundant light mobility vehicle devices. The system may turn off or limit power to one or more of the light mobility vehicle devices. As another example, the front camera of the rear light mobility 2028 may be considered non-relevant and may be turned off. As yet another example, the rear camera of the leader light mobility vehicle 2014 may be considered non-relevant and turned off. As yet another example, the rear light of the leader light mobility vehicle 2014 may be considered non-relevant and placed in low power mode (e.g., a dimmer light) or turned off.

By turning off or reducing power to non-relevant or redundant light mobility vehicle devices, the system may conserve power of the group 2012. If a relevant light mobility vehicle device loses power, the light mobility vehicles may switch positions to utilize a device or component with greater power (e.g., one that was turned off and conserved power for a period of time). It is contemplated that a user may override such system functionality and turn such device(s) or component(s) back on. In some embodiments, such powering off functionality may be omitted.

Figure 22:
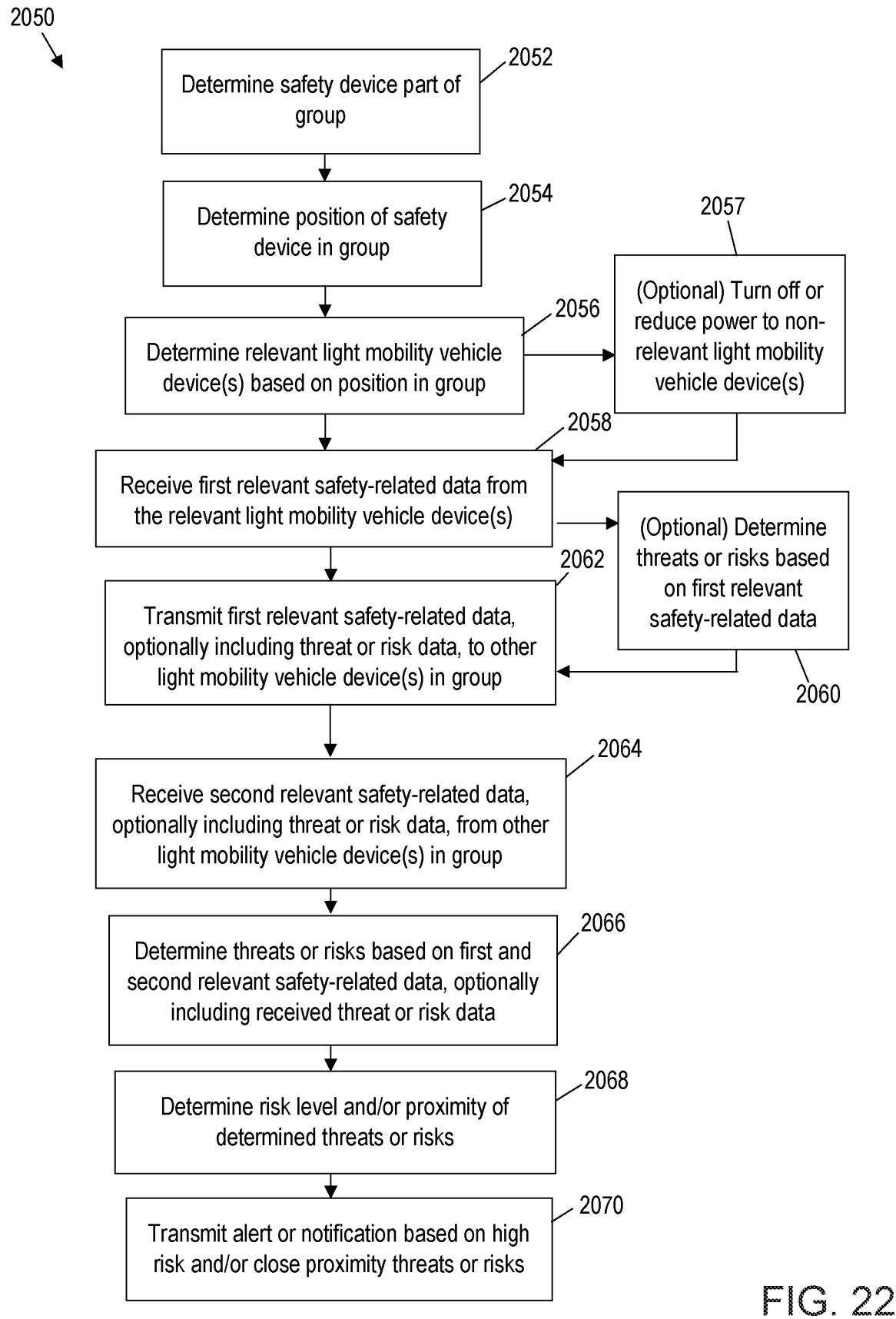
FIG. 22 is a flow chart illustrating a method of leveraging edge processing of safety-related data to optimize real time visibility for a group of riders.

FIG. 22 is a flow chart illustrating a method of leveraging edge processing of safety-related data to optimize real-time visibility for a group of riders. The method 2050 begins with operation 2052 and a safety device processor determines the safety device is part of a group in a similar manner as described above with respect to operation 2002 of method 2000. For example, the safety device processor may receive entity data (e.g., location, position, speed, etc.) from nearby entities, compare the entity data received to its own entity data, and determine the data is similar and that the entities are part of a group. As another example, the safety device processor may receive user input identifying the safety device is part of a group.

After operation 2052, the method 2050 may proceed to operation 2054 and the safety device processor may determine the position of the safety device in the group. The safety device processor may determine the position of the safety device relative to the other light mobility vehicle devices in the group based on one or more of GNSS signals, signal strength and/or direction, sensor input (e.g., image data from a camera), user input, beaconing, triangulation, echolocation, geopositioning, and the like. In some embodiments, the precise position of the safety device may be determined. In other embodiments, the relative position of the safety device may be determined (e.g., front portion/section, middle portion/section, center portion/section, rear portion/section, etc.).

After operation 2054, the method 2050 may proceed to operation 2056 and the safety device processor may determine relevant light mobility vehicle device(s) of the light mobility vehicle safety system to which the safety device is affiliated based on the position of the safety device in the group. For example, the safety device may be a component of a light mobility vehicle safety system, as described and shown in FIG. 17. Depending on the position of the safety device in the group, certain devices and components of the light mobility vehicle safety system may be relevant and others may not. For example, as shown in FIG. 21, if the safety device processor determines the safety device is associated with the leader light mobility vehicle 2014 of the group 2012, it may determine that the relevant light mobility vehicle devices are the safety device (e.g., safety device 1016 of FIG. 17), any sensors positioned on the left and right sides or top of the light mobility vehicle, a user device positioned on the handle bars (e.g., user device 1018 of FIG. 17), any front sensors (e.g., a front camera associated with user device 1018), and the like. In this example, the safety device processor may determine that any rear light mobility vehicle devices (e.g., sensor device 1020 of FIG. 17) are not relevant. As an alternative example, if the safety device processor determines the safety device is associated with the rear light mobility vehicle 2014 of the group 2012, it may determine that the relevant light mobility vehicle devices are the safety device (e.g., safety device 1016 of FIG. 17), any sensors positioned on the left and right sides or top of the light mobility vehicle, any rear devices or sensors (e.g., sensor device 1020 of FIG. 17), and the like. In this example, the safety device processor may determine that a user device positioned on the handlebars (e.g., user device 1018 of FIG. 17) and any front sensors (e.g., a front camera associated with user device 1018) are not relevant.

After operation 2056, the method 2050 may optionally proceed to operation 2057 and non-relevant light mobility vehicle devices may be turned off or placed in low power mode in a similar manner as discussed with respect to operation 2010 of method 2000.

After operation 2056, or optionally after operation 2057, the method 2050 may proceed to operation 2058 and first relevant safety-related data is received from the relevant light mobility vehicle device(s). In the example where the safety device is associated with the leader light mobility vehicle 2014 of FIG. 21, the safety device processor may receive safety-related data from the safety device components (e.g., C-V2X modem), the user device positioned on the handlebars, and/or a front camera associated with user device. The safety-related data may be indicative of objects, risks, or hazards within view of the associated light mobility vehicle. In the example of the leader light mobility vehicle 2014, the safety-related data may be indicative of objects, risks, or hazards in front of the group 2012.

After operation 2058, the method 2050 may proceed optionally to operation 2062 and the safety device processor determines threats or risks based on the first relevant safety-related data. For example, the safety device processor may analyze the first relevant safety-related data to determine whether a threat or risk exists. For example, the safety device processor may process image data received from a camera associated with the safety device, detect an object, and identify the object as a hazard or threat (e.g., a pothole).

After operation 2058, or, optionally after operation 2060, the method 2050 may proceed to operation 2062 and the first relevant safety-related data, which may include threat or risk data if operation 2062 is included, may be transmitted to other light mobility vehicle device(s) in the group. The first relevant safety-related data may be transmitted by short-range communication protocol or near-field communication protocol to other light mobility device(s) in the group, including, for example, via C-V2X, Wi-Fi, BLE, Zigbee, LoRa, or the like. In some embodiments, the first relevant safety-related data may be transmitted simultaneously to the other light mobility vehicle devices in the group so that the riders in the group are simultaneously aware of hazards and risks in view of the light mobility vehicle associated with the safety device. In some embodiments, certain riders in the group may not have a safety device or may have a portable safety device or dedicated user device configured to receive the safety-related data.

After operation 2062, the method 2050 may proceed to operation 2064 and the safety device processor may receive second relevant safety-related data, optionally including threat or risk data, from one or more other light mobility vehicle devices in the group. In some embodiments, the other light mobility vehicle device(s) in the group may process safety-related data received (e.g., received from associated sensors, sensor devices, or user devices) to determine threats or risks and transmit threat or risk data to the safety device processor if a threat or risk is determined. In some embodiments, the other safety device(s) in the group may transmit safety-related data received that does not include threat or risk data (e.g., without prior processing).

After operation 2064, the method 2050 may proceed to operation 2066 and the safety device processor may determine whether one or more threats or risks exist based on the first and second relevant safety-related data, optionally including threat or risk data. For example, the safety device processor may execute an object detection algorithm to determine whether there are hazardous objects or threats in received image data. In some embodiments, the safety device processor may receive object data indicative of surrounding objects. For example, a sensor device may execute the object detection algorithm to determine objects in received image data (e.g., received from an associated camera) and transmit the object data to the safety device processor. The safety device processor may determine whether the detected objects are threats based on stored data (e.g., historical data of determined threats). In some embodiments, the safety device processor may determine whether one or more threats or risks exist based on the first relevant safety-related data. The safety device processor may also receive threat or risk data from other safety devices in the group and combine the threat or risk data with the determined one or more threats or risks to determine threats or risks surrounding the group.

After operation 2066, the method 2050 may proceed to operation 2068 and the safety device processor may determine a risk level and/or proximity of determined threats or risks. A risk level may be determined based on a predicted degree of harm or damage that can be caused by the threat or risk. As an example, a pothole may cause discomfort to a road user or damage to a road user's vehicle, while a collision may result in bodily harm or death. A risk or threat that may result in bodily harm or death may be considered higher risk than a risk or threat that causes discomfort to a road user or damage to a road user's vehicle. In the example, a higher risk level may be associated with a collision than a pothole. A risk level may factor in the proximity of the threat or risk. For example, a threat or risk that is in closer proximity to a road user may be considered to have a higher risk than a threat or risk that is further away from the road user.

In some embodiments, the safety device memory or a database in communication with the safety device may store data related to risks and their associated risks values. As an example, an oncoming vehicle with high collision risk may be assigned a higher risk level or value than a pothole or other road obstacle. For example, a high collision risk may be assigned a risk value of 5, while a pothole may be assigned a risk value of 2, with the higher risk value indicating a higher risk level. As another example, a pothole may be 20m in front while a high collision risk location may be 150m in front. In this example, the closer proximity risk may be considered a higher risk at a certain moment in time.

After operation 2068, the method 2050 may proceed to operation 2070 and the safety device processor may transmit an alert or notification to an associated light mobility vehicle device indicative of high risk and/or close proximity threats or risks. The alert or notification may be transmitted via one or more feedback components (e.g., feedback components 406 of FIG. 19 or feedback components 123 of FIG. 2). The alert or notification may be visual, haptic, and/or auditory feedback. For example, the one or more feedback components may include a display that provides visual feedback to a user. As another example, the one or more feedback components may include a light (e.g., LED), a speaker, horn, or bell (e.g., that emits an alarm or alert sound), a haptic device, and the like. The one or more feedback components may vary based on the direction of a threat. For example, a light may flash on or a sound may be emitted from a left side of a safety device to indicate a threat from the left and a light may flash on or a sound may be emitted from a speaker on a right side of the safety device to indicate a threat from the right.

While various risks or threats may be detected around the entity, the highest risk and closest threats or risks may be reported to a user to avoid overwhelming the number of alerts or notifications transmitted. In the above example, where a pothole is closer than a collision risk, the notification may indicate pothole ahead, and once the rider passes the pothole, another notification may be transmitted indicating collision risk ahead. As another example, the pothole may be ignored and the notification may indicate collision risk ahead, as a collision risk may be considered higher risk than a pothole.

As an example of the method 2050 described with respect to FIG. 22, as shown in FIG. 21, the leader light mobility vehicle 2014 safety device may receive image data from a front camera positioned on the leader light mobility vehicle 2014, a BSM via its C-V2X communication protocol from a nearby automotive vehicle 2036, safety-related data from a safety device associated with the first left light mobility vehicle 2022, and safety-related data from a rear camera positioned on the rear light mobility vehicle 2028. The safety device processor may determine that i) there is a pot hole 2034 ahead of the group 2012 based on the image data received from its front camera, ii) there is an automotive vehicle 2036 approaching at the intersection from the right of the group based on the BSM received, iii) there is a cone 2038 to the left of the group 2012 based on the safety-related data received from the first left light mobility vehicle 2022 safety device, and iv) there is an automotive vehicle 2040 approaching from behind the group 2012 based on the safety-related data received from the rear light mobility vehicle 2028 safety device. The safety device processor associated with the leader light mobility vehicle 2014 may determine that the automotive vehicle 2036 approaching at the intersection has a high probability of running the stop sign based on its speed and mark the automotive vehicle 2036 approaching as the highest risk threat. The safety device processor may transmit a message, alert, or notification warning of the risk of the automotive vehicle 2036 approaching. As an example, the safety device processor may transmit a signal to a front light to flash and warn the oncoming vehicle. In this manner, the group members may leverage data received and processed by other light mobility vehicle devices in the group for improved visibility.

Figure 23:
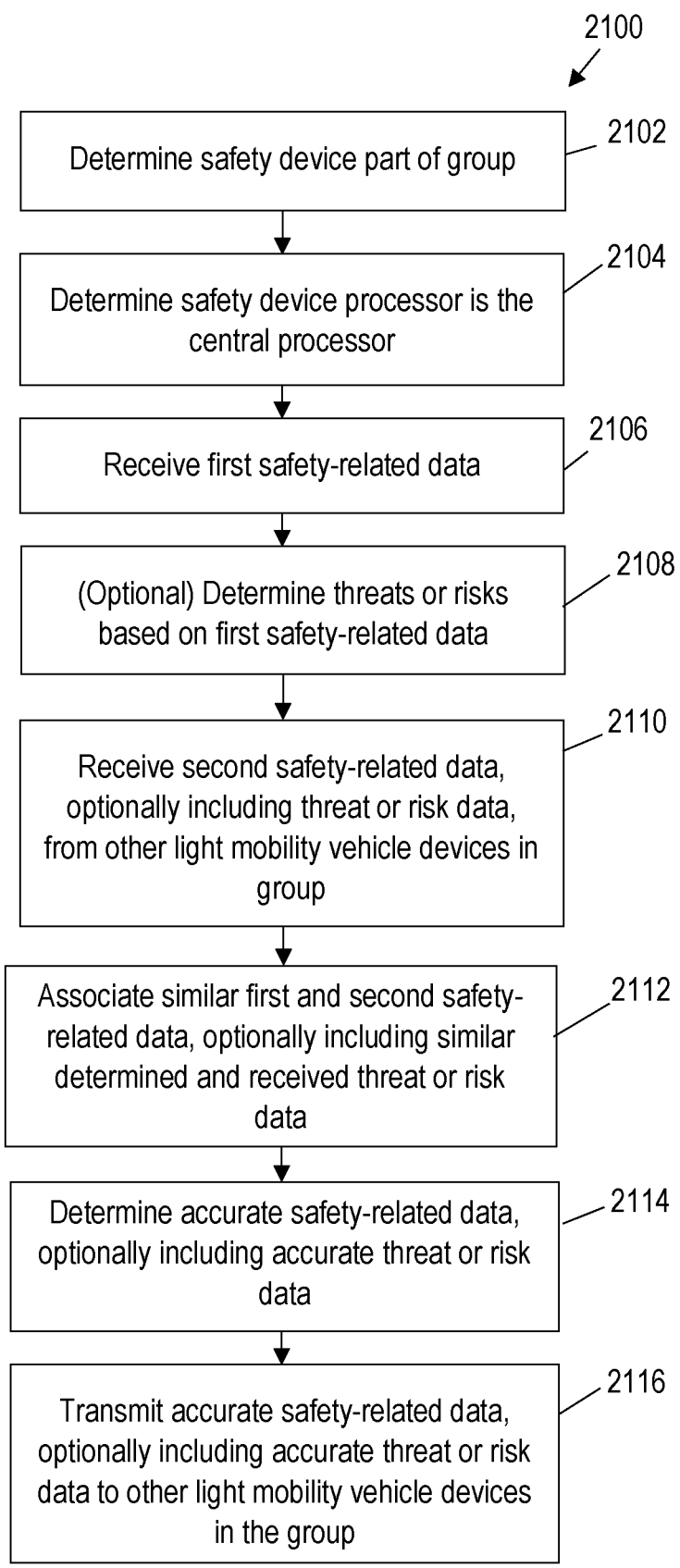
FIG. 23 is a flow chart illustrating a method of leveraging safety-related data from multiple light mobility vehicle devices in a group to improve accuracy of threat and risk detection.

FIG. 23 is a flow chart illustrating a method of leveraging safety-related data from multiple light mobility vehicle devices in a group to improve accuracy of safety-related data, including threat and risk detection. The method 2100 begins with operation 2102 and the safety device processor determines that the safety device is part of a group in a similar manner as described with respect to operation 2052 of method 2050.

After operation 2102, the method 2100 may proceed to operation 2104 and the safety device processor may determine that it is the central processor in a similar manner as described with respect to operation 2060 of method 2050 and operation 2004 of method 2000. For example, the safety device processor may determine that it is the central processor based on the connectivity or signal strength of the safety device, its position within the group, or based on user input.

After operation 2104, the method 2100 may proceed to operation 2106 and the safety device processor may receive first safety-related data from light mobility vehicle device (s), or components thereof, that are part of the same light mobility vehicle system as the safety device (e.g., user device, sensor device, safety device sensors, etc. positioned on the same light mobility vehicle). In the example where the safety device is associated with the leader light mobility vehicle 2014 of FIG. 21, the safety device processor may receive safety-related data from the safety device components (e.g., C-V2X modem), the user device positioned on the handlebars, and/or a front camera associated with user device. The first safety-related data may be indicative of conditions, objects, risks, or hazards within view of the associated light mobility vehicle.

After operation 2106, the method 2100 may optionally proceed to operation 2108 and the safety device processor may determine threats or risks based on the received first safety-related data. For example, the safety device processor may analyze a received BSM from a nearby entity (e.g., with a C-V2X device) to determine whether the entity is a threat (e.g., the entity is approaching at a speed and trajectory likely to cause a collision with one or more riders in the group).

After operation 2106, or optionally operation 2108, the method may proceed to operation 2110 and the safety device processor may receive second safety-related data, optionally including threat or risk data, from other light mobility vehicle device(s) in the group. In some embodiments, the other safety devices in the group may process safety-related data received (e.g., received from associated sensors, sensor devices, or user devices) to determine threats or risks and transmit threat or risk data to the central processor if a threat or risk is determined. In some embodiments, the other safety devices in the group may transmit safety-related data received (e.g., without prior processing). The second safety-related data may be indicative of conditions, objects, risks, or hazards within view of the respective light mobility vehicle.

After operation 2110, the method 2100 may proceed to operation 2112 and the safety device processor may associate similar first and second safety-related data and/or similar determined and received threat or risk data. In some embodiments, the safety device processor may associate similar first and second safety-related data. The safety devices in the group may receive and transmit similar safety-related data. As an example, with reference to FIG. 21, the safety devices associated with the first, second, and third left side light mobility vehicles 2022, 2024, 2026 may each receive data related to the cone 2038, including its shape and position. The safety devices associated with the third left side light mobility vehicle 2026 and the rear light mobility vehicle 2028 may each receive data related to the automotive vehicle 2040. For example, they may both receive a BSM from a C-V2X modem associated with the automotive vehicle 2040 and image data related to the automotive vehicle 2040 (e.g., from their respective rear view cameras). The safety devices associated with the leader light mobility vehicle 2014 and the first right side light mobility vehicle 2016 may each receive a BSM from the automotive vehicle 2036 and may also receive image data or user input related to the pothole 2034. In some embodiments, a plurality of safety devices in the group 2012 may receive BSMs from the automotive vehicles 2036, 2040. Such data may be associated as similar data based on a location associated with the data (e.g., a road hazard in the same place, a car coming from the same direction, etc.) or similarities in the data itself. For example, the safety device processor may associate similar BSM data or similar object data.

In embodiments where the method proceeds to operation 2108 and the safety device processor determines threats or risks based on the first safety-related data, and the safety device processor receives threat or risk data from other safety devices in the group at operation 2110, the safety device processor may associate similar threat or risk data determined and received. For example, with reference to FIG. 21, if the safety device processor is associated with the leader light mobility vehicle 2014, the safety device processor may receive input from the front camera of an object on the road. The safety device processor may determine that the object is a pothole and a road hazard in location X. A second safety device associated with the first right side light mobility vehicle 2016 may also receive input from an associated front camera of an object on the road and determine that the object is a pothole and a road hazard in location X. The second safety device may transmit this threat or risk data (pothole and road hazard in location X) to the safety device processor. The safety device processor may associate this data determined and received since they both relate to a road hazard in location X.

After operation 2112, the method 2100 may proceed to operation 2114 and accurate safety-related data, including accurate threat or risk data, may be determined. In some embodiments, the safety device processor may determine accurate data based on patterns, trends, or redundancy in the data. For example, with reference to FIG. 21, the safety device processor may receive data from the first, second, and third left side light mobility vehicles 2022, 2024, 2026 related to an object at certain position in the road and associate this data as similar safety-related data. The safety device processor may determine that two of the three data sets identify the object in position X, while the third data set identifies the object in position Y. The safety device processor may determine that position X is accurate based on the redundancy in the data received. In this manner, safety devices or systems may improve object location accuracy.

In some embodiments, the safety device processor may determine accurate data based on the signal strength of the safety devices providing the data. For example, the safety device processor may receive signals from the safety devices in the group and determine certain signals are stronger than others. The safety device processor may determine that the data received from the safety device(s) with the stronger signal(s) is accurate and use that data to determine threats or risks. As an example, with reference to FIG. 21, the leader light mobility vehicle 2014 may incorporate the safety device processor, which was previously identified as being associated with the safety device having the strongest signal of the group. The safety device processor may ignore any redundant incoming safety-related data received from safety devices with weaker signals, as it may determine that its safety-related data collected is more accurate based on the signal strength of its associated safety device. As another example, the safety device processor may receive data from the first, second, and third left side light mobility vehicles 2022, 2024, 2026 related to the cone 2038, including its shape and position, and associate this data as similar safety-related data. The safety device processor may also receive signal strength data from the safety devices associated with the first, second, and third left side light mobility vehicles 2022, 2024, 2026 (or other associated devices, e.g., user device or sensor device) and determine which safety device has the strongest signal. The safety device processor may determine that the data related to the cone 2038 from the safety device with the strongest signal is accurate and use that data.

In embodiments where the method proceeds to operation 2108 and the safety device processor determines threats or risks based on the first safety-related data, and the safety device processor receives threat or risk data from other safety devices in the group at operation 2110, the safety device processor may determine accurate threat or risk data. For example, with reference to FIG. 21, the safety device processor may receive data from safety devices associated with the first and second light mobility vehicles 2022, 2024 identifying the cone 2038 in position X as a road hazard, and associate this data as similar safety-related data. The safety device processor may receive data from a safety device associated with the third left side light mobility vehicle 2026 identifying the object in the same position X as a ball. The safety device processor may associate this data with the cone data received from the first and second light mobility vehicle 2022, 2024 safety devices since both data sets identify objects at position X. The safety device processor may determine that the cone object identification is accurate based on the redundancy in the data received.

After operation 2114, the method 2100 may proceed to operation 2116 and the accurate safety-related data, including accurate threat or risk data, may be transmitted to other light mobility vehicle devices in the group (e.g., to other safety devices, user devices, etc.). The other safety device processors may modify their algorithms if the accurate data received deviates from the safety-related data (in some embodiments, including the threat or risk data) transmitted to improve accuracy of the data they collect and determine. In some embodiments, an alert or notification may be transmitted to a user device to calibrate certain components of the light mobility vehicle system for improved accuracy. For example, a sensor may need to be adjusted (e.g., moved to a position with a better signal) or calibrated to improve the accuracy of the safety-related data collected. By leveraging safety-related data collected by the light mobility vehicle safety systems in the group, more accurate safety-related data and threat and risk data is provided to the group, improving the group's visibility of risks and hazards surrounding the group. Further, individual safety devices may leverage this accurate data to improve upon their own processing capabilities and functionality. In one example, more accurate GNSS data may be available via method 2100, improving available echoposition data and providing a more accurate position of the group in space. While the above method 2100 is described with respect to a central processor, it is contemplated that the central processor may be omitted and the safety device processors associated with the light mobility vehicles in the group may perform method 2100 and determine accurate data based on safety-related data received.

Figure 24:
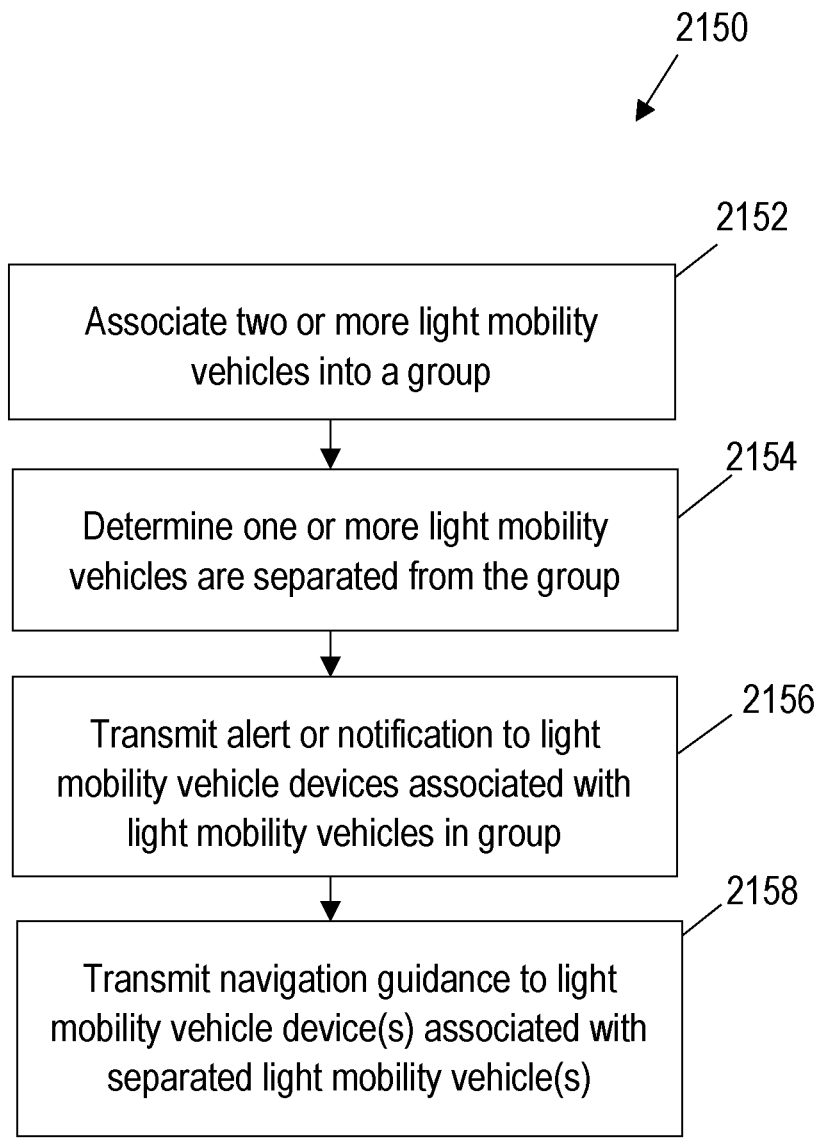
FIG. 24 is a flow chart illustrating a method for keeping a group of riders or light mobility vehicles together.

FIG. 24 is a flow chart illustrating a method for keeping a group of riders or light mobility vehicles together. The method 2150 begins with operation 2152 and two or more light mobility vehicles are associated into a group in a similar manner as described with respect to operation 2002 of method 2000. For example, the light mobility vehicles may be associated into a group based on similar location, proximity, speed, heading, movement patterns, user input, and the like.

After operation 2152, the method 2150 may proceed to operation 2154 and the system may determine that one or more light mobility vehicles are separated from the group. For example, the system may determine the one or more light mobility vehicles are separated based on entity data received from the light mobility vehicles in the group. For example, the system may determine the one or more light mobility vehicles are separated based on one or more of position or location, speed, heading, movement patterns, and the like, of the one or more light mobility vehicles deviating from the same of the other light mobility vehicles in the group. For example, the system may determine that the one or more light mobility vehicles are in a different location from the other light mobility vehicles in the group or are a certain distance from the other light mobility vehicles in the group. In some embodiments, the location of the separated light mobility vehicle(s) may deviate from a planned route (e.g., determined via a navigational application). As another example, the system may determine the one or more light mobility vehicles stopped or slowed down while the other light mobility vehicles maintained the same speed. In some embodiments, the system may determine the one or more light mobility vehicles are separated based on user input. For example, a user may input into a safety application that the user has been separated from the other members in the group.

After operation 2154, the method 2150 may proceed to operation 2156 and the system may transmit an alert or notification to light mobility vehicle devices associated with the light mobility vehicles in the group. For example, the system may transmit the alert or notification to one or more safety devices or user devices associated with the light mobility vehicles. The alert or notification may be displayed on a display associated with the safety device or user device or otherwise presented to a user via haptic or audible feedback. The alert or notification may be transmitted to the separated light mobility vehicle(s) and/or to the other light mobility vehicle(s). For example, the alert or notification to the separated light mobility vehicle(s) may indicate that they have separated from the group. In some embodiments, the notification may include the location of the other light mobility vehicle(s). As another example, the alert or notification to the other light mobility vehicle(s) may be a basic message that one or more light mobility vehicles have been separated from the group or a more detailed message, for example, including which light mobility vehicle(s) are separated and/or the location of the separated light mobility vehicle(s).

After operation 2156, the method 2150 may proceed to operation 2158 and the system may transmit navigation guidance to the light mobility vehicle device(s) associated with the separated light mobility vehicle(s). For example, the light mobility device may be a user device or a safety device with a safety application or third-party navigational application displayed on an associated display or user interface. The system may transmit an updated route to the safety application or third-party navigational application to reroute the light mobility vehicle to the other light mobility vehicles in the group.

While the above method 2150 is described with respect to the system, it is contemplated that method 2150 may be executed by a safety device processor or other light mobility vehicle device processor. For example, the processor may determine the associated light mobility vehicle is separated from the group based on no longer receiving a signal (e.g., a C-V2X signal) from the other light mobility vehicle devices in the group. As another example, the processor may receive entity data related to the other light mobility vehicles in the group from the server that indicates the associated light mobility vehicle is separated from the group (e.g., where the entity data received deviates from the entity data associated with the separated light mobility vehicle). The processor may use entity data received from the server (e.g., location data) to determine how to navigate back to the other light mobility vehicles in the group.

Figure 25:
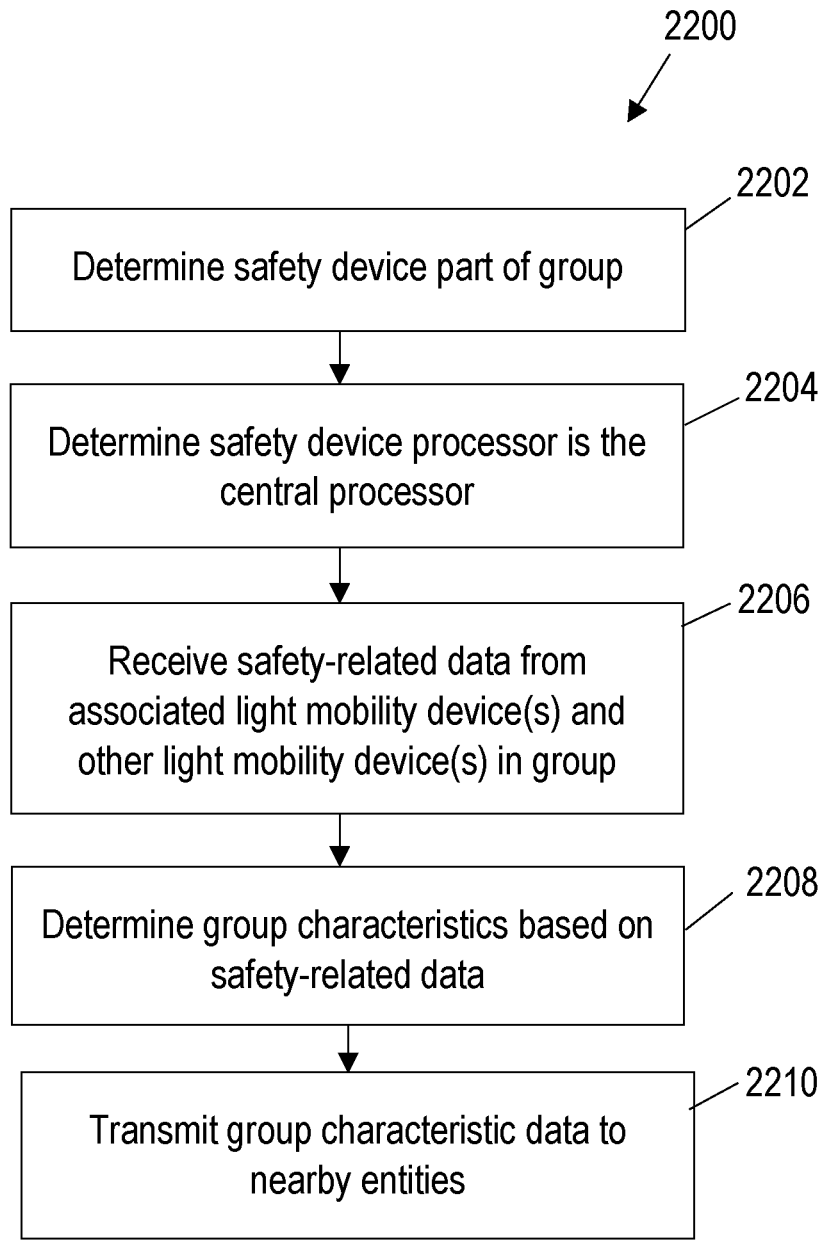
FIG. 25 is a flow chart illustrating a method of alerting nearby entities of relevant group data.

FIG. 25 is a flow chart illustrating a method of alerting nearby entities of relevant group data. The method 2200 begins with operation 2202 and the safety device processor may determine that its associated safety device is part of a group in a similar manner as described with respect to operation 2052 of method 2050 and operation 2102 of method 2100. For example, the safety device processor may receive entity data from other safety devices in the group and compare the received entity data to its determined entity data and determine, based on similar entity data, that it is part of a group with the other safety devices. For example, the safety device processor may determine that its associated safety device and the other safety devices are part of a group based on the safety devices having a similar location, proximity, speed, heading, movement patterns, and the like. In some embodiments, the safety device processor may receive user input indicating it is part of a group with the other safety devices.

After operation 2202, the method 2200 may proceed to operation 2204 and the safety device processor may determine that it is the central processor in a similar manner as described with respect to operation 2104 of method 2100 and operation 2060 of method 2050. For example, the safety device processor may determine that it is the processor based on the connectivity or signal strength of the safety device, its position within the group, or based on user input.

After operation 2204, the method 2200 may proceed to operation 2206 and the safety device processor may receive safety-related data from one or more associated light mobility devices and one or more other light mobility devices in the group. The one or more associated light mobility devices may include a C-V2X module or modem coupled to the safety device processor (e.g., part of the same safety device), a user device or sensor device associated with or coupled to the light mobility vehicle associated with the safety device processor and in communication with the safety device processor, and the like. The one or more other light mobility vehicle devices may include one or more safety devices, user devices, sensor devices, and the like, associated with the one or more other light mobility vehicles in the group. In some embodiments, the safety-related data may include determined threats or hazards.

After operation 2206, the method 2200 may proceed to operation 2208 and group characteristics may be determined based on the received or determined safety-related data. Group characteristics may include, for example, average speed of light mobility vehicles in the group, dimensions of the group (e.g., width, length, etc.), size (e.g., number of light mobility users in group), trajectory and heading of the group, average or estimated amount of time for entire group to pass a position or point location (e.g., based on average speed and length of group), type of light mobility vehicles (e.g., bicycle vs. scooter), breaks or gaps in group (location and size of breaks), position data (e.g., position of front and rear of group, of sides of group, of middle of group, etc.), and the like. The group characteristic data may be considered a type of safety-related data. As an example, the safety device processor may average all speed data determined or received to determine the average speed of the group. As another example, the safety device processor may determine a length of the group by determining a distance between the first and last light mobility vehicles in the group (e.g., the leader light mobility vehicle 2014 and rear light mobility vehicle 2028, respectively, of FIG. 21) based on received location or position data. In a similar manner, the safety device processor may determine a width of the group by determining a distance between a left side and right side light mobility vehicle in the group (e.g., the first left side light mobility vehicle 2022 and the first right side light mobility vehicle 2016, respectively, of FIG. 21) based on received location or position data. As yet another example, the safety device processor may determine that the group will pass or clear a particular position (e.g., the position of the automotive vehicle 2036) within a particular amount of time based on the average speed of the group and the length of the group. For simplicity, if the group is 0.5 miles in length and the speed of the group is 20 mph, the group will pass a particular position in 1.5 minutes. In other words, after the first light mobility vehicle passes a position, it will take 1.5 minutes for the rest of the light mobility vehicles in the group to pass the same position.

In some embodiments, the safety device processor may tack on a safety margin or buffer to the group characteristic or safety-related data to increase safety for the group. For example, the safety device processor may increase the determined length or width dimensions of the group by a certain margin (e.g., 0.01, 0.02, 0.03, 0.1, 0.2, etc.) so that the group seems slightly longer or wider than it actually is. As another example, the safety device processor may increase the amount of time estimated for passing a certain position. In the above example, the safety device processor may adjust the 1.5 minute timeframe for passing the position to 2 minutes.

After operation 2208, the method 2200 may proceed to operation 2210 and the group characteristic data may be transmitted to nearby entities. In some embodiments, the group characteristic data is transmitted via C-V2X communication protocol to another nearby entity (a non-group member) that has a compatible C-V2X modem. For example, the group characteristic data may be incorporated into a BSM transmitted to a nearby entity. In some embodiments, the group characteristic data is transmitted via another communication protocol, including, for example, Wi-Fi, BLE, cellular (LTE), and the like. For example, the group characteristic data may be transmitted via the server to another entity. The group characteristic data may be transmitted with or without the safety margin or buffer. In the above example, the group characteristic data may indicate the group will pass a position in a 1.5 minute timeframe (if it is transmitted without the safety margin or buffer) or, alternatively, that the group will pass the position in 2 minutes (if it is transmitted with the safety margin or buffer). Including a safety margin or buffer may reduce the risk of another entity colliding with members in the group (for example, there is a greater chance they will leave more space or time for the group to pass).

Transmitting group characteristic data from one light mobility vehicle device in the group simplifies and reduces the redundancy in the data received by other entities from the group. In this manner, the group may be treated by the system as an individual data set.

As an example of method 2200, with reference to FIG. 21, the leader light mobility vehicle 2014 may have a safety device with a strong signal and its safety device processor may determine that it is the central processor. The leader light mobility vehicle 2014 safety device processor may receive safety-related data from the other light mobility vehicles in the group 2012 and may determine certain group characteristic data. The leader light mobility vehicle 2014 safety device processor may receive a BSM from its C-V2X modem that was received from a compatible C-V2X modem associated with the automotive vehicle 2036. The BSM may indicate that the automotive vehicle 2036 will approach the intersection at the same time as the leader light mobility vehicle 2014. Based on the length of the group and average speed of the group, the leader light mobility vehicle 2014 safety device processor may determine that the entire group will pass or clear the intersection in approximately 2 minutes. The leader light mobility vehicle 2014 safety device processor may transmit this 2 minute passing timeframe to an automotive vehicle connectivity device (e.g., the one or more automotive vehicle connectivity devices or modules 104 described with respect to system 100 of FIG. 1) associated with the automotive vehicle 2036.

Tethering for Improved Connectivity

In several embodiments, safety devices and systems associated with different entities may tether to one another to enhance connectivity of individual safety devices and systems and/or to improve information available to safety devices and systems with limited to no connectivity. Such tethering may occur in a group setting (e.g., between light mobility vehicles in a group) or between individual or unrelated entities (e.g., not associated in a group). Tethering may enable light mobility vehicle devices to continue to receive and transmit safety-related data (e.g., BSMs via C-V2X) with limited to no connectivity. Such tethering may occur automatically between two entities or devices configured with a safety application or the algorithms described herein. Such capabilities are desirable for safety systems described herein to continue to share safety-related data with entities having limited to no connectivity to prevent collisions or other hazards (and continue to meet the user's safety expectations).

In some embodiments, a safety device in a group may tether to one or more other safety devices, user devices, and/or sensor devices in the group. For example, the safety device may have a weak signal or poor connectivity and may tether to another safety device with a better signal to improve its signal and connectivity. In embodiments where a central safety device is selected based on its strong connectivity, the safety device may tether to the central safety device. In this manner, disclosed systems may improve connectivity of riders in a group.

Figure 26:
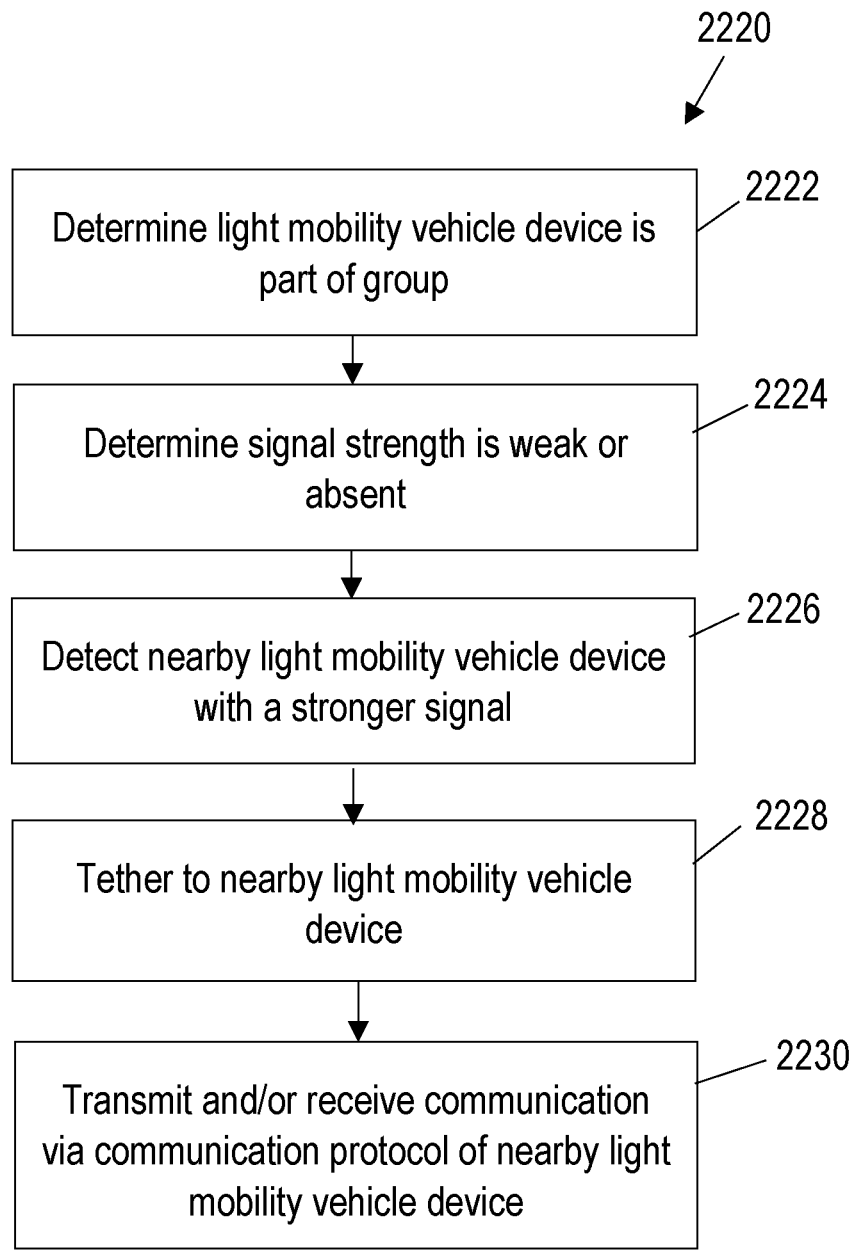
FIG. 26 is a flow chart illustrating a method of tethering light mobility vehicle devices in a group to improve connectivity of group members with limited to no connectivity.

FIG. 26 is a flow chart illustrating a method of tethering light mobility vehicle devices in a group to improve connectivity of group members with limited to no connectivity. The method 2220 begins with operation 2222 and the light mobility device processor determines the light mobility vehicle device (e.g., safety device, user device, sensor device, etc.) is part of a group in a similar manner as described above with respect to operation 2002 of method 2000. For example, the light mobility vehicle device processor may receive entity data (e.g., location, position, speed, etc.) from nearby entities, compare the entity data received to its own entity data, and determine the data is similar and that the entities are part of a group. As another example, the light mobility vehicle device processor may receive user input identifying the light mobility vehicle device is part of a group.

After operation 2222, the method 2220 may proceed to operation 2224 and the light mobility vehicle device processor may determine that the signal strength of the light mobility vehicle device is weak or absent. After operation 2224, the method 2220 may proceed to operation 2226 and the light mobility vehicle device processor may detect a light mobility vehicle device nearby that has a stronger signal. After operation 2226, the method 2220 may proceed to operation 2228 and the light mobility vehicle device processor may tether to the nearby light mobility vehicle device.

After operation 2228, the method 2220 may proceed to operation 2230 and the light mobility vehicle device processor may transmit and/or receive communication via the communication protocol of the nearby light mobility vehicle device. For example, the light mobility vehicle device processor may transmit and receive safety-related data to and from the other light mobility vehicle devices in the group or the central processor as described with respect to methods 2000, 2050, 2100, 2200 of FIGS. 25, 27-28, and 30. The light mobility vehicle processor may use the Wi-Fi, BLE, LTE, or the like, of the nearby light mobility vehicle device to transmit and receive the safety-related data from the other light mobility vehicle devices in the group. By tethering a light mobility vehicle device in a group with little to no signal to another light mobility vehicle device in the group, a group of riders may be able to remain simultaneously aware of safety risks and hazards around the group regardless of connectivity capabilities, further increasing the awareness and safety of the group.

In several embodiments, a safety system is disclosed that includes one or more entities inside a dead zone (or one or more entities with limited to no connectivity) and one or more entities outside of the dead zone (or one or more entities with connectivity). A dead zone may be an area that has limited to no connectivity (e.g., cellular and/or Wi-Fi connectivity, GNSS signals, or the like), including, for example, a tunnel. In several embodiments, the one or more entities inside the dead zone have no cellular or GNSS signals. In some embodiments with a plurality of entities inside the dead zone, the entities may pass safety-related data via C-V2X (which does not require the cellular or GNSS signals). Safety-related data may be passed from entity to entity until it reaches an entity outside of the dead zone. In this manner, an entity outside of the dead zone (e.g., outside a tunnel) may receive safety-related data related to one or more entities inside of the dead zone (inside the tunnel). As one example, the entity outside of the tunnel may receive information related to a crash inside of the tunnel. The entity outside of the dead zone may have strong connectivity (e.g., cellular and/or Wi-Fi connectivity) and may transmit the safety-related data to other entities outside of the dead zone. For example, the entity outside the dead zone may transmit the safety-related data via a cellular network to other entities that are further away. In the example of a crash inside of a tunnel, the entity outside of the tunnel may transmit the crash information to other entities approaching the tunnel from further away (e.g., outside the range of C-V2X).

As another example, an entity outside a dead zone with strong connectivity may receive safety-related data from one or more entities outside of the tunnel (e.g., via a cellular network) and may transmit the safety-related data to an entity inside of a dead zone. The entity inside of the dead zone may transmit the safety-related data to one or more other entities inside of the dead zone via a short-range communication protocol (e.g., C-V2X). This safety-related data may be transmitted between entities inside of the dead zone via a short-range communication protocol (e.g., C-V2X). For example, an entity outside of a tunnel may receive information related to a crash outside of and in front of the tunnel. The entity may transmit this crash information to an entity inside of the tunnel via C-V2X and the crash information may be passed back to entities inside the tunnel via C-V2X communication. In this manner, the entities inside the tunnel with limited to no connectivity can receive information related to a crash ahead.

By providing safety-related data to entities with limited to no connectivity, disclosed safety systems can improve safety for road users and increase visibility of unsafe road conditions or hazards.

Figure 27:
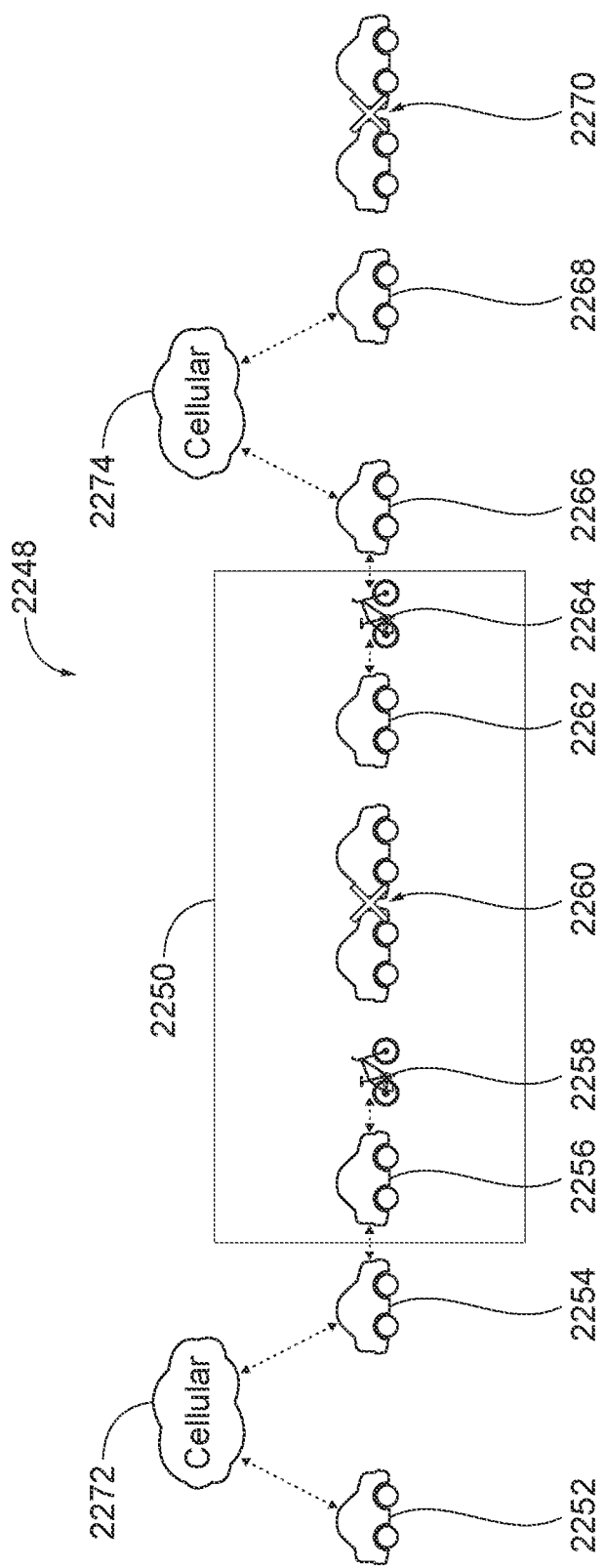
FIG. 27 shows an image of an exemplary safety system with entities inside and outside of a dead zone.

FIG. 27 shows an image of an exemplary safety system 2248 with entities inside and outside of a dead zone 2250. In the depicted embodiment, a first entity 2252 is outside the dead zone 2250 and within a long distance range of the dead zone 2250 or outside a short-distance range of C-V2X functionality. A second entity 2254 is outside the dead zone 2250 and within a short-distance range of a third entity 2256 that is inside the dead zone 2250. The third entity 2256 is within a short distance range of a fourth entity 2258 that is also inside the dead zone 2250. A crash 2260 is inside the dead zone 2250 and visible and in front of the fourth entity 2258. A fifth entity 2262 is in the dead zone 2250 and in front of the crash 2260. The fifth entity 2262 is within a short distance range of a sixth entity 2264 that is also inside the dead zone 2250. The sixth entity 2264 is within a short-distance range of a seventh entity 2266 that is outside the dead zone 2250. An eighth entity 2268 is outside the dead zone 2250 and within a long distance range of the dead zone 2250 and the seventh entity 2266. A crash 2270 is outside of and in front of the dead zone 2250 and is visible and in front of the eighth entity 2268. In the depicted example, the fourth and sixth entities 2258, 2264 are light mobility vehicles and the other entities are cars; however, it is contemplated that the entities can be any type of vehicle (e.g., all cars or all light mobility vehicles).

An example of safety-related data exchange through the safety system 2248 will now be explained. The fourth entity 2258 may detect the crash 2260 ahead inside the dead zone 2250. For example, the fourth entity 2258 may receive image data from a camera on the handlebars capturing an image of the crash. A processor associated with the fourth entity 2258 (e.g., a safety device processor or sensor device processor) may perform an object detection algorithm and determine a crash is ahead. The processor may transmit the crash data via a C-V2X module to the third entity 2256. The third entity 2256 may transmit the crash data via a C-V2X module to the second entity 2254. The second entity 2254 may have cellular connectivity outside the dead zone 2250 and may transmit the crash data via a cellular network 2272 to the first entity 2252. In this manner, by leveraging a mesh network of C-V2X embedded devices, data related to the crash 2260 inside the dead zone 2250 is communicated to entities outside the dead zone 2250 despite the entities inside the dead zone 2250 having limited to no connectivity.

As another example, the eighth entity 2268 may detect the crash 2270 in front of the dead zone. The eighth entity 2268 may transmit crash data via a cellular network 2274 (a different or the same cellular network as the cellular network 2272 described previously) to the seventh entity 2266. The seventh entity 2266 may transmit the crash data via a C-V2X module to the sixth entity 2264. The sixth entity 2264 may transmit the crash data via a C-V2X module to the fifth entity 2262. In this manner, by leveraging a mesh network of C-V2X embedded devices, data related to the crash 2270 outside the dead zone 2250 is communicated to entities inside the dead zone 2250 despite the entities inside the dead zone 2250 having limited to no connectivity.

While the above embodiments and examples of tethering between entities in a dead zone are described with respect to C-V2X modules and C-V2X embedded devices, it is contemplated that the same tethering can be done with cellular (LTE), BLE, and/or Wi-Fi communication between entities inside a dead zone.

Figure 28:
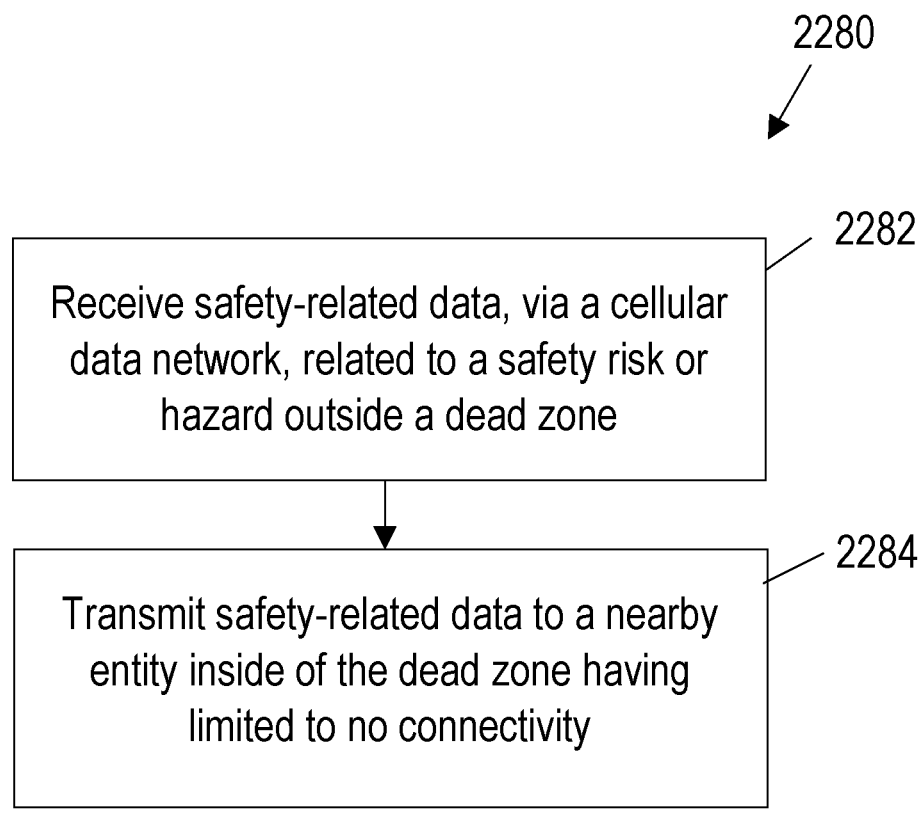
FIG. 28 is a flow chart illustrating a method of sharing relevant safety-related data with one or more unrelated entities having limited to no connectivity.

FIG. 28 is a flow chart illustrating a method of sharing relevant safety-related data with one or more unrelated entities having limited to no connectivity. The method 2280 begins with operation 2282 and safety-related data related to a safety risk or hazard outside a dead zone is received via a cellular data network. The safety-related data may be received by an entity outside and nearby the dead zone. The safety-related data may be received from an entity that is outside a short-distance range of the dead zone (e.g., outside a distance range of C-V2X transmission or other short-range communication protocol). As discussed, the dead zone may be an area of little to no connectivity, such as a tunnel for example, or it may refer to a spot where an entity or its associated device has little to no connectivity. In the example depicted in FIG. 27, the safety-related data may be received by the seventh entity 2266 via the cellular data network 2274 from the eighth entity 2268. The seventh entity 2266 is outside and near to (e.g., within a distance range of C-V2X transmission or other short-communication protocol) the dead zone 2250, while the eighth entity 2268 is outside the short-distance range of the dead zone 2250. In this example, the safety-related data is related to a crash 2270 outside and in front of the dead zone 2250.

After operation 2282, the method 2280 may proceed to operation 2284 and the safety-related data may be transmitted to a nearby entity inside of the dead zone having limited to no connectivity. The safety-related data may be transmitted via a near-field communication protocol (e.g., C-V2X, BLE, Wi-Fi, or the like). In the example depicted in FIG. 27, the safety-related data may be transmitted from the seventh entity 2266 via a short-range communication protocol such as C-V2X to the sixth entity 2264 in the dead zone 2250.

Gamification

In several embodiments, safety systems, methods, and devices improve personalized safety for road users by monitoring user behavior and safety statistics in combination with safety-related data received and ingested to provide feedback to users related to the respective user's safety while on the road. In several embodiments, the disclosed safety systems, methods, and devices leverage safety-related data collected and/or determined (e.g., via safety devices, user devices, cloud processing, etc.) to gamify the ride and drive experience with a focus on road safety. By providing feedback related to a user's safety during a road trip or ride, safety systems, methods, and devices encourage safe behavior and actions.

In several embodiments, safety systems, methods, and devices generate a safety score or ranking. The safety score or ranking may be representative of how safe a user's behavior is during a specific ride, historically over time, and/or compared to other users. The safety score or ranking may be determined based on certain actions or behaviors, including actions within the dedicated safety application or associated navigational applications, driving or riding behaviors, equipment employed during a ride or drive, and information reported to the dedicated safety application or system.

The safety score or ranking may be calculated by assigning certain numerical values or points to specific actions or behaviors. As an example, safe actions may be assigned positive or higher point values while unsafe actions may be assigned negative, lower, or zero point values. For example, safe actions may be assigned +1, while unsafe actions may be assigned −1 or 0. In some embodiments, certain unsafe behaviors may be considered more unsafe than others. In these embodiments, different numerical values may be assigned to the unsafe behaviors based on the degree the behavior is unsafe. For example, if behavior X is more unsafe than behavior Y, behavior X may receive a more negative point value (e.g., −2) while behavior Y may receive a less negative point value (e.g., −1). In a similar manner, certain safe behaviors may be safer than others and the safe behaviors may be assigned numerical values that correspond to the degree the behavior is safe. As an example, if behavior X is safer than behavior Y, behavior X may receive a more positive point value (e.g., +2) while behavior Y may receive a less positive point value (e.g., +1).

Safe actions, behaviors, or habits may include following a safe route (e.g., as determined by the system and discussed in further detail in the PCT Applications), percentage of time on a safe route, performing regular maintenance on a light mobility vehicle (and providing maintenance updates in the safety application), percentage of time riding as a compact group (as opposed to being spread out across the road), using a dedicated safety application, safety device, dedicated user device, and/or sensor device, using responsive, adaptive lighting, timely signaling (e.g., before turns or lane changes), spending time opening/reviewing safety messages or reports, safely passing others, obeying signs and traffic signals, and the like. The foregoing list is meant to be exemplary and other safe actions, behaviors, or habits are contemplated. In some embodiments, providing input to the safety devices and systems may be considered a safe action or behavior as it helps to improve overall safety of disclosed safety systems. Such safe community behaviors may include providing input to the device or system related to other entity behaviors (e.g., an entity passing too close, entity blocking a cycle lane, an accident, etc.) and/or to dangerous road conditions (e.g., pinch point, pothole, or damaged road surface, missing or worn lane markings, slippery road surface), or other road conditions (e.g., charging locations, rest locations, scenic locations, etc.). Input may be received by a user selecting a button related to a hazard or threat, submitting a video or taking a photograph (e.g., via a button on a user interface), or providing a voice command via a microphone, or the like.

Unsafe actions, behaviors, or habits may include ignoring prompted safe routes, failing to perform maintenance on a light mobility vehicle, not obeying traffic signals (e.g., running red lights or signs), riding in the wrong direction (e.g., the wrong way on a one way road or on the wrong side of the road), riding side by side (e.g., if the road is narrow and single file is preferred), riding on unauthorized paths (e.g., riding on the sidewalk), not using bike paths when available, closer than safe following or riding distance with other entities, safety devices or other connected devices not fully charged prior to ride and running out of charge during the ride, and the like. The foregoing list is meant to be exemplary and other unsafe actions, behaviors, or habits are contemplated.

The numerical values associated with a user's safe actions and unsafe actions may be aggregated to determine an overall safety score or ranking. The safety score or ranking may be a ratio of a user's overall obtained safety points value to a total safety points value that is obtainable. For example, the system may determine for the unsafe actions taken by a user that there was a potential safe action. The system may add the potential safe actions that could have been taken to the safe actions taken by the user to determine the total safety points value that was obtainable.

A safety score, ranking, report, or notification (referred to herein as a "safety indication" for simplicity) may be displayed on a display associated with the safety device or user device as a numeric value, a message, or a graphical icon such as a medal, award, or other positive imagery (e.g., a thumbs up). In some embodiments, the safety indication is dynamically updated and displayed during a ride. For example, as the user performs a safe action, a safety indication may be displayed on a display. For example, if a user takes a safe route, a thumbs up may appear on the display or other message or icon indicating the action was safe.

In some embodiments, the safety indication may be issued and displayed after the road trip or ride (e.g., as a post-ride report). In these embodiments, the safety indication may be indicative of the user's safety during the specific ride.

In some embodiments, the safety indication may be calculated by aggregating a user's safety indications over time. The user's aggregated safety indications may be compared to other users to determine the user's relative safety.

As an example, the system may generate a safety score of 5/7 or a silver medal icon for a user that performed the following actions on a ride: 1. Followed a safe route (+1), 2. Registered maintenance performed on light mobility vehicle (+1), 3. Rode on bike paths when available (+1), 4. Stopped at stop signs (+1), 5. Reported potholes (+1), 6. Rode on the sidewalk (0), and 7. Ran a red light (0). In this example, safe actions are assigned a numerical value of +1 while unsafe actions are assigned a numerical value of 0. The safety score of 5/7 may be calculated by adding up the point values assigned to the different actions divided by the total number of available safety points. In this example, the total number of available safety points is 7 if each action performed was a safe action (+1×7). Certain ratios may be associated with different medals. For example, a ratio under 1/2 may be assigned a bronze medal, while a ratio above 1/2 may be assigned silver, and a perfect score (1) may be assigned gold.

As discussed above, one example of a safe action is following a safe route. Disclosed safety systems or devices may determine safe routes or road segments or assess the safety of a route or road segment traveled by a user based on various safety-related data ingested and aggregated by safety systems or devices. Safety-related data may be received from an internal database or remote server (e.g., historical data or trend data received by the internal database or server over time from safety devices, user devices, or the like), a third-party database (e.g., environmental data), third-party applications (e.g., one or more applications that collect data on speed, position, heading, location, number of users on the road, etc.), user input (e.g., user data, vehicle data, road condition or accident data, etc.), other connectivity devices (e.g., safety devices, user devices, automotive connectivity devices, etc.), infrastructure (e.g., connected intersections), and the like. As an example, a safety device or user device may receive and/or determine safety-related data during a ride, which may be transmitted to the cloud and stored as historical data. Such safety-related data transmitted during a ride may include data related to accidents and their locations and sighting time and sensor data (e.g., speed, temperature, lighting conditions, air humidity, audio recordings, video recordings, etc.). As another example, user input may include reports of bad driving or riding behavior of other road users, bad parking, potholes or other hazardous road conditions (e.g., bad road surface or road conditions that may lead to vehicles having to swerve into the road or pass closer than usual), quality of road markings, accidents, road work or construction, congestion or traffic conditions, and the like.

Disclosed safety systems and devices may determine static risk models and dynamic risk models related to road segments and/or routes. A static risk model may factor in permanent risks (e.g., potholes or road surface conditions). A dynamic risk model may factor in semi-permanent risks (e.g., construction zone) and transient risks (e.g., other road users or entities). The dynamic risk model may take into account changes in risks over time. For example, the dynamic risk model may be consistently updated based on user input or safety-related data received from light mobility vehicle devices as they pass the risks or hazards. The static and dynamic risk models may be combined to provide an overall risk score for the road segment and/or route. The static risk model and/or the dynamic risk model may be shared with third-party databases and/or applications via API.

Safety-related data may be verified and disclosed safety systems or devices may determine the confidence in the safety-related data. For example, safety-related data may be verified based on similar safety-related data received from various sources. For example, multiple safety devices or user devices may transmit safety-related data related to a particular location to a server, which may aggregate the data and assess the accuracy of the data received. As an example, if 4/5 safety devices mark a position as having a pothole and the fifth safety device marks the same position as having a road marking issue, the system may determine that there is a pothole at the particular location. As another example, multiple sensors (e.g., camera, radar, lidar) and/or connectivity modules (e.g., C-V2X, LTE, etc.) may collect data related to the same oncoming object or entity. The safety device may aggregate the sensor data and assess the accuracy of the data received. As an example, if 2/3 of the sensors identify the object as a car and the third sensor identifies the object as a bicycle, the safety device may determine that the oncoming entity is a car.

As another example, safety-related data may be verified based on user input. For example, if the system received information related to a pothole or an accident at a particular location, the system may transmit a message or request to a user device or safety device passing through that same location to confirm whether there is a pothole or whether the accident is still there. A user may select a button confirming whether the hazard is still there or not. In some embodiments, the system may transmit a prompt to a user device or safety device that is passing by a known location of a hazard to have the user begin recording video and/or audio with an associated camera and/or microphone. The recorded video and//or audio may be transmitted to a server for processing or processed by the edge device (e.g., safety device or user device) to assess whether the hazard exists (e.g., via image processing and object detection).

Disclosed safety systems or devices may determine the safety of a route or road section or segment based on the number of risks, hazards, or threats (e.g., accidents, poor road conditions, poor quality road markings, congestion areas, etc.) found along the route. A route may be considered to be a safer route than another route if it has a lower number of risks, hazards, or threats.

While the above examples focus on light mobility users, it is contemplated that such safety scoring can be provided to automotive vehicle drivers (e.g., via a dedicated user device or portable safety device). In some embodiments, a user may use multiple different vehicles (e.g., a light mobility vehicle and an automotive vehicle). Safety scores may be determined and associated with each vehicle. The safety scores may be aggregated for the different vehicles or distinguished into behaviors for each vehicle.

In some embodiments, the safety scoring data determined may be useful for various industries and third parties. As one example, the safety scoring data may be shared with insurance companies. Such data may be useful for providing reduced insurance premiums for safe drivers or riders.

Data Fusion for Improved Confidence in Safety-Related Data and Risk Assessment

In several embodiments, disclosed safety systems, devices, and methods may utilize data collected from a plurality of sources to improve the safety-related information available to entities and connected devices or systems. As discussed in detail in the PCT Applications, safety-related data may be received from one or more safety devices, user devices, sensor devices, sensors (e.g., cameras, radar, LIDAR, ultrasound, time-of-flight, microphone, etc.), connectivity modules, third-party databases or applications (e.g., third-party map data, environmental conditions such as weather, traffic density), user input (e.g., data on road conditions, entity behaviors, etc.), one or more servers (e.g., trend data or historical data), and the like.

Historical data may include data received and stored by the system over time. For example, historical data may include data received by a server in real time from light mobility vehicle devices, automotive vehicle connectivity devices, infrastructure, and the like, related to road hazards or conditions or high risk situations, and stored in a system database. Historical data may include data related to collisions and their locations, entity behaviors (e.g., swerving at the same location, running a stop sign, etc.), and the like. Trend data may be determined from historical data. Trend data may include data learned by the system over time. For example, the system may determine trends in collision locations and mark certain locations as high risk collision areas. As another example, the system may determine certain risks based on trends in entity behaviors. For example, if multiple riders swerve at a particular location, the system may determine that there is a road hazard at that location. The system may prompt one or more light mobility vehicle devices (e.g., safety device(s), user device(s), sensor device(s), etc.) to capture an image of that location to identify the road hazard. The system may store in one or more system databases data identifying the location of the road hazard on a map. In some embodiments, the system may share road hazard data (e.g., image data of a road hazard collected by a safety device or user device and transmitted to the server) with government agencies (e.g., Departments of Transportation).

By aggregating data from various data sources, disclosed systems, devices, and methods may increase the reliability of safety risk assessment in varying conditions, including varying environmental conditions (daylight, darkness, rain, fog, snow, etc.) and when entities are varying distances from certain hazards or risks. Further, by relying on data from multiple sources, disclosed systems, devices, and methods may provide improved reliability in road user safety by mitigating harm from failure of one or more data sources. For example, if the C-V2X connectivity malfunctions, disclosed systems, devices, and methods may still provide accurate safety-related data and alerts and notifications based on data received from the other data sources (e.g., one or more sensors and/or the server). Further, by leveraging multiple data sources, disclosed systems, devices, and methods may implement machine learning to determine accuracy in received data and improve risk classification of a situation or location.

By collecting data from various sources related to various factors over time, disclosed systems, devices, and methods may implement machine learning to determine one or more high risk factors that increase safety risks or threats. For example, the system may receive data from multiple safety devices indicating near or actual collisions at a particular location. The system may also receive other data related to circumstances surrounding the near or actual collisions (e.g., environmental conditions such as weather, road conditions such as ice or road narrowing, etc.). Such data may be received, for example, from third-party databases or applications (e.g., map data). The system may determine trends in the data received to assess certain high risk conditions that may result in a collision at that particular location.

In several embodiments, the safety-related data may be aggregated to determine a safety risk map. The safety risk map may include static or permanent risks (e.g., end-of-bike-lane, historic high collision risk areas, etc.), semi-static or semi-permanent or temporary risks (e.g., construction signs or zones), and dynamic risks (e.g., moving entities, traffic, etc.). The safety risk map may be built with a statistical model and mapped risks may include probability and confidence values or thresholds.

As an example, disclosed systems, devices, and methods may combine data received from radar with data from one or more other sensors or connectivity devices to more accurately detect, track, and identify objects. For example, a radar sensor may be positioned on a front and/or rear portion of a light mobility vehicle to track and detect objects in front and/or behind the light mobility vehicle. Radar may facilitate the detection, tracking, and classification of objects at ranges in excess of 100 meters. Radar may be used to measure the relative speed of objects. The differences in the relative speed of objects may be used to evaluate risk (e.g., faster moving objects may be considered higher risk). Radar may improve reliability of safety-related data received or determined in certain weather conditions (e.g., rain, snow, fog, smoke, dark, etc.). Radar may be useful in various scenarios where objects are approaching or moving away. For example, radar may provide useful data related to objects approaching rapidly from the rear, stationary or slow objects ahead, distance increases of a group member trailing behind, overtaking entities, and the like.

In several embodiments, data aggregated from multiple sources may be used to determine safety risks, safe or unsafe behaviors, and the like. Different data sources may be useful depending on the data relevant to the particular situation. As one example, determining whether an entity is obeying a traffic signal may rely on data from a third-party application or database (e.g., map data), infrastructure (e.g., traffic signal information from Signal Phase and Timing (SPaT) messages from a traffic signal controller), and entity data (e.g., position and speed from an associated safety device or sensors). For example, the system may determine the entity is approaching an intersection based on position and speed of the entity and the map data of the location of the intersection and determine whether the entity is stopping or continuing through the intersection and the status of the traffic light at the time of crossing the intersection. As another example, the system may use entity position data (e.g., from a GPS sensor) and map data (e.g., showing location of bike paths) to determine whether the entity is using a bike path.

Figure 29:
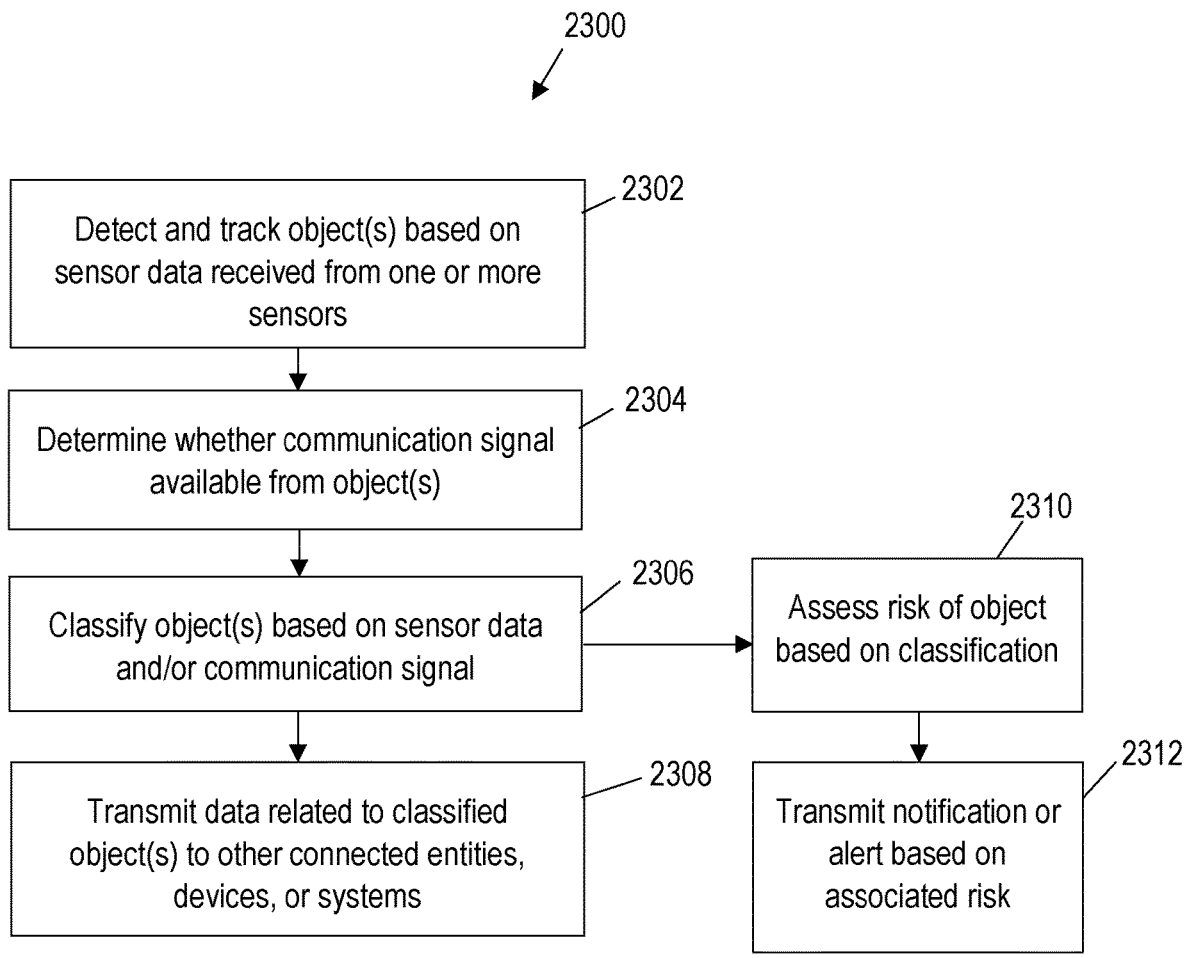
FIG. 29 is a flow chart illustrating a method of classifying one or more objects to provide an improved risk assessment of oncoming or nearby objects.

FIG. 29 is a flow chart illustrating a method of classifying one or more objects to provide an improved risk assessment of oncoming or nearby objects. The method 2300 begins with operation 2302 and one or more objects are detected and/or tracked based on sensor data received from one or more sensors. The one or more sensors may detect one or more of object shape, size, color, texture, speed/velocity, heading/direction, orientation, distance away, location/proximity, and the like. As an example, the one or more sensors may include a camera that captures an image of the one or more objects. As another example, the one or more sensors may include radar that detects the range, altitude, direction of movement, and/or speed of the one or more objects. In some embodiments, the one or more sensors include both a camera and radar.

After operation 2302, the method 2300 may proceed to operation 2304 and the processing element or connectivity module may determine whether a communication signal is available from the one or more objects. For example, the processing element or connectivity module may receive a C-V2X signal, an LTE signal, or the like, or a combination of signals (e.g., C-V2X and LTE), or no signal.

After operation 2304, the method 2300 may proceed to operation 2306 and the one or more objects may be classified based on the sensor data and/or communication signal. For example, an entity type of the one or more objects may be determined. As an example, the processing element may determine an object is a car versus a bicycle or other light mobility vehicle based on the object moving at a faster speed or velocity. As another example, the object may be classified based on image processing (e.g., the object size and shape may be indicative of a bicycle versus a car).

The processing element may determine whether the one or more objects are connected (and with what compatible connectivity modules) based on the communication signal. For example, an object may be classified as C-V2X capable, compatible, or connected if a C-V2X signal is received, LTE or cellular capable, compatible, or connected if an LTE or cellular signal is received, C-V2X and LTE/cellular capable, compatible, or connected if both C-V2X and LTE/cellular signals are received, non-digitally connected or dumb if no signal is received, and the like. In this manner, an object may be classified as a type of connected or non-connected entity or object. For example, an object may be classified as a non-connected car, a C-V2X compatible car, a non-connected bicycle, a C-V2X compatible bicycle, a cellular compatible car, a cellular compatible scooter, a dumb unmanned aerial vehicle (UAV), and the like. Disclosed systems and devices may associate the classified object with a particular tag or ID to readily identify the object. As an example, a C-V2X car may be labeled or tagged CC while an LTE bicycle may be labeled or tagged LB.

In some embodiments, after operation 2306, the method 2300 may proceed to operation 2308 and data related to the classified object(s) may be transmitted to other connected entities, devices, or systems. Data related to the classified object(s) (or "classified object data") may identify the type of entity or object, whether the entity or object is connected or not, and, if connected, its connectivity compatibility. For example, the data may identify a C-V2X compatible bicycle, an LTE compatible bicycle, or a non-connected car. The data may be transmitted as a unique ID or tag that is readily recognizable by other connected entities, devices, or systems.

Such classified object data may be transmitted to other connected entities, devices, or systems to inform them of objects that they might otherwise be unaware of. Other connected entities, devices, or systems may include connected entities (cars, trucks, light mobility vehicles, etc.), portable connected devices (e.g., portable safety devices or user devices), and connected infrastructure. Connected entities, devices, and systems may communicate over varying protocols, such as C-V2X, cellular, BLE, Wi-Fi, and the like. Such connected entities, devices, and systems may not be able to detect objects that communicate over different protocols or that are not connected or dumb objects. As such, by detecting and classifying objects that communicate over varying protocols or that are not connected and providing such classified object data to other connected entities, devices, and systems, the present safety systems and devices are able to provide such connected entities, devices, and systems with information that would otherwise be unavailable to them. As one example, the classified object may be a dumb bicycle (e.g., as detected by the one or more sensors). The classified object data indicating the dumb bicycle may be transmitted to a C-V2X compatible car via C-V2X communication protocol and/or to an LTE compatible car via LTE communication protocol. As yet another example, the classified object data may indicate an LTE compatible bicycle and may be transmitted to a C-V2X compatible car. The C-V2X compatible car might not otherwise be aware of the LTE compatible bicycle, as it may only be aware of other C-V2X connected entities.

In some embodiments, after operation 2306, the method 2300 may proceed to operation 2310 and the risk of the classified object may be determined based on its classification. The level of risk may factor in whether the object is connected or not, where non-connected objects may be considered higher risk (as they may be more difficult to detect). The level of risk may factor in the size and type of object, where larger objects and automotive vehicles may be considered higher risk than smaller objects and light mobility vehicles. The level of risk may account for the type of entity receiving the classified object data. For example, a dumb bicycle may be a higher risk for a connected automotive vehicle, while a dumb automotive vehicle may be a higher risk for a connected bicycle. One or more of the above factors may be considered in determining the risk of the classified object. As an example where connectivity and size of the classified object are considered, a non-connected truck may be considered a higher risk than a connected bicycle or connected car. In some embodiments, the level of risk may factor in the type of connectivity or protocol utilized by the entity. For example, an entity with C-V2X connectivity may be less risky than an entity with cellular connectivity (e.g., since latency in data transfer may be reduced).

After operation 2310, the method 2300 may proceed to operation 2312 and a notification or alert may be transmitted based on the associated risk of the classified object. The notification or alert may be transmitted from the device that detected and classified the object or to an associated device. For example, the device that detected and classified the object may be a safety device that has feedback components (e.g., feedback components 123 of safety device 103 of FIG. 2). The safety device may transmit the alert via a feedback component, such as via a light/LED, haptic device, sound device/speaker, or the like. For example, the safety device may turn on a light and vary the light based on the level of risk. For example, the light may be brighter or flash more intensely if the classified object is a higher risk. In a similar manner, the safety device may emit a stronger vibration or sound if the classified object is a higher risk. The notification or alert may be varied based on the type or number of sensors or connectivity modules that detected the object data. For example, the light, sound, or vibration may be varied if one sensor (e.g., camera or radar) detected the object versus multiple sensors, including a connectivity module (e.g., via cellular or C-V2X).

Figure 30:
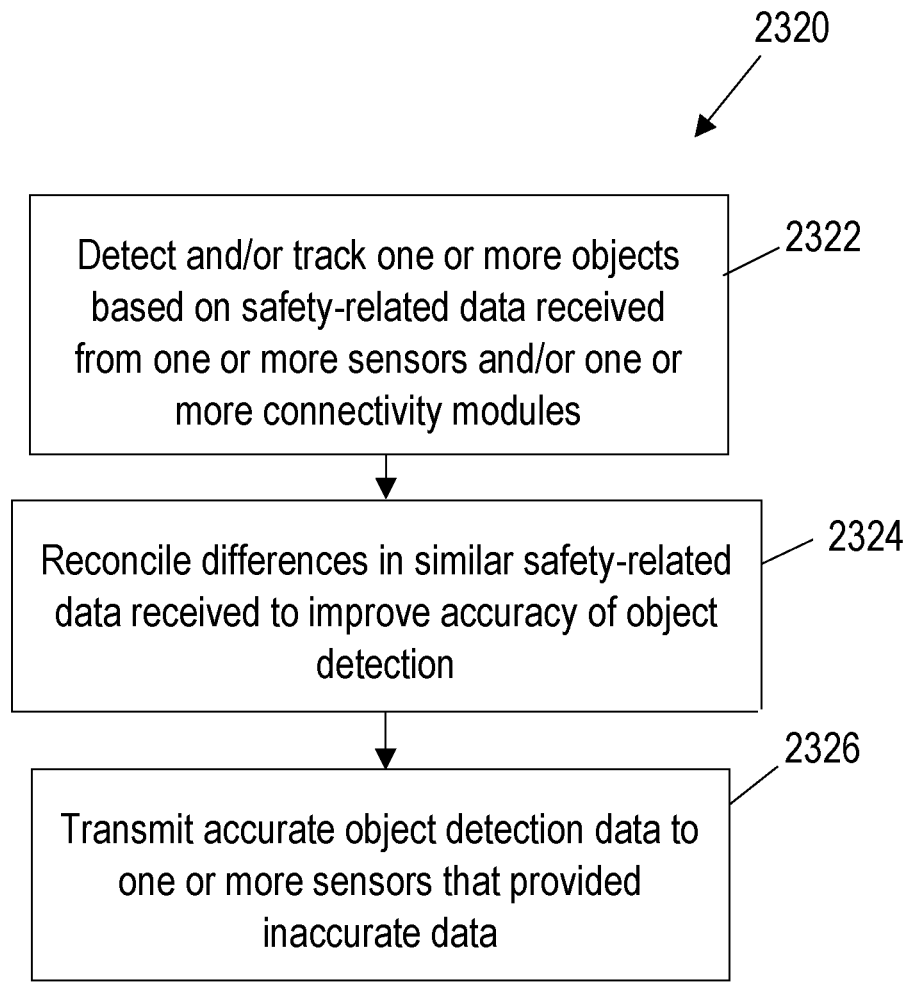
FIG. 30 is a flow chart illustrating a method of improving accuracy of safety-related data received and analyzed by a safety device.

FIG. 30 is a flow chart illustrating a method of improving accuracy of safety-related data received and analyzed by a safety device. The method 2320 begins with operation 2322 and one or more objects are detected and/or tracked based on safety-related data received from one or more sensors and/or one or more connectivity modules. The one or more sensors may detect one or more of object shape, size, color, texture, speed/velocity, heading/direction, orientation, distance away, location/proximity, and the like. As an example, the one or more sensors may include a camera that captures an image of the one or more objects and radar that detects the range, altitude, direction of movement, and/or speed of the one or more objects. The one or more connectivity modules may include C-V2X or cellular modules. For example, the C-V2X module may receive BSM indicative of the type of vehicle approaching (e.g., car, bicycle, truck, etc.) and speed, heading, and position, of the oncoming vehicle.

After operation 2322, the method 2320 may proceed to operation 2324 and differences in similar safety-related data received may be reconciled to improve accuracy. For example, similar safety-related data may include data related to the object's speed received from radar and data related to the object's speed received from C-V2X. As another example, an object's identity may be received from a camera (e.g., based on local image processing by the camera) and from a C-V2X module (e.g., based on BSM received). In some embodiments, the processing element may leverage C-V2X data received to assess the accuracy of objects detected by other sensors. For example, C-V2X data received may indicate an oncoming object is a car. An associated camera may capture image data and perform image processing indicating the oncoming object is a truck. The system may correct the error in the data received from the camera to associate the image data with a car based on the more accurate data received from the C-V2X module. As another example, accurate data may be determined based on trends in the data. In the above example where a car and truck are identified for the same object, a third sensor (e.g., radar) may provide safety-related data indicating the object is a car. The system may determine based on two data sets indicating the object is a car versus one data set indicating the object is a truck that the object is a car.

In some embodiments, after operation 2324, the method 2320 may proceed to operation 2326 and accurate object detection data may be transmitted to the one or more sensors that provided inaccurate data if inaccurate data was provided. In the above example, the camera detected the object as a truck when it was determined that it was a car with increased accuracy. The processor may transmit the accurate car identity to the camera. The camera may improve upon its image processing algorithm to associate similar objects with a car instead of a truck.

Figure 31:
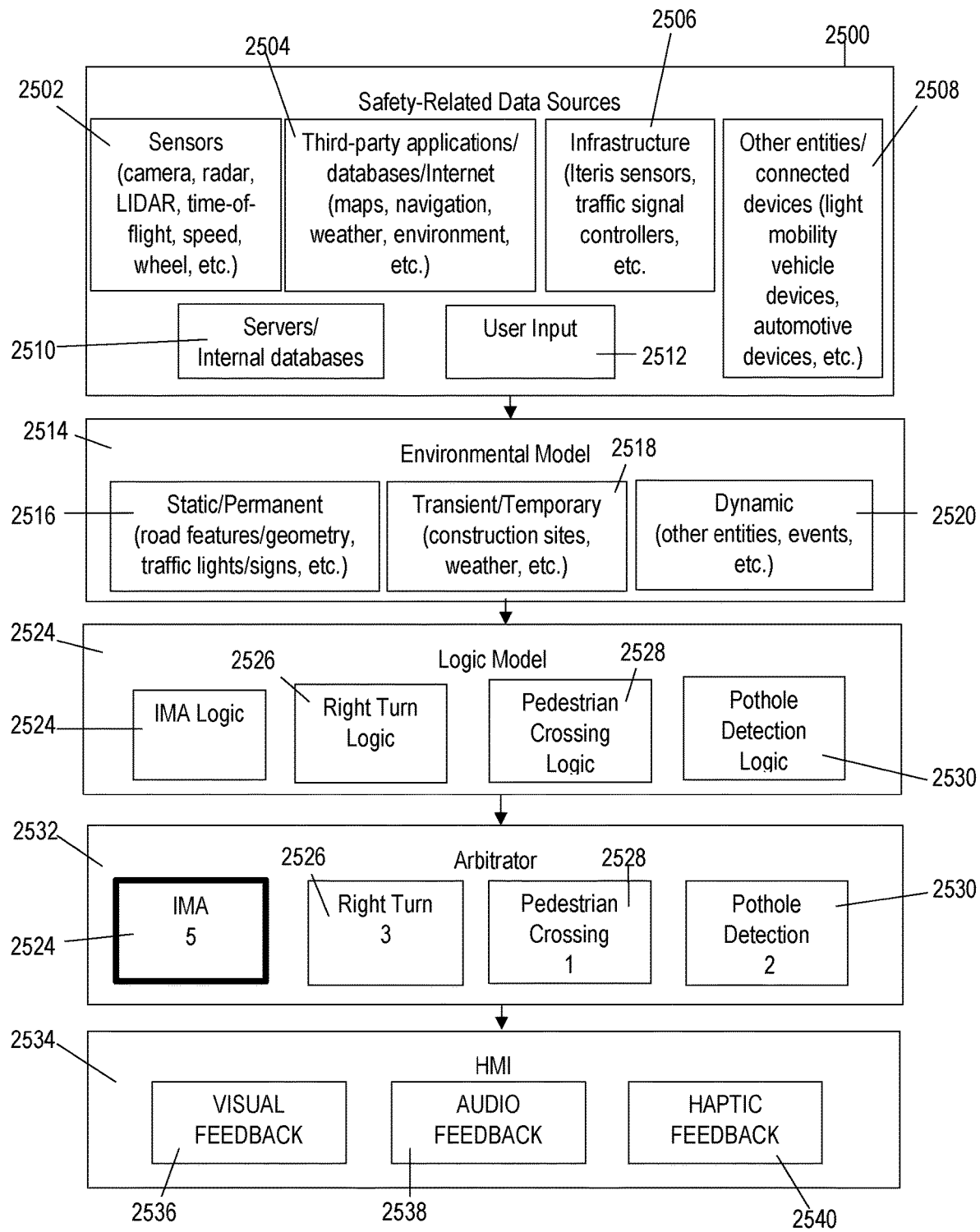
FIG. 31 is a flow diagram illustrating an example of a data flow that may be utilized by disclosed safety systems and devices.

FIG. 31 is a flow diagram illustrating an example of a data flow that may be utilized by disclosed safety systems and devices. As discussed above, safety-related data may be ingested from various data sources 2500, including sensors (e.g., camera, radar, LIDAR, time-of-flight sensors, speed sensors, wheel speed sensors, etc.) 2502, third-party applications or databases or the Internet (e.g., maps, navigation, weather, environment, etc.) 2504, infrastructure (e.g., Iteris sensors, traffic signal controllers, etc.) 2506, other entities or connected devices (light mobility vehicle devices, automotive vehicle connectivity devices, etc.) 2508, servers or internal databases 2510, and user input 2512.

The safety-related data may be ingested into an environmental model 2514 (via a processor) that delineates static/permanent features 2516, transient/temporary features 2518, and dynamic features 2520 on a map (e.g., from the map data received by a third-party source 2504). The environmental model 2514 may be a 3D landscape of features on a user's route or surrounding a user. Static or permanent features 2516 may include road features or conditions or geometry, traffic lights or signs or intersections, vegetation, and the like. The static or permanent features 2516 may be part of a map received from a third-party application or database (e.g., bike lanes, roads, highways, etc.) or created by disclosed safety systems and devices. The transient or temporary features 2518 may include construction sites, road closures, weather, environment, accidents, and the like. The dynamic features 2520 may include other entities. The transient or temporary features 2518 and/or the dynamic features 2520 may be determined based on sensor data received from one or more sensors or safety-related data received from other entities or connected devices. It is contemplated that any combination of data sources 2500 may provide data related to the static/permanent features 2516, transient/temporary features 2518, and dynamic features 2520. The environmental model 2514 may be shared with third-party applications or databases via an API.

The more safety-related data sources 2500 that provide data related to the features modeled in the environmental model 2514, the greater the accuracy or confidence in the safety-related data. For example, if both the camera and radar detect an oncoming non-connected car, and the user provides input that a car is approaching, there may be greater confidence in the data indicating an oncoming car. In contrast, if only the camera detects the oncoming non-connected car, there may be less confidence in the data. By leveraging safety-related data from multiple sources, disclosed systems, devices, and methods may improve accuracy in geolocation data, providing more confidence in the location of objects/entities/risks.

The logic model or layer 2522 may execute multiple algorithms simultaneously or in parallel based on the safety-related data received and modeled in the environmental model 2514. For example, the logic model 2514 may execute an algorithm to determine intersection movement assist (IMA) 2524 (likelihood of collision with vehicles moving towards each other), an algorithm related to an entity turning right in front (Right Turn) 2526, an algorithm related to a pedestrian crossing the road 2528, and an algorithm related to detecting a pothole 2530. In this manner, the logic model 2522 may be used to determine various risks, threats, or situations based on the safety-related data received and the environmental model 2514 of surrounding features.

The logic model 2522 may leverage multiple data inputs from the environmental model 2514 based on entity data of a user and the subsequent data relevant to the user. For example, a user may be approaching a blind corner. The logic model 2522 may receive dynamic data of an entity approaching the blind corner from the opposite direction. The logic model 2522 may determine that there is a 55% probability of collision. The logic model 2522 may also account for map data at or near the blind corner. As an example, the logic model 2522 may determine that the road narrows at the blind corner. Based on this additional data received, the logic model 2522 may determine that there is an increased risk of collision (e.g., 75% instead of 55%). The logic model 2522 may store the risk data or transmit the risk data to a server for storage indicating a higher risk at that location. In this example, the risk may be labeled a pinch point with high risk. The pinch point may be factored into the environmental model 2514 as a permanent risk. As an example, the pinch point may be placed on a map as a permanent feature. In this manner, if another entity approaches the same location, the logic model 2522 may determine based on map data that there is a risk ahead, even if there is no other known entity approaching. This may be beneficial as the high collision risk point is marked if a sensor fails to detect an oncoming entity. Such high risk points may be learned by the system as the system receives risk data over time.

The arbitrator 2532 may determine which of the risks, threats, or situations are highest risk and require action. The risks, threats, or situations may be assigned a risk value. In the depicted example, the arbitrator 2532 may assign a value of 5 to the IMA 2524, a value of 3 to the right turn determination 2526, a value of 1 to the pedestrian crossing 2528, and a value of 2 to the pothole detection 2530. The values may account for the location of the event or risk relative to the user or the user's route. For example, the pedestrian crossing 2528 may be considered low risk and assigned a value of 1 if the pedestrian is crossing in a path parallel to the user. In contrast, if the pedestrian was crossing in a path perpendicular to the user and in a manner likely to result in a collision, the pedestrian crossing may be assigned a value of 5. The pothole may be considered relatively low risk if it is not on the user's path or is relatively small; however, if there is a large pothole directly in front of the user's path, it may be considered high risk. In the depicted example, the highest risk event is the IMA 2524, which is assigned the highest risk value.

The HMI layer 2534 may be activated to execute particular actions, alerts, or notifications based on the events considered high risk. Actions may include identifying the hazard, instructing a user how to avoid the hazard or mitigate risk, or activating one or more feedback components to create awareness. As discussed above, feedback may be visual 2536 (e.g., via a display or light), audio 2538 (e.g., via a speaker, horn, bell, etc.), and/or haptic 2540. The action or alert may be varied based on the type of risk. For example, if there is a risk associated with another entity, the alert may be targeted to reach the other entity (e.g., a flashing light). As another example, if the risk is to the user, the alert may be targeted to reach the user (e.g., a notification on a display or an audible alert). As an example, if there is a high risk of collision, the arbitrator may turn on a flashing light. If the collision is imminent, the intensity or frequency of the light flashing may be increased. As another example, if there is a high risk of hitting a pothole ahead, the arbitrator may transmit a message or alert to the user indicating pothole ahead. The alert may be a message indicating an action, e.g., "stay to the right." The message or alert may be transmitted to the other entity (e.g., via a compatible connectivity device or safety application). For example, a message may be transmitted to a car that a bicyclist is about to exit a bike lane on to the road (e.g., based on entity data and map data). The alert may be varied based on the type of entity. For example, for a cyclist, the alert may be haptic or audible so that the rider can keep his or her eyes on the road or visual to alert other entities. In this manner, disclosed systems or devices may receive multiple data inputs and determine the most relevant information for a safe rider experience without overloading the rider with alerts.

In some embodiments, the alert or notification may be transmitted to a remote server. As an example, the arbitrator 2532 may determine that there is a high risk of an imminent collision and transmit an alert to the server to call or otherwise communicate with the authorities (e.g., 911).

It is contemplated that the arbitrator 2532 or HMI layer 2534 may factor in user preferences. User preferences may include user preferences for certain safety-related data, including for example preferences related to safety risks encountered or avoided during a ride or health or fitness preferences. As an example, a user may desire to avoid traveling when air quality is poor and input poor air quality as a user preference. The system may factor in such user preferences related to air quality when determining safety risks. If air quality is poor, the system may determine there is no safe route available based on user preferences.

Figure 32:
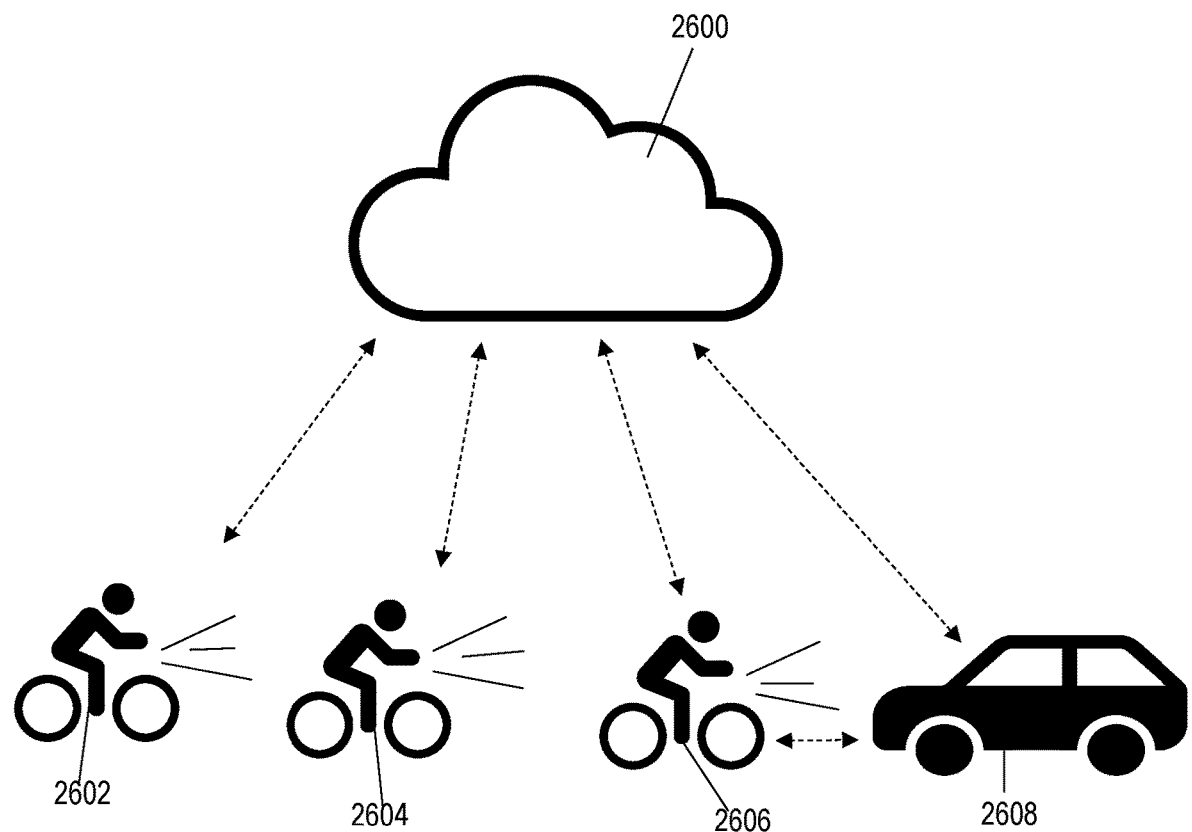
FIG. 32 is a diagram illustrating synchronization of feedback components among unrelated entities in proximity.

FIG. 32 is a simplified block diagram illustrating synchronization of feedback components among unrelated entities in proximity. A server may receive entity data from one or more entities. In this case, a server 2600 receives entity data via a cellular network from a first bicycle 2602, a second bicycle 2604, and a third bicycle 2606. For example, the bicycles 2602, 2604, 2606 may be equipped with one or more light mobility vehicle devices that collect and transmit the entity data. The entity data may include data related to the bicycles' 2602, 2604, 2606 locations (e.g., via GPS sensors associated with the bicycles). The server 2600 may determine the bicycles 2602, 2604, 2606 are in proximity or the same general location (e.g., on the same road or road segment).

The server 2600 may determine that a threat or risk exists for the bicycles 2602, 2604, 2606 and synchronize feedback components associated with the bicycles. In the depicted example, the server 2600 may determine there is an oncoming car 2608 approaching the bicycles 2602, 2604, 2606. The server 2600 may receive entity data related to the car from the car 2608 (e.g., via an automotive vehicle connectivity device associated with the car 2608) or from the third bicycle 2606 in nearest proximity to the car 2608. For example, the third bicycle 2606 may receive entity data from the car 2608 (e.g., via C-V2X) or otherwise determine the oncoming object is a car 2608 (e.g., via camera, radar, or the like), and transmit the car entity data to the server 2600. The server 2600 may receive car entity data from the car 2608 if the car 2608 is equipped with a cellular modem. The server 2600 may receive car entity data from the third bicycle 2606 if the car is equipped with a C-V2X modem or is non-connected or dumb.

The server 2600 may transmit instructions to one or more feedback components associated with the bicycles 2602, 2604, 2606 to turn on (e.g., feedback components 406 of FIG. 19 or feedback components 123 of FIG. 2). It is contemplated that the server 2600 may transmit instructions to a light mobility vehicle device (e.g., user device or safety device) that in turn instructs the one or more feedback components to turn on. The feedback components activated by the server 2600 may depend on the type of threat and the location of the threat relative to the bicycles 2602, 2604, 2606. In the depicted example, the server 2600 activates lights on the front of the bicycles 2602, 2604, 2606 to provide a visual warning to the oncoming car 2608. In a similar manner, if a car was approaching from behind the bicycles 2602, 2604, 2606, the server 2600 may activate lights on the rear sides of the bicycles 2602, 2604, 2606. The lights may be varied in intensity and brightness depending on the level of risk of the oncoming car 2608. For example, if the car 2608 is approaching quickly or from a blind spot (e.g., around a corner) or where there will be a pinch point, the light intensity or flashing frequency may be increased, as these events are associated with higher collision risk. While the above example discusses synchronization of feedback components for unrelated entities, it is contemplated that such synchronization may also be executed for a group of entities.

Portable Safety Device Methods

In several embodiments, disclosed safety devices may be portable, as discussed in more detail in the PCT Applications. For example, a disclosed safety device may be carried by a pedestrian, placed inside an automotive vehicle (a non-connected or dumb vehicle or a connected or smart vehicle), and the like. For example, a portable safety device may be carried by a child and brought onto a school bus. As another example, a portable safety device may be carried by a garbage man and carried into a garbage truck. As yet another example, multiple portable safety devices may be carried by construction workers and carried into a van.

In several embodiments, a portable safety device processor may adjust settings of a portable safety device based on the entity it is associated with. The portable safety device processor may determine an identity of an associated entity based on the entity's speed. A portable safety device processor may turn a signal on when the portable safety device is associated with a vulnerable road user (e.g., a pedestrian, bicyclist, motorcyclist, etc.) and may turn the signal off when the portable safety device is associated with an automotive vehicle. In some embodiments, a portable safety device processor may determine the entity it is associated with and adjust the entity data transmitted by the portable safety device processor to other entities. For example, when the portable safety device is associated with an automotive vehicle, the portable safety device may transmit entity data to other entities indicating the portable safety device is associated with an automotive vehicle. As another example, when the portable safety device is associated with a pedestrian, the portable safety device may transmit entity data to other entities indicating the portable safety device is associated with a pedestrian. In this manner, the portable safety device can detect when a pedestrian exits an automotive vehicle and notify other road users of the pedestrian.

As an example, a delivery truck driver may carry a portable safety device. The portable safety device processor may determine when the delivery truck driver is in the truck (e.g., based on the device traveling at common truck speeds) and turn off if the truck has a truck connectivity device. The truck connectivity device may take over and communicate with other road users (e.g., transmit and receive entity data). When the delivery truck driver gets out of the truck to deliver a package, the portable safety device processor may determine the truck driver is out of the truck and a pedestrian and turn back on. The portable safety device may communicate data related to the truck driver to other road users so that other road users are aware of the truck driver out of the truck. As yet another example, a bicyclist may put a bicycle in a car, on a train, or on a bus, and the portable safety device processor may determine that the portable safety device is moving at automotive vehicle or non-bicycle speeds and turn off.

Figure 33:
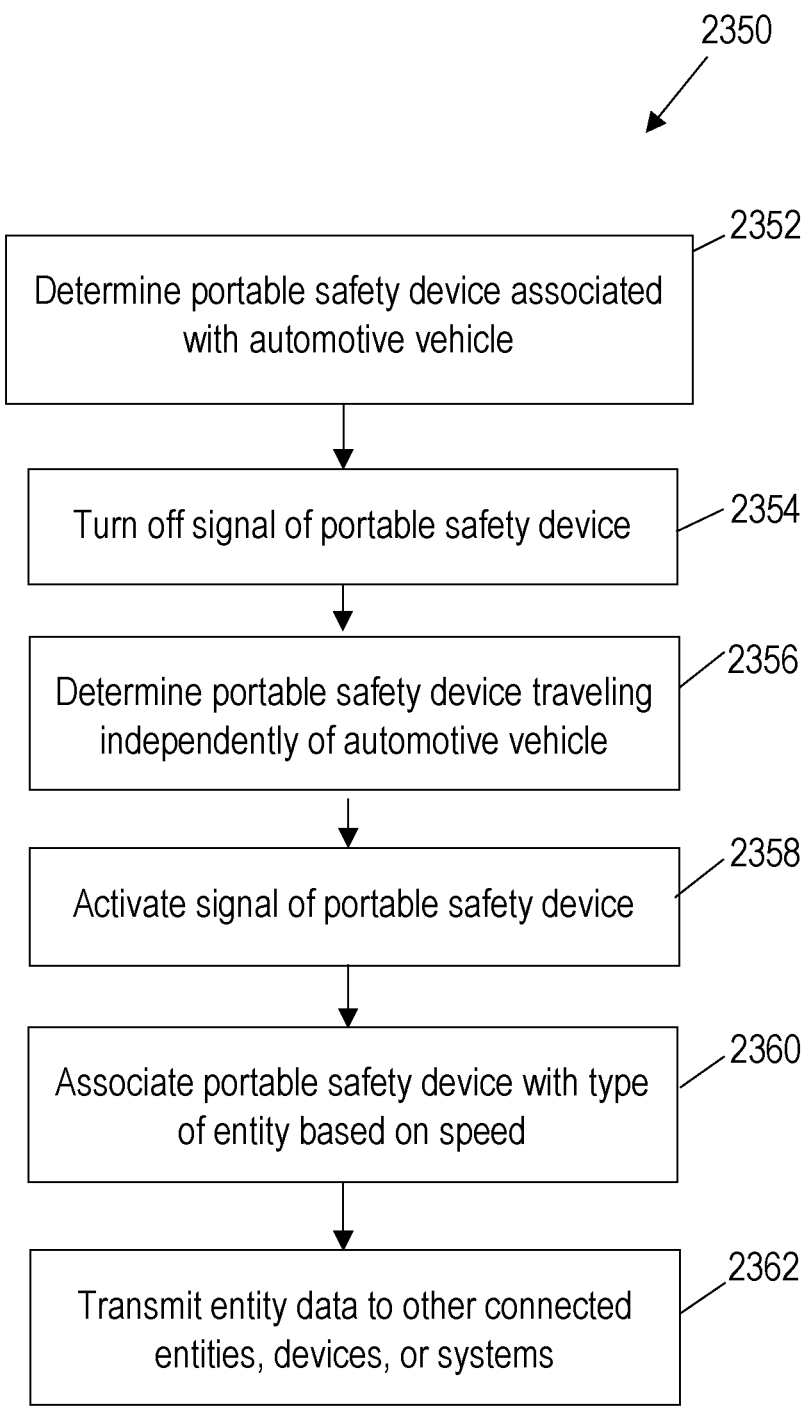
FIG. 33 is a flow chart illustrating a method of adjusting settings of a portable safety device when it is carried by a connected automotive vehicle having an embedded automotive vehicle connectivity device versus a pedestrian.

FIG. 33 is a flow chart illustrating a method of adjusting settings of a portable safety device when it is inside a connected automotive vehicle having an embedded automotive vehicle connectivity device versus being carried by a pedestrian. The method 2350 begins with operation 2352 and the portable safety device processor may determine that the portable safety device is associated with an automotive vehicle. In some embodiments, the portable safety device processor may determine that the portable safety device is associated with an automotive vehicle based on the portable safety device having the same speed and one or more of the same heading and proximity as a nearby automotive vehicle connectivity device. The determination that the portable safety device has the same speed and one or more of the same heading and proximity as the nearby automotive vehicle connectivity device may indicate that the portable safety device is inside or otherwise coupled to the automotive vehicle. An automotive vehicle connectivity device may include an onboard connectivity device or sensor (e.g., ADAS sensors). In some embodiments, the portable safety device processor may determine that the portable safety device is associated with an automotive vehicle based on recognition of the automotive vehicle via Bluetooth or another signal. In some embodiments, the portable safety device processor may determine that the portable safety device is associated with an automotive vehicle based on sensor data received from the automotive vehicle. For example, the sensor data may indicate that the automotive vehicle is on and the portable safety device processor may determine that the portable safety device is associated with the automotive vehicle based on the on status of the automotive vehicle. As an example, the sensor data may indicate that the motor is on or a gear is engaged.

After operation 2352, the method 2350 may proceed to operation 2354 and the portable safety device processor may turn off the portable safety device signal. By turning off the portable safety device signal, the processor can prevent signal interference between the portable safety device and the automotive vehicle connectivity device. In this manner, the automotive vehicle connectivity device can take over communication with other entities and communicate with other entities that the portable safety device user is in an automotive vehicle.

After operation 2354, the method 2350 may proceed to operation 2356 and the portable safety device processor may determine that the portable safety device is traveling independently of the vehicle. For example, the processor may determine that the speed or proximity of the portable safety device to the automotive vehicle connectivity device have changed or that the speed is no longer similar to a normal car speed. There may be a delay in this determination to account for the vehicle stopping at a red light or stop sign. In some embodiments, the portable safety device processor may determine that the portable safety device is traveling independently of the vehicle based on sensor data received from the automotive vehicle (or a lack of sensor data received from the automotive vehicle). For example, the sensor data may indicate that the automotive vehicle is off and the portable safety device processor may determine that the portable safety device is traveling independently of the vehicle based on the off status of the automotive vehicle. As an example, the sensor data may indicate that the motor is off or a gear is disengaged.

After operation 2356, the method 2350 may proceed to operation 2358 and the portable safety device processor may activate or turn on the portable safety device signal. By turning on the portable safety device when the device is no longer associated with the automotive vehicle, the portable safety device may provide the user with visibility of and to other road users when the user is outside the vehicle.

After operation 2358, the method 2350 may proceed to operation 2360 and the portable safety device processor may associate the portable safety device with a type of entity based on the speed of the portable safety device. For example, the speed of a bicycle, pedestrian, motorcycle, and the like, may vary. As one example, the portable safety device processor may associate the portable safety device with a pedestrian based on a slower speed.

After operation 2360, the method 2350 may proceed to operation 2362 and the portable safety device processor may transmit the entity data (e.g., entity identification) to other connected entities, devices, or systems. For example, the portable safety device processor may transmit directly or via C-V2X or cellular protocols to other safety devices, user devices, connected infrastructure, or the like, the identity of the entity associated with the portable safety device (e.g., pedestrian).

Figure 34:
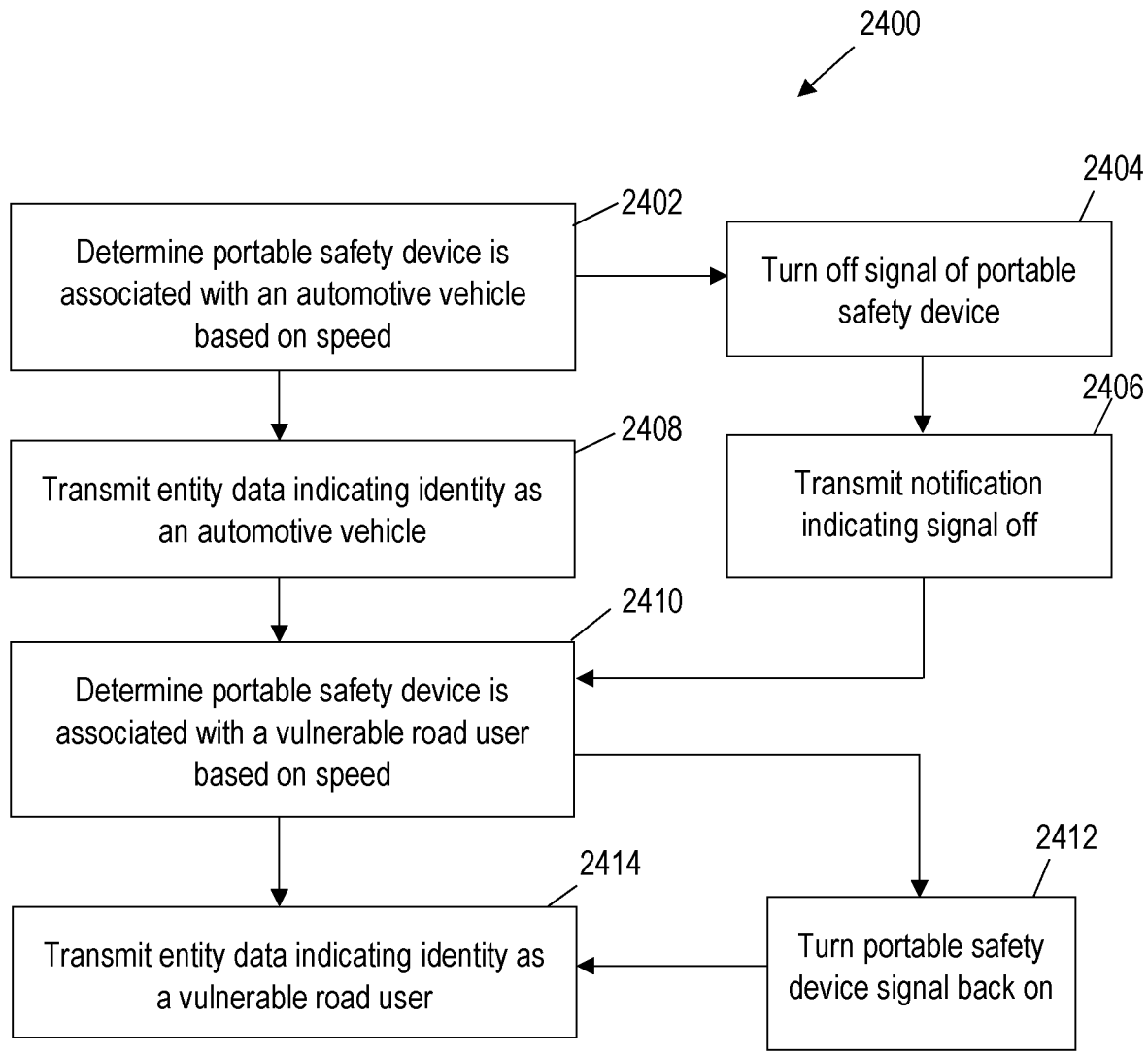
FIG. 34 is a flow chart illustrating a method of adjusting settings of a portable safety device when it is carried by a non-connected or dumb automotive vehicle versus a pedestrian.

FIG. 34 is a flow chart illustrating a method of adjusting settings of a portable safety device when it is in a non-connected or dumb automotive vehicle versus carried by a pedestrian. The method 2400 begins with operation 2402 and a portable safety device processor determines the portable safety device is associated with an automotive vehicle based on a speed of the portable safety device. For example, the portable safety device processor may be coupled to or in communication with a speed sensor and may receive speed data from the speed sensor. Automotive vehicle speeds may be faster than light mobility vehicles and pedestrians, such that the portable safety device processor may determine the portable safety device is associated with an automotive vehicle when it is at higher speeds (e.g., 10 mph or more, 15 mph or more, 20 mph or more, 30 mph or more, and the like).

In some embodiments, after operation 2402, the method 2400 may proceed to operation 2404 and the portable safety device processor may turn off the signal of the portable safety device. By turning off the portable safety device signal, the processor can prevent inaccurate data from transmitting from the portable safety device (e.g., that the entity is a pedestrian or other vulnerable road user). The processor may also conserve power and computing power of the portable safety device.

After operation 2404, the method 2400 may proceed to operation 2406 and the portable safety device processor may transmit a notification to the user that the signal is off. As an example, the notification may prompt the user to verify that the user is in a car (e.g., no longer outside the vehicle or walking) to confirm that the signal should be turned off. Transmitting the notification may act as a safeguard to ensure that the portable safety device is not turned off when the user is a vulnerable road user.

In some embodiments, after operation 2402, the method 2400 may proceed to operation 2408 and the portable safety device processor may transmit entity data indicating the entity is an automotive vehicle. The portable safety device processor may transmit the entity data to other connected entities, devices, or systems (e.g., infrastructure). The entity data may indicate generally that the entity is an automotive vehicle. In some embodiments, the entity data may indicate the type of automotive vehicle. For example, the portable safety device may be associated with a particular type of automotive vehicle based on user input. For example, a user may use the same automotive vehicle and may program the portable user device to associate the portable user device with the user's particular automotive vehicle (e.g., based on input through an associated safety application). For example, a garbage truck driver may program the portable safety device to identify a truck as the automotive vehicle when the portable safety device is determined to be associated with an automotive vehicle. In some embodiments, the portable safety device processor may transmit a message or notification requesting the user identify the type of automotive vehicle.

In some embodiments, after operation 2408, or optionally after operation 2406, the method 2400 may proceed to operation 2410 and the portable safety device processor may determine that the portable safety device is associated with a vulnerable road user based on a speed associated with the portable safety device. In some embodiments, the portable safety device processor may determine that the portable safety device is associated generally with a vulnerable road user (e.g., it has a speed under a typical automotive vehicle, e.g., under 25 mph, under 20 mph, under 10 mph, under 5 mph, and the like). In some embodiments, the portable safety device processor may determine the portable safety device is associated with a specific type of vulnerable road user (e.g., pedestrian, bicyclist, motorcyclist, skateboarder, etc.) based on the speed (e.g., under 5 mph, a pedestrian). In the example with a garbage truck driver, when the driver gets out of the vehicle to move a trash bin, the driver may carry the portable safety device at a speed similar to or lower than a typical pedestrian speed (e.g., under 4 mph). In some embodiments, the portable safety device processor may determine the type of vulnerable road user based on user input. For example, the portable safety device processor may transmit a message or notification to confirm with a user the type of vulnerable road user.

After operation 2410, the method 2400 may proceed to operation 2412 and the portable safety device signal may be turned back on. By turning the portable safety device signal on when the portable safety device is associated with a vulnerable road user, the portable safety device may provide awareness to the vulnerable road user of other entities and vice versa.

After operation 2410, or optionally after operation 2412, the method 2400 may proceed to operation 2414 and the entity data may be transmitted to other connected entities, devices, or systems. For example, the portable safety device processor may transmit directly or via C-V2X or cellular protocols to other safety devices, user devices, connected infrastructure, or the like, the identity of the entity associated with the portable safety device (e.g., vulnerable road user, pedestrian, bicyclist, etc.).

Figure 35:
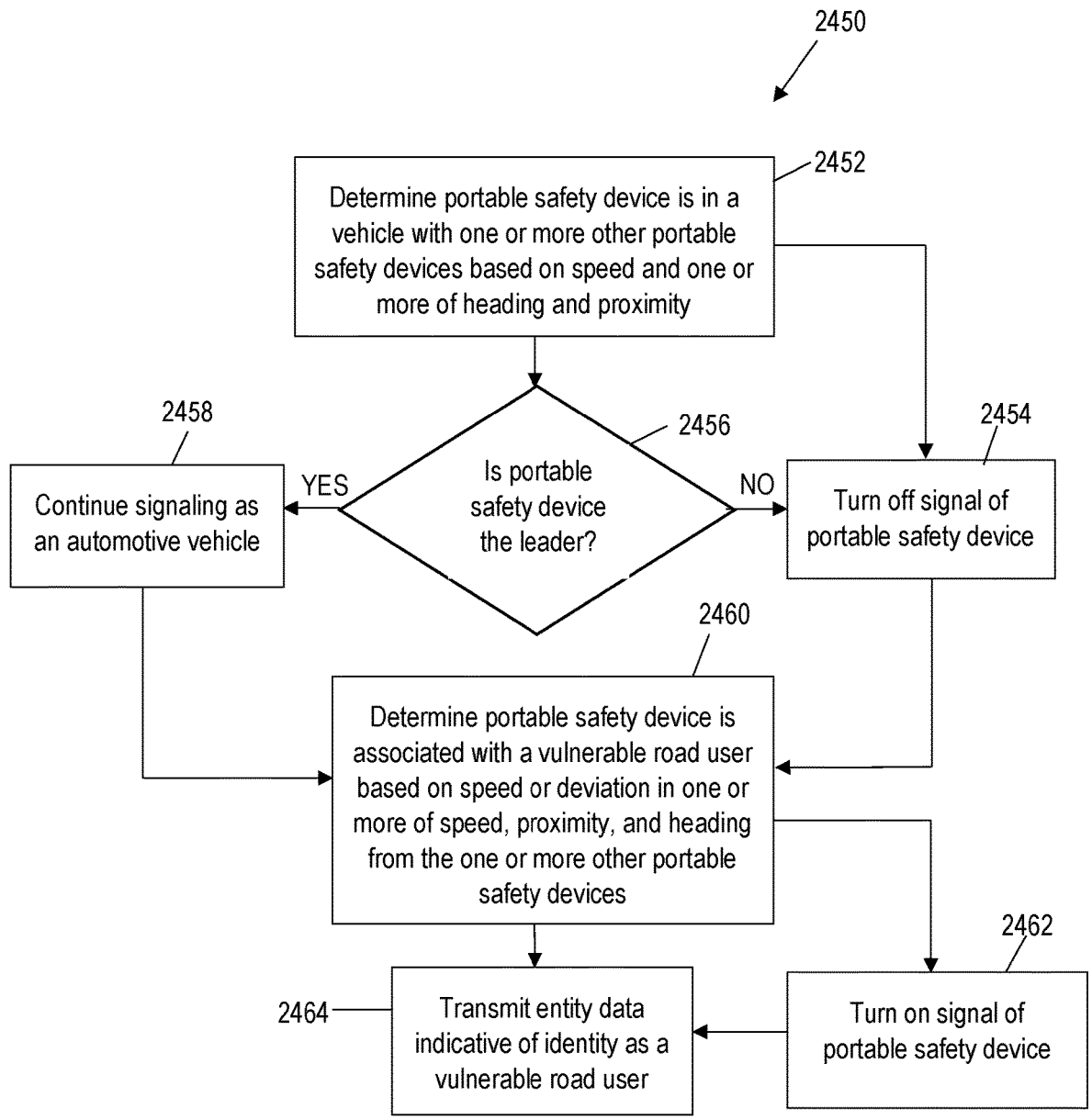
FIG. 35 is a flow chart illustrating a method of adjusting settings of a portable safety device when it is in an automotive vehicle with one or more other portable safety devices.

FIG. 35 is a flow chart illustrating a method of adjusting settings of a portable safety device when it is in an automotive vehicle with one or more other portable safety devices. The method 2450 begins with operation 2452 and the portable safety device processor may determine whether the portable safety device is in a vehicle with one or more other portable safety devices based on speed and one or more of heading and proximity. For example, the portable safety device processor may receive entity data from the one or more other portable safety devices indicating they are traveling at a similar or the same speed and in one or more of a similar or the same heading and proximity and determine the portable safety devices are traveling together. The speed may be indicative of an automotive vehicle and the portable safety device processor may determine the portable safety devices are traveling in an automotive vehicle.

After operation 2452, the method 2400 may proceed to operation 2454 and the portable safety device processor may turn off the signal of the portable safety device. By turning off the portable safety device signal, the processor can prevent inaccurate data from transmitting from the portable safety device (e.g., that the entity is a pedestrian or other vulnerable road user) or prevent interference with a connectivity device onboard the vehicle. As discussed with respect to operation 2406 of method 2400 of FIG. 34, the portable safety device processor may transmit a notification to a user indicating the signal has been or is being turned off. Providing such a notification may allow a user to override the portable safety device processor turning the signal off.

After operation 2452, the method 2450 may proceed to operation 2456 and the portable safety device processor may determine whether it is the leader. For example, it may be the first portable safety device processor to request being the leader and the other portable safety devices may accept it as the leader. In contrast, it may receive a request from another portable safety device requesting to be the leader and it may accept the other portable safety device as the leader.

If at operation 2456, the portable safety device processor determines it is not the leader, the method 2450 may proceed to operation 2454 and the portable safety device processor may turn off the portable safety device signal. A leader portable safety device may keep its portable safety device signal on to communicate with other entities. By turning off the other non-leader portable safety devices, redundant data transfer, signal interference, and/or conflicting messaging can be avoided among the portable safety devices associated with the same vehicle.

If at operation 2456, the portable safety device processor determines it is the leader, the method 2450 may proceed to operation 2458 and the portable safety device processor may continue signaling. The portable safety device processor may transmit entity data indicating the entity is an automotive vehicle. The portable safety device processor may transmit the entity data to other connected entities, devices, or systems (e.g., infrastructure). The entity data may indicate generally that the entity is an automotive vehicle. In some embodiments, the entity data may indicate the type of automotive vehicle. For example, the portable safety device may be associated with a particular type of automotive vehicle based on user input. For example, a user may use the same automotive vehicle and may program the portable user device to associate the portable user device with the user's particular automotive vehicle (e.g., based on input through an associated safety application). In some embodiments, the portable safety device processor may transmit a message or notification requesting the user identify the type of automotive vehicle.

After operation 2458, or optionally after operation 2454, the method 2400 may proceed to operation 2460 and the portable safety device processor may determine the portable safety device is a vulnerable road user based on speed or a deviation in one or more of speed, proximity, and heading from the one or more other portable safety devices. In some embodiments, the portable safety device processor may determine the portable safety device is associated with a vulnerable road user based on speed, in a similar manner as discussed with respect to operation 2410 of method 2400. The portable safety device processor may determine that the portable safety device is associated generally with a vulnerable road user or with a specific type of vulnerable road user (e.g., pedestrian, bicyclist, motorcyclist, skateboarder, etc.) based on the speed (e.g., under 5 mph, a pedestrian) and, in some embodiments, user input.

In some embodiments, the portable safety device processor may determine the portable safety device is associated with a vulnerable road user based on a deviation in one or more of speed, proximity, and heading from the one or more other portable safety devices. When portable safety devices are traveling in the same vehicle, they are in proximity and move at relatively the same speed and heading. If a portable safety device is removed from the vehicle (e.g., taken by a pedestrian), then it may be in a different proximity to the other portable safety devices and/or may move in one or more of a different speed (e.g., pedestrian speeds vs. car speeds) or heading. The portable safety device processor may determine that the portable safety device has been removed from the vehicle based on such a deviation in speed, proximity, and/or heading.

If the portable safety device signal was turned off at operation 2454, the method 2450 may proceed to operation 2462 and the portable safety device processor may turn the portable safety device signal back on.

After operation 2460, or optionally after operation 2462, the method 2450 may proceed to operation 2464 and the portable safety device processor may transmit entity data indicative of the portable safety device being associated with a vulnerable road user. The entity data may be transmitted to other connected entities, devices, or systems.

The above method 2450 may be applicable to a group of students on a bus or a group of construction workers in a van. For example, some of the students on a bus may carry a portable safety device. The portable safety device may adjust its settings when on the bus versus when the student is off the bus and walking as a pedestrian. In this manner, the portable safety device keeps other road users aware of the student when the student is off the bus. When the student is on the bus, the portable safety device either turns off so that it does not transmit inaccurate entity data or it transmits entity data indicating the student is in a vehicle (in some instances, specifically a bus).

While various embodiments reference safety devices, it is contemplated that the same methods can be performed by or otherwise incorporate dedicated user devices described herein and in the PCT applications. While certain methods are described as being executed by a local processing element (e.g., a safety device processor), it is contemplated that such methods may be executed by a remote server or processor that acts as the central processor, and vice versa.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the structures disclosed herein, and do not create limitations, particularly as to the position, orientation, or use of such structures. Connection references (e.g., attached, coupled, connected, and joined) are to be construed broadly and may include intermediate members between a collection of elements and relative movement between elements unless otherwise indicated and may include electrical or wireless connection. As such, connection references do not necessarily infer that two elements are directly connected and/or in fixed relation to each other. The exemplary drawings are for purposes of illustration only and the dimensions, positions, order, and relative sizes reflected in the drawings attached hereto may vary.

While certain orders of operations are provided for methods disclosed herein, it is contemplated that the operations may be performed in any order and that operations can be omitted, unless specified otherwise.

The above specification, examples and data provide a complete description of the structure and use of exemplary embodiments of the invention as defined in the claims. Although various embodiments of the claimed invention have been described above with a certain degree of particularity, or with reference to one or more individual embodiments, those skilled in the art could make numerous alterations to the disclosed embodiments without departing from the spirit or scope of the claimed invention. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

We claim:

1. A light mobility vehicle safety system, comprising:
one or more sensors coupled to a light mobility vehicle; and
a processor coupled to the light mobility vehicle and in communication with the one or more sensors, wherein the processor is configured to:
determine that the light mobility vehicle is part of a group of two or more light mobility vehicles that are travelling together;
determine a position of the light mobility vehicle relative to one or more other light mobility vehicles in the group;
determine one or more relevant sensors of the one or more sensors based on the position of the light mobility vehicle and positioning of the one or more sensors on the light mobility vehicle;
receive first relevant safety-related data from the one or more relevant sensors; and
transmit the first relevant safety-related data to the one or more other light mobility vehicles in the group.

2. The light mobility vehicle safety system of claim 1, wherein the processor is further configured to:
receive second relevant safety-related data from the one or more other light mobility vehicles; and
determine one or more threats or risks surrounding the group based on the first relevant safety-related data and the second relevant safety-related data.

3. The light mobility vehicle safety system of claim 2, further comprising:
one or more feedback components coupled to the light mobility vehicle and in communication with the processor, wherein the processor is further configured to:
determine a risk level or proximity of the one or more threats or risks; and
transmit an alert to the one or more feedback components related to one or more high risk or close proximity threats or risks.

4. The light mobility vehicle safety system of claim 3, wherein transmitting the alert to the one or more feedback components comprises increasing an intensity or frequency of signaling of the one or more feedback components with higher risk or closer threats or risks.

5. The light mobility vehicle safety system of claim 3, wherein transmitting the alert to the one or more feedback components comprises transmitting signaling instructions to a light coupled to the light mobility vehicle or an audio signal to a speaker, bell, or horn coupled to the light mobility vehicle when the high risk or close proximity threats or risks comprise an oncoming entity.

6. The light mobility vehicle safety system of claim 2, wherein receiving the second relevant safety-related data from the one or more other light mobility vehicles, comprises receiving the second relevant safety-related data from a safety device coupled to one of the one or more other light mobility vehicles, the safety device comprising one or more of a C-V2X module and cellular module.

7. The light mobility vehicle safety system of claim 1, wherein:
determining the position of the light mobility vehicle relative to the one or more other light mobility vehicles comprises determining that the light mobility vehicle is in front of the one or more other light mobility vehicles;
the one or more relevant sensors comprise a camera and a radar sensor positioned on a front portion of the light mobility vehicle; and
the first relevant safety-related data comprises object data received from the camera and the radar sensor.

8. The light mobility vehicle safety system of claim 7, wherein the processor is further configured to reconcile differences in the object data received from the camera and the radar sensor for more accurate object data.

9. The light mobility vehicle safety system of claim 1, wherein the processor is configured to turn off or reduce power to one or more non-relevant sensors.

10. The light mobility vehicle safety system of claim 1, wherein determining the position of the light mobility vehicle relative to the one or more other light mobility vehicles comprises:
receiving geopositioning data or object data from the one or more sensors or user input related to the position; and
determining the position of the light mobility vehicle based on the geopositioning data, object data, or user input.

11. The light mobility vehicle safety system of claim 1, further comprising one or more connectivity modules coupled to the light mobility vehicle and in communication with the processor, wherein the first relevant safety-related data is related to an object, and wherein the processor is further configured to:
determine a type of communication signal available from the object based on communication signal data received from the one or more connectivity modules, wherein the type of communication signal comprises no signal, a C-V2X signal, or a cellular signal;
classify the object based on the first relevant safety-related data and the type of communication signal; and
determine a risk associated with the object based on the object classification.

12. A safety device for a light mobility vehicle, comprising:
one or more connectivity modules coupled to a circuit board; and
a processing element coupled to the circuit board and in communication with the one or more connectivity modules, the processing element configured to:
determine that the safety device is part of a group of two or more safety devices, wherein the two or more safety devices are associated with two or more light mobility vehicles that are travelling together;
receive safety-related data from one or more other safety devices in the group;
determine group characteristic data based on the received safety-related data; and
transmit, via the one or more connectivity modules, the group characteristic data to one or more compatible connectivity modules of one or more entities.

13. The safety device of claim 12, wherein determining that the safety device is part of the group of two or more safety devices comprises determining that the safety device and the one or more other safety devices in the group have one or more of a similar proximity, speed, or heading.

14. The safety device of claim 12, wherein the group characteristic data comprises data related to a size dimension or an average speed of the group.

15. The safety device of claim 12, wherein the one or more connectivity modules comprise a C-V2X chip, and the one or more compatible connectivity modules of the one or more entities comprise a compatible C-V2X module of a car.

16. The safety device of claim 12, wherein the one or more connectivity modules comprise a cellular modem, and the one or more compatible connectivity modules of one or more entities comprise a compatible cellular modem of a car.

17. A method of assessing a risk of an object, comprising:
receiving, by a processing element, sensor data related to an object from one or more sensors in communication with the processing element;
determining, by the processing element, a type of communication signal available from the object based on communication signal data received from one or more connectivity modules in communication with the processing element, wherein the type of communication signal comprises no signal, a C-V2X signal, or a cellular signal;
classifying, by the processing element, the object based on the sensor data and the type of communication signal; and
determining, by the processing element, a risk associated with the object based on the object classification.

18. The method of claim 17, wherein determining a risk associated with the object comprises determining a high risk is associated with the object based on the object having no signal.

19. The method of claim 17, further comprising transmitting, from the processing element via the one or more connectivity modules, classified object data related to the object classification to an other entity, the other entity comprising an other entity connectivity module that is non-compatible with the object.

20. The method of claim 19, wherein:
the one or more connectivity modules comprise a C-V2X module and a cellular module;
the other entity connectivity module comprises a cellular modem;
determining, by the processing element, the type of communication signal available from the object based on communication signal data received from the one or more connectivity modules comprises determining, by the processing element, the communication signal available is a C-V2X signal based on C-V2X signal data received from the C-V2X module; and
transmitting, from the processing element via the one or more connectivity modules, the classified object data to the other entity comprises transmitting, from the processing element via the cellular module, the classified object data classifying the object as a C-V2X enabled entity to the cellular modem of the other entity.

21. A safety system for mounting on a light mobility vehicle, comprising:
one or more sensors; and
a processor configured to:
determine that the light mobility vehicle is part of a group of two or more light mobility vehicles that are travelling together;
determine a position of the light mobility vehicle relative to one or more other light mobility vehicles in the group;
determine one or more relevant sensors of the one or more sensors based on the position of the light mobility vehicle and positioning of the one or more sensors on the light mobility vehicle;
receive first relevant safety-related data from the one or more relevant sensors; and
transmit the first relevant safety-related data to the one or more other light mobility vehicles in the group.

22. The safety system of claim 21, wherein the processor is further configured to:
receive second relevant safety-related data from the one or more other light mobility vehicles; and
determine one or more threats or risks surrounding the group based on the first relevant safety-related data and the second relevant safety-related data.

23. The safety system of claim 21, wherein:
determining the position of the light mobility vehicle relative to the one or more other light mobility vehicles comprises determining that the light mobility vehicle is in front of the one or more other light mobility vehicles;
the one or more relevant sensors comprise a camera and a radar sensor positioned on a front portion of the light mobility vehicle; and
the first relevant safety-related data comprises object data received from the camera and the radar sensor.

* * * * *